US012578110B2

(12) United States Patent
Douglas et al.

(10) Patent No.: US 12,578,110 B2
(45) Date of Patent: Mar. 17, 2026

(54) BUILDING MANAGEMENT SYSTEM WITH PARTICULATE SENSING

(71) Applicant: Tyco Fire & Security GmbH, Neuhausen am Rheinfall (CH)

(72) Inventors: Jonathan D. Douglas, Mequon, WI (US); Tyler A. Smith, Franklin, TN (US); Kirk H. Drees, Cedarburg, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 345 days.

(21) Appl. No.: 18/114,129

(22) Filed: Feb. 24, 2023

(65) Prior Publication Data

US 2023/0273576 A1     Aug. 31, 2023

Related U.S. Application Data

(60) Provisional application No. 63/313,969, filed on Feb. 25, 2022.

(51) Int. Cl.
*F24F 110/64*          (2018.01)
*F24F 11/30*           (2018.01)
(Continued)

(52) U.S. Cl.
CPC ............. *F24F 11/30* (2018.01); *F24F 11/39* (2018.01); *F24F 2110/20* (2018.01);
(Continued)

(58) Field of Classification Search
CPC ........ F24F 11/30; F24F 11/39; F24F 2110/20; F24F 2110/52; F24F 2110/64; F24F 2110/65; G05B 2219/2614
See application file for complete search history.

(56) References Cited

U.S. PATENT DOCUMENTS 6,425,297 B1     7/2002  Sharp
7,216,556 B2     5/2007  Desrochers et al.
(Continued)

FOREIGN PATENT DOCUMENTS

WO     WO-2023/283310 A1     1/2023

OTHER PUBLICATIONS

Alvarado et al., "A Methodology to Monitor Airborne PM10 Dust Particles Using a Small Unmanned Aerial Vehicle," Sensors, 2017, vol. 17 (25 pages).

(Continued)

*Primary Examiner* — Michael W Choi

(74) *Attorney, Agent, or Firm* — Foley & Lardner LLP

(57)          ABSTRACT

Systems and methods for particulate sensing of a building. Some embodiments relate to an air handling unit of an HVAC system of a building. The air handling unit includes a zone sensor configured to sample a first zone and measure a first particle disturbance of the first zone, an integrated sampling system includes one or more integrated sensors configured to measure a second particle disturbance of an outdoor air stream and a third particle disturbance of an indoor air stream. The air handling unit further includes an air handling unit controller configured to control operation of the air handling unit, responsive to comparing the second particle disturbance with at least one of the first particle disturbance or and the third particle disturbance.

20 Claims, 22 Drawing Sheets

(51) Int. Cl.

| | |
|---|---|
| *F24F 11/39* | (2018.01) |
| *F24F 110/20* | (2018.01) |
| *F24F 110/52* | (2018.01) |
| *F24F 110/65* | (2018.01) |

(52) U.S. Cl.
CPC ....... *F24F 2110/52* (2018.01); *F24F 2110/64* (2018.01); *F24F 2110/65* (2018.01); *G05B 2219/2614* (2013.01)

(56) References Cited

U.S. PATENT DOCUMENTS

| | | | |
|---|---|---|---|
| 7,360,461 | B2 | 4/2008 | Desrochers et al. |
| 7,389,158 | B2 | 6/2008 | Desrochers et al. |
| 7,421,911 | B2 | 9/2008 | Desrochers et al. |
| 8,147,302 | B2 | 4/2012 | Desrochers et al. |
| 8,721,409 | B1 | 5/2014 | Morales |
| 8,725,300 | B2 | 5/2014 | Desrochers |
| 9,109,981 | B2 | 8/2015 | Sharp |
| 9,278,303 | B1 | 3/2016 | Somani et al. |
| 10,563,886 | B2 | 2/2020 | Mccormick et al. |
| 11,513,486 | B2 | 11/2022 | Kupa et al. |
| 2006/0234621 | A1* | 10/2006 | Desrochers ............. F24F 3/044 702/50 |
| 2007/0082601 | A1 | 4/2007 | Desrochers et al. |
| 2015/0004898 | A1 | 1/2015 | Desrochers |
| 2015/0309120 | A1 | 10/2015 | Bujak et al. |
| 2015/0323427 | A1 | 11/2015 | Sharp |
| 2017/0052536 | A1* | 2/2017 | Warner ............ G06Q 10/06312 |
| 2018/0001249 | A1* | 1/2018 | Sher ......................... F24F 3/14 |
| 2020/0271561 | A1* | 8/2020 | Lavrovsky ......... B01D 35/1435 |
| 2021/0010701 | A1 | 1/2021 | Nesler et al. |
| 2021/0041119 | A1 | 2/2021 | Pham et al. |
| 2021/0200169 | A1 | 7/2021 | Ploegert et al. |
| 2021/0239335 | A1 | 8/2021 | Morgan et al. |
| 2021/0356153 | A1 | 11/2021 | Nesler et al. |
| 2021/0364181 | A1 | 11/2021 | Risbeck et al. |
| 2022/0088256 | A1* | 3/2022 | Robinson ............. B60H 3/0035 |
| 2022/0099641 | A1 | 3/2022 | Desrochers |
| 2022/0178574 | A1 | 6/2022 | Dong et al. |
| 2022/0195536 | A1 | 6/2022 | Molyneux et al. |
| 2022/0203287 | A1 | 6/2022 | Wenger et al. |
| 2022/0203288 | A1 | 6/2022 | Wenger et al. |
| 2022/0205962 | A1 | 6/2022 | Vanderkoy |
| 2022/0207215 | A1 | 6/2022 | Liu et al. |
| 2022/0221184 | A1 | 7/2022 | Gupta et al. |
| 2022/0228756 | A1 | 7/2022 | Gupta et al. |
| 2022/0254483 | A1 | 8/2022 | Boisvert et al. |
| 2022/0277851 | A1 | 9/2022 | Wellig |
| 2022/0282886 | A1 | 9/2022 | Hriljac et al. |
| 2022/0293261 | A1 | 9/2022 | Mcbrady et al. |
| 2022/0305438 | A1 | 9/2022 | Wenger et al. |
| 2022/0305881 | A1 | 9/2022 | Neu et al. |
| 2022/0341955 | A1 | 10/2022 | Molyneux et al. |
| 2022/0404056 | A1 | 12/2022 | Bloemer et al. |

OTHER PUBLICATIONS

U.S. Appl. No. 18/106,932, filed Feb. 7, 2023, Risbeck et al.
U.S. Appl. No. 18/106,934, filed Feb. 7, 2023, Risbeck et al.
Aircuity, "Demand Control Ventilation System Technology—Aircuity," Wayback Machine URL: https://www.aircuity.com/platform, Aug. 5, 2020 (1 page).
Aircuity, "Indoor Air Quality Management—Aircuity," Wayback Machine URL: https://www.aircuity.com/, Apr. 18, 2921 (1 page).
Aircuity, "Our Platform—Demand Control Ventilation—Aircuity," Wayback Machine URL: https://www.aircuity.com/platform, Aug. 5, 2020 (1 page).
Antrum, "Indoor Air Quality (IAQ) Monitoring Systems—Antrum," Wayback Machine URL: https://antrum.com/ Dec. 1, 2021 (1 page).
Poppy, "How it Works," Wayback Machine URL: https://www.poppy.com/howitworks, Aug. 4, 2021 (1 page).
Poppy, "Pathogen Sensing and Detection," Wayback Machine URL: https://www.poppy.com, Jun. 18, 2021, (1 pages).
Kopperud et al., "Outdoor versus indoor contributions to indoor particulate matter (PM) determined by mass balance methods," Journal of the Air & Waste Management Association, 2004, vol. 54 (10 pages).
Ramos et al., "Spatial and temporal variations in indoor environmental conditions, human occupancy, and operational characteristics in a new hospital building," PLoS One, 2015, vol. 10 (24 pages).

\* cited by examiner

1200 ⟍

1400

1410

Collect air stream samples

1420

Selectively provide an air stream sample

1430

Measure the air stream sample

1440

Collect air stream samples

1410

Estimate an air quality indicator

1450

Control operation of an air handling unit

1500

1510
Sample and measure a first
particle disturbance

1520
Collect air stream samples

1530
Selectively provide an air
stream sample

1540
Measure a second particle
disturbance

1550
Control operation of an air
handling unit

1560
Evaporate an aqueous
solution into air

BUILDING MANAGEMENT SYSTEM WITH PARTICULATE SENSING

CROSS-REFERENCE TO RELATED PATENT APPLICATIONS

This application claims the benefit of and priority to U.S. Provisional Application No. 63/313,969, filed Feb. 25, 2022, which is incorporated by reference herein in its entirety for all purposes.

BACKGROUND

The present disclosure relates generally to building management systems for buildings. The present disclosure relates more particularly to particulate sensing in an interior and/or exterior of a building, such as within a space of the building (e.g., zone, room, area). Building equipment (e.g., heating, ventilation, and/or air conditioning (HVAC) equipment) can be operated to control various environment conditions of spaces of a building. Building equipment can move air through various spaces of a building and can be operated to control the quality or cleanliness of air in the spaces, such as by moving clean air into the space and/or moving air with potential contaminants out of the space.

SUMMARY

Some embodiments relate to an integrated sampling system of an air handling unit of a building, the integrated sampling system including piping coupled to at least one of ducting or one or more air dampers and configured to collect a plurality of air stream samples, a switching manifold coupled to the piping and configured to selectively provide an air stream sample of the plurality of air stream samples from one or more pipes of the piping to a plurality of integrated sensors, the plurality of integrated sensors configured to simultaneously measure the air stream sample, wherein a first integrated sensor of the plurality of integrated sensors is configured to measure a first species of the air stream sample, and wherein a second integrated sensor of the plurality of integrated sensors is configured to measure a second species of the air stream sample, and a processing circuit configured to estimate one or more air quality indicators of the air handling unit based on at least one of the measurement of the first species or the measurement of the second species.

In some embodiments, the processing circuit is further configured to operate an actuator to selectively provide the air stream sample of the plurality of air stream samples via an output of the switching manifold to a plurality of inputs of the plurality of integrated sensors.

In some embodiments, the output of the switching manifold is coupled to an inline pump configured to provide the air stream sample from the output of the switching manifold to the plurality of inputs of the plurality of integrated sensors.

In some embodiments, an air quality indicator of the one or more air quality indicators is a weighted outdoor air fraction, and wherein the weighted outdoor air fraction is estimated based on modeling a plurality of outdoor air fractions by calculating a first outdoor air fraction of the plurality of outdoor air fractions based on a plurality of first measurements by the first integrated sensor of the plurality of integrated sensors, wherein the plurality of first measurements are of the first species, generating a first outdoor air fraction uncertainty based on inputting the first outdoor air fraction and a first uncertainty of the first integrated sensor, calculating a second outdoor air fraction of the plurality of outdoor air fractions based on a plurality of second measurements by the second integrated sensor of the plurality of integrated sensors, wherein the plurality of second measurements are of the second species, generating a second outdoor air fraction uncertainty based on inputting the second outdoor air fraction and a second uncertainty of the second integrated sensor, and estimating the weighted outdoor air fraction based on inputting, into a model, the first uncertainty, the second uncertainty, a first mass balance of the first species, and a second mass balance of the second species.

In some embodiments, the processing circuit of the integrated sampling system is further configured to execute a sensor diagnostic of the plurality of integrated sensors, responsive to determining the second outdoor air fraction is off by a predetermined factor from the first outdoor air fraction.

In some embodiments, wherein the measured air stream sample is a concentration measurement of one or more species, wherein the one or more species includes at least one of temperature, particulate distribution, carbon dioxide, particulate matter, volatile organic compounds (VOCs), or humidity, and wherein the concentration measurement of the one or more species includes at least one of a mixed air measurement, a return air measurement, an outside air measurement, and a supply air measurement.

In some embodiments, the processing circuit of the integrated sampling system further configured to generate a first size-resolved particulate dataset of a supply air stream sample supplied by one or more integrated sensors of the plurality of integrated sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles, calculate a first size distribution of the supply air stream sample based on the first size-resolved particulate dataset, generate a second size-resolved particulate dataset of an outside air stream sample supplied by one or more integrated sensors of the plurality of integrated sensors based on sorting outside airborne particles of the outdoor air stream sample into the size bins based on a diameter of the outside airborne particles, calculate a second size distribution of the outdoor air stream sample based on the second size-resolved particulate dataset, compare the first size distribution of with the supply air stream sample with the second size distribution of the outdoor air stream sample, and in response to comparing the first size distribution and the second size distribution determine an outside air stream is a source of a pollutant based on determining the supply airborne particles include primarily outdoor air, responsive to the first size distribution and the second size distribution being within a threshold similarity based on the comparison, or determine a supply air stream is a limited source of the pollutant based on determining the first size distribution is smaller than the second size distribution and the first size distribution and the second size distribution being outside the threshold similarity based on the comparison, when the outside air stream is the source of the pollutant, modify a control strategy, and when the supply air stream is the limited source of the pollutant, maintain the control strategy.

In some embodiments, the processing circuit of the integrated sampling system further configured to generate a third size-resolved particulate dataset of a zone air sample supplied by a zone sensor based on sorting zone airborne particles of the zone air sample into the size bins based on a diameter of the zone airborne particles, calculate a third size distribution of the zone air sample based on the third size-resolved particulate dataset, and determine a presence of envelope leakage based on determining a first portion of the third size distribution of the zone air sample that shares a threshold distribution of a third diameter range as the second size distribution of the outdoor air stream sample, determining a second portion of the third size distribution that shares the threshold distribution of the third diameter range as the first size distribution of the supply air stream sample, and identifying the presence of envelope leakage based on either (1) the first portion of the third size distribution being equal to or greater than the second size distribution, or (2) the second portion of the third size distribution is less than the first size distribution.

In some embodiments, the processing circuit of the integrated sampling system further configured to modify an operating mode of the air handling unit, responsive to a number of identified airborne particles of the plurality of air stream samples being below a particle threshold, wherein modifying the operating mode includes activating a humidifier with an aqueous solution to evaporate the aqueous solution into air flowing through the ducting or into a zone of the building, estimate a filtration efficiency based on the measured air stream sample from the one or more integrated sensors, and determine a corrective action based on the filtration efficiency, wherein the corrective action is at least one of a Minimum Efficiency Reporting Values (MERV) rating change, an air handling unit filter replacement notification, an update of a benchmark filter effectiveness, or modify a control strategy for a zone of the building.

Some embodiments relate to an air handling unit of an HVAC system of a building, the air handling unit including ducting through which airflow is controllably pushed by one or more fans of the HVAC system, one or more air dampers coupled to the ducting, an integrated sampling system including piping coupled to at least one of the ducting or the one or more air dampers and configured to collect a plurality of air stream samples, wherein two or more pipes of the piping include an inline pump of a plurality of inline pumps configured to selectively activate and provide an air stream sample of the plurality of air stream samples from one or more pipes of the piping to a plurality of integrated sensors, the plurality of integrated sensors configured to simultaneously measure the air stream sample, wherein a first integrated sensor of the plurality of integrated sensors is configured to measure a first species of the air stream sample, and wherein a second integrated sensor of the plurality of integrated sensors is configured to measure a second species of the air stream sample, and a processing circuit configured to selectively activate at least one of the plurality of inline pumps and estimate one or more air quality indicators of the air handling unit based at least one of the measurement of the first species or the measurement of the second species.

In some embodiments, an air quality indicator of the one or more air quality indicators is a weighted outdoor air fraction, and wherein the weighted outdoor air fraction is estimated based on modeling a plurality of outdoor air fractions by calculating a first outdoor air fraction of the plurality of outdoor air fractions based on a plurality of first measurements by the first integrated sensor of the plurality of integrated sensors, wherein the plurality of first measurements are of the first species, generating a first outdoor air fraction uncertainty based on inputting the first outdoor air fraction and a first uncertainty of the first sensor, calculating a second outdoor air fraction of the plurality of outdoor air fractions based on a plurality of second measurements by the second integrated sensor of the plurality of integrated sensors, wherein the plurality of second measurements are of the second species, generating a second outdoor air fraction uncertainty based on inputting the second outdoor air fraction and a second uncertainty of the second sensor, and estimating the weighted outdoor air fraction based on inputting the first uncertainty, the second uncertainty, a first mass balance of the first species, and a second mass balance of the second species.

In some embodiments, the processing circuit configured of the integrated sampling system is further configured to execute a sensor diagnostic of the plurality of integrated sensors, responsive to determining the second outdoor air fraction is off by a predetermined factor from the first outdoor air fraction.

In some embodiments, the measured air stream sample is a concentration measurement of one or more species, wherein the one or more species includes at least one of temperature, particulate distribution, carbon dioxide, particulate matter, volatile organic compounds (VOCs), or humidity, and wherein the concentration measurement of the one or more species includes at least one of a mixed air measurement, a return air measurement, an outside air measurement, and a supply air measurement.

In some embodiments, the processing circuit of the integrated sampling system further configured to generate a first size-resolved particulate dataset of a supply air stream sample supplied by one or more integrated sensors of the plurality of integrated sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles, calculate a first size distribution of the supply air stream sample based on the first size-resolved particulate dataset, generate a second size-resolved particulate dataset of an outside air stream sample supplied by one or more integrated sensors of the plurality of integrated sensors based on sorting outside airborne particles of the outdoor air stream sample into the size bins based on a diameter of the outside airborne particles, calculate a second size distribution of the outdoor air stream sample based on the second size-resolved particulate dataset, compare the first size distribution of with the supply air stream sample with the second size distribution of the outdoor air stream sample, and in response to comparing the first size distribution and the second size distribution determine an outside air stream is a source of a pollutant based on determining the supply airborne particles include primarily outdoor air, responsive to the first size distribution and the second size distribution being within a threshold similarity based on the comparison, or determine a supply air stream is a limited source of the pollutant based on determining the first size distribution is smaller than the second size distribution and the first size distribution and the second size distribution being outside the threshold similarity based on the comparison, when the outside air stream is the source of the pollutant, modify a control strategy, and when the supply air stream is the limited source of the pollutant, maintain the control strategy.

In some embodiments, the air handling unit further includes an air handling unit controller configured to control operation of the air handling unit, responsive to estimating the one or more air quality indicators, wherein the integrated sampling system is fixedly coupled to an air handling unit controller, a return air damper coupled to the ducting and configured to intake return air, an outside air damper coupled to the ducting and configured to intake outside air, an exhaust air damper coupled to the ducting and configured to dispel the return air, and wherein the air handling unit controller is further configured to selectively control an airflow source of the air flowing through the air handling unit, and wherein the airflow source includes at least one of the return air or the outside air, and wherein selectively controlling the airflow source includes controlling at least one of the return air damper or the outside air damper.

Some embodiments relate to a computer-implemented method for particulate sensing of a building, the computer-implemented method including collecting, by an integrated sampling system from piping, a plurality of air stream samples, selectively providing, by the integrated sampling system using a switching manifold, an air stream sample of the plurality of air stream samples from one or more pipes of the piping to a plurality of integrated sensors of the integrated sampling system, measuring, by the integrated sampling system using the plurality of integrated sensors, the air stream sample including a first species and a second species, and estimating, by the integrated sampling system, one or more air quality indicators of an air handling unit based on at least one of the measurement of the first species or the measurement of the second species.

In some embodiments, the selectively providing further includes operating, by the integrated sampling system, an actuator to selectively provide the air stream sample of the plurality of air stream samples via an output of the switching manifold to a plurality of inputs of the plurality of integrated sensors for measuring.

In some embodiments, an air quality indicator of the one or more air quality indicators is a weighted outdoor air fraction, and wherein the weighted outdoor air fraction is estimated based on modeling a plurality of outdoor air fractions by calculating, by the integrated sampling system, a first outdoor air fraction of the plurality of outdoor air fractions based on a plurality of first measurements by a first integrated sensor of the plurality of integrated sensors, wherein the plurality of first measurements are of the first species, generating, by the integrated sampling system, a first outdoor air fraction uncertainty based on inputting the first outdoor air fraction and a first uncertainty of the first integrated sensor, calculating, by the integrated sampling system, a second outdoor air fraction of the plurality of outdoor air fractions based on a plurality of second measurements by a second integrated sensor of the plurality of integrated sensors, wherein the plurality of second measurements are of the second species, generating, by the integrated sampling system, a second outdoor air fraction uncertainty based on inputting the second outdoor air fraction and a second uncertainty of the second integrated sensor, and estimating, by the integrated sampling system, the weighted outdoor air fraction based on inputting, into a model, the first uncertainty, the second uncertainty, a first mass balance of the first species, and a second mass balance of the second species.

In some embodiments, the computer-implemented method further includes generating, by the integrated sampling system, a first size-resolved particulate dataset of a supply air stream sample supplied by one or more integrated sensors of the plurality of integrated sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles, calculating, by the integrated sampling system, a first size distribution of the supply air stream sample based on the first size-resolved particulate dataset, generating, by the integrated sampling system, a second size-resolved particulate dataset of an outside air stream sample supplied by one or more integrated sensors of the plurality of integrated sensors based on sorting outside airborne particles of the outdoor air stream sample into the size bins based on a diameter of the outside airborne particles, calculating, by the integrated sampling system, a second size distribution of the outdoor air stream sample based on the second size-resolved particulate dataset, comparing, by the integrated sampling system, the first size distribution of with the supply air stream sample with the second size distribution of the outdoor air stream sample, and in response to comparing the first size distribution and the second size distribution determining, by the integrated sampling system, an outside air stream is a source of a pollutant based on determining the supply airborne particles include primarily outdoor air, responsive to the first size distribution and the second size distribution being within a threshold similarity based on the comparison, or determining, by the integrated sampling system, a supply air stream is a limited source of the pollutant based on determining the first size distribution is smaller than the second size distribution and the first size distribution and the second size distribution being outside the threshold similarity based on the comparison, when the outside air stream is the source of the pollutant, modifying, by the integrated sampling, system a control strategy, and when the supply air stream is the limited source of the pollutant, maintaining, by the integrated sampling system, the control strategy.

In some embodiments, the computer-implemented method further includes generating, by the integrated sampling system, a third size-resolved particulate dataset of a zone air sample supplied by a zone sensor based on sorting zone airborne particles of the zone air sample into the size bins based on a diameter of the zone airborne particles, calculating, by the integrated sampling system, a third size distribution of the zone air sample based on the third size-resolved particulate dataset, determining, by the integrated sampling system, a presence of envelope leakage based on determining a first portion of the third size distribution of the zone air sample that shares a threshold distribution of a third diameter range as the second size distribution of the outdoor air stream sample, determining a second portion of the third size distribution that shares the threshold distribution of the third diameter range as the first size distribution of the supply air stream sample, and identifying the presence of envelope leakage based on either (1) the first portion of the third size distribution being equal to or greater than the second size distribution, or (2) the second portion of the third size distribution is less than the first size distribution.

Some embodiments relate to an air handling unit of an HVAC system of a building, the air handling unit including a zone sensor configured to sample a first zone and measure a first particle disturbance of the first zone, an integrated sampling system including piping coupled to at least one of ducting or one or more air dampers and configured to collect a plurality of air stream samples, and a switching manifold coupled to the piping and configured to selectively provide an air stream sample of the plurality of air stream samples from one or more pipes of the piping to one or more integrated sensors, wherein the one or more integrated sensors are configured to measure a second particle disturbance of an outdoor air stream and a third particle disturbance of an indoor air stream. The air handling unit can further include an air handling unit controller configured to control operation of the air handling unit, responsive to comparing the second particle disturbance with at least one of the first particle disturbance or and the third particle disturbance.

In some embodiments, the integrated sampling system is further configured to operate an actuator to selectively provide the air stream sample of the plurality of air stream samples via an output of the switching manifold to a plurality of inputs of the one or more integrated sensors.

In some embodiments, the output of the switching manifold is coupled to an inline pump configured to provide the air stream sample from the output of the switching manifold to the plurality of inputs of the one or more integrated sensors, and wherein the one or more integrated sensors simultaneously measure the second particle disturbance and the third particle disturbance.

In some embodiments, the air handling unit controller is further configured to estimate a filtration efficiency based on the measured air stream sample from the one or more integrated sensors, and determine a corrective action based on the filtration efficiency, wherein the corrective action is at least one of a Minimum Efficiency Reporting Values (MERV) rating change, an air handling unit filter replacement notification, an update of a benchmark filter effectiveness, or modify a control strategy for a zone of the building.

In some embodiments, modifying the control strategy causes the air handling unit controller to implement the control strategy to control HVAC equipment of the building, and wherein the integrated sampling system is fixedly coupled to an air handling unit controller, and wherein the control strategy further includes adjusting at least one control of the HVAC equipment based on one or more instructions, and wherein the air handling unit controller is further configured to calculate an operating cost of increasing an outdoor air fraction based on increasing outdoor air intake by at least one of the one or more air dampers, and optimize a ventilation schedule based on either (1) maintaining the outdoor air fraction and minimizing the operating cost, or (2) maximizing the outdoor air fraction and maintaining the operating cost below a predefined threshold.

In some embodiments, the air handling unit further includes a humidifier within the ducting and configured to evaporate an aqueous solution into air flowing through the ducting, wherein the aqueous solution includes a plurality of particles with one or more recorded particle sizes.

In some embodiments, the humidifier is further configured to seed a zone of the building with the plurality of particles of the aqueous solution, and wherein the air handling unit controller is further configured to estimate a decay rate of the plurality of particles based on receiving particle disturbances of the zone sensor over a period of time.

In some embodiments, a processing circuit of the integrated sampling system is configured to generate a first size-resolved particulate dataset of a supply air stream sample supplied by the one or more integrated sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles, calculate a first size distribution of the supply air stream sample based on the first size-resolved particulate dataset, generate a second size-resolved particulate dataset of an outside air stream sample supplied by the one or more integrated sensors based on sorting outside airborne particles of the outdoor air stream sample into the size bins based on a diameter of the outside airborne particles, calculate a second size distribution of the outdoor air stream sample based on the second size-resolved particulate dataset, compare the first size distribution of with the supply air stream sample with the second size distribution of the outdoor air stream sample, in response to comparing the first size distribution and the second size distribution determine an outside air stream is a source of a pollutant based on determining the supply airborne particles include primarily outdoor air, responsive to the first size distribution and the second size distribution being within a threshold similarity based on the comparison or determine a supply air stream is a limited source of the pollutant based on determining the first size distribution is smaller than the second size distribution and the first size distribution and the second size distribution being outside the threshold similarity based on the comparison.

In some embodiments, the processing circuit of the integrated sampling system further configured to when the outside air stream is the source of the pollutant, modify a control strategy, and when the supply air stream is the limited source of the pollutant, maintain the control strategy.

Some embodiments relate to an integrated sampling system of an air handling unit of a building, the integrated sampling system including piping coupled to at least one of ducting or one or more air dampers and configured to collect a plurality of air stream samples, a switching manifold coupled to the piping and configured to selectively provide an air stream sample of the plurality of air stream samples from one or more pipes of the piping to one or more integrated sensors, the one or more sensors configured to measure a second particle disturbance of an outdoor air stream and a third particle disturbance of an indoor air stream, and a processing circuit configured to compare the second particle disturbance with at least one of the first particle disturbance or the third particle disturbance.

In some embodiments, the integrated sampling system is further configured to operate an actuator to selectively provide the air stream sample of the plurality of air stream samples via an output of the switching manifold to a plurality of inputs of the one or more integrated sensors.

In some embodiments, the output of the switching manifold is coupled to an inline pump configured to provide the air stream sample from the output of the switching manifold to the plurality of inputs of the one or more integrated sensors.

In some embodiments, the processing circuit is further configured to estimate a filtration efficiency based on the measured air stream sample from the one or more integrated sensors and determine a corrective action based on the filtration efficiency, wherein the corrective action is at least one of a Minimum Efficiency Reporting Values (MERV) rating change, an air handling unit filter replacement notification, an update of a benchmark filter effectiveness, modify a control strategy for a zone of the building.

In some embodiments, modifying the control strategy causes the air handling unit controller to implement the control strategy to control HVAC equipment of the building, wherein the control strategy further includes adjusting at least one control of the HVAC equipment based on one or more instructions, and wherein the air handling unit controller is further configured to calculate an operating cost of increasing an outdoor air fraction based on increasing outdoor air intake by at least one of the one or more air dampers and optimize a ventilation schedule based on either (1) maintaining the outdoor air fraction and minimizing the operating cost, or (2) maximizing the outdoor air fraction and maintaining the operating cost below a predefined threshold.

In some embodiments, the processing circuit of the integrated sampling system is further configured to generate a first size-resolved particulate dataset of a supply air stream sample supplied by the one or more integrated sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles, calculate a first size distribution of the supply air stream sample based on the first size-resolved particulate dataset, generate a second size-resolved particulate dataset of an outside air stream sample supplied by the one or more integrated sensors based on sorting outside airborne particles of the outdoor air stream sample into the size bins based on a diameter of the outside airborne particles, calculate a second size distribution of the outdoor air stream sample based on the second size-resolved particulate dataset, compare the first size distribution of with the supply air stream sample with the second size distribution of the outdoor air stream sample, and in response to comparing the first size distribution and the second size distribution determine an outside air stream is a source of a pollutant based on determining the supply airborne particles include primarily outdoor air, responsive to the first size distribution and the second size distribution being within a threshold similarity based on the comparison, or determine a supply air stream is a limited source of the pollutant based on determining the first size distribution is smaller than the second size distribution and the first size distribution and the second size distribution being outside the threshold similarity based on the comparison.

In some embodiments, the processing circuit of the integrated sampling system further configured to when the outside air stream is the source of the pollutant, modify a control strategy, and when the supply air stream is the limited source of the pollutant, maintain the control strategy.

Some embodiments relate to a computer-implemented method for particulate sensing of a building, the computer-implemented method including sampling and measuring, by an air handling unit, a first zone for a first particle disturbance of the first zone, collecting, by the air handling unit from piping, a plurality of air stream samples, selectively providing, by the air handling unit using an integrated sampling system, an air stream sample of the plurality of air stream samples from one or more pipes of the piping to one or more integrated sensors, measuring, by the air handling unit using the integrated sampling system, a second particle disturbance of an outdoor air stream and a third particle disturbance of an indoor air stream, and controlling, by the air handling unit, operation of the air handling unit, responsive to comparing the second particle disturbance with at least one of the first particle disturbance or and the third particle disturbance.

In some embodiments, the computer-implemented method further includes estimating, by the air handling unit, a filtration efficiency based on the measured air stream sample from the one or more integrated sensors, and determining, by the air handling unit, a corrective action based on the filtration efficiency, wherein the corrective action is at least one of a Minimum Efficiency Reporting Values (MERV) rating change, an air handling unit filter replacement notification, an update of a benchmark filter effectiveness, modify a control strategy for a zone of the building.

In some embodiments, the computer-implemented method further includes evaporating, by the air handling unit, an aqueous solution into air flowing through the ducting, wherein the aqueous solution includes a plurality of particles with one or more recorded particle sizes.

In some embodiments, the computer-implemented method further includes seeding, by the air handling unit, a zone of the building with the plurality of particles of the aqueous solution, and wherein the air handling unit is further configured to estimate a decay rate of the plurality of particles based on receiving particle disturbances of the zone sensor over a period of time.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements

Figure 1:
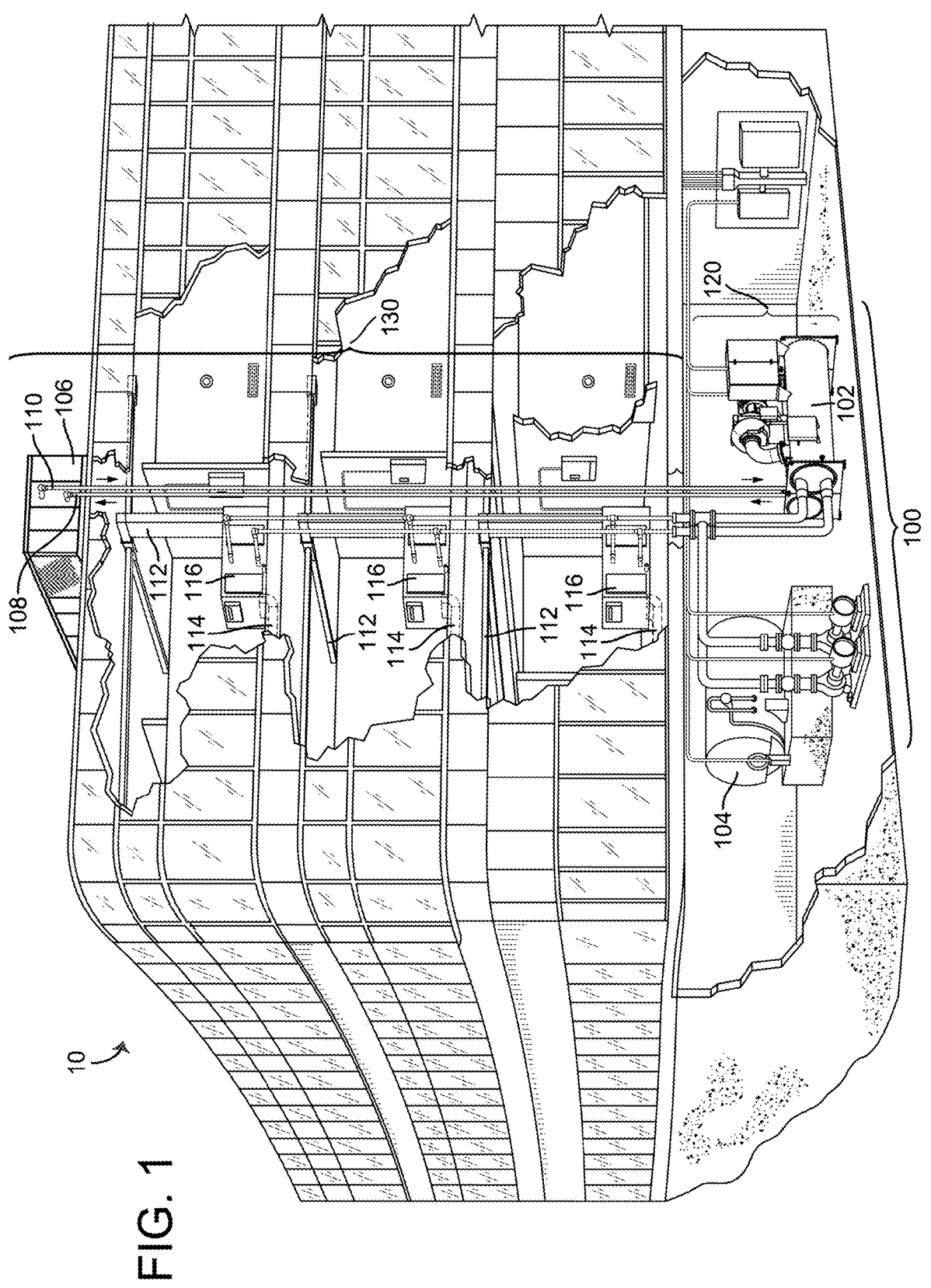
FIG. 1 is a drawing of a building equipped with a HVAC system, according to some embodiments.

It will be recognized that some or all of the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the FIGURES, systems and methods are provided for particulate sensing in a building. According to various example embodiments, the disclosed integrated sampling system of an air handling unit includes piping, a switching manifold, sensors, and a processing circuit to estimate air quality indicators based on measured air stream samples. In some embodiments, the processing circuit of integrated sampling system can selectively activate inline pumps and/or switching manifolds and estimate air quality indicators based on measured air stream samples. The systems and methods can control the HVAC equipment by calculating the operating cost of increasing outdoor air intake and optimizing a ventilation schedule based on maintaining the outdoor air fraction, minimizing the operating cost, and/or maximizing the outdoor air fraction while maintaining the operating cost below a predefined threshold.

In some embodiments, the present disclosure relates to particulate sensing in the interior and/or exterior of a building, such as within a space of the building (e.g., zone, room, area). Building equipment, such as HVAC equipment, can be operated to control various environmental conditions of spaces in the building by moving clean air into the space and/or moving air with potential contaminants out of the space. In some embodiments, the system and methods disclose an integrated sampling system for an air handling unit that can collect and measure a plurality of air stream samples using one or more sensors, and estimate one or more air quality indicators of the air handling unit based on the measured air stream sample using a processing circuit. This system can help building managers and engineers maintain better control over indoor air quality and HVAC equipment performance by providing real-time data on air quality indicators such as temperature, humidity, and particulate matter. In some embodiments, an air handling unit in an HVAC system of a building can include ducting and one or more air dampers coupled to it for controlling the airflow. Additionally, it can have an integrated sampling system with piping for collecting air stream samples, sensors for measuring the samples, and a processing circuit for selectively activating inline pumps and estimating air quality indicators based on the measured air stream samples. Thus, this allows for efficient and targeted air stream sample analysis, which can improve the accuracy of the air stream samples and save time and resources.

In some embodiments, the systems and methods include an air handling unit with a zone sensor that samples and measures the particle disturbance in a specific area. An integrated sampling system can be implemented, including piping and a switching manifold that selectively provides air stream samples to one or more integrated sensors. In some embodiments, the air handling unit controller responds to particle disturbance measurements from both the outdoor and indoor air streams and can control the operation of the air handling unit based on a comparison of these measurements. Additionally, the systems and methods use particle disturbances measured by a zone sensor and integrated sensors to identify zones that require attention and estimate filtration efficiency to determine corrective actions, such as a Minimum Efficiency Reporting Values (MERV) rating change or air handling unit filter replacement notification. In some embodiments, the systems and methods also include evaporating an aqueous solution with particles of one or more recorded sizes to seed a zone of a building and estimate the decay rate of the particles by receiving particle disturbances of the zone sensor over time.

building management system can monitor aspects of indoor air quality (IAQ) and/or controlling aspects of building equipment, such as heating, ventilation, and/or air conditioning (HVAC) equipment, using IAQ data. Some aspects of the present disclosure relate to estimation of outdoor airflow rates, energy savings, and room occupied schedule analysis from IAQ data. In some embodiments, outdoor airflow rates for particular spaces or areas within a building may be estimated using a regression model that incorporates IAQ data and determined transient periods or windows. In some embodiments, energy savings can be determined for different ventilation control strategies. In some embodiments, room occupied schedule analysis can be performed such that spaces or areas can be clustered with specific daily schedules unique to each cluster.

Additionally, the disclosure describes various methods and systems for estimating outdoor airflow rates and determining transient periods, as well as clustering, occupancy schedules, infection risk, and other characteristics. The methods and systems include using IAQ data, such as $CO_2$, temperature, humidity, volatile organic compounds (VOCs), particulate matter (e.g., PM2.5), and other data, to determine scheduling and zones. The disclosure also describes systems and methods for identifying zones that should be given attention and for rebalancing for efficient demand control ventilation. Other systems and methods include using model predictive control (MPC) for demand control ventilation, and using other types of environment data for calculating infection risk, CO2 disturbance, and other characteristics. Additionally, the disclosure describes systems and methods for calculating uncertainty in outdoor airflow rate, occupancy estimate, and other characteristics, and for calculating potential savings from demand controlled ventilation and cost to bring to standard.

Building HVAC Systems and Building Management Systems

Figure 2:
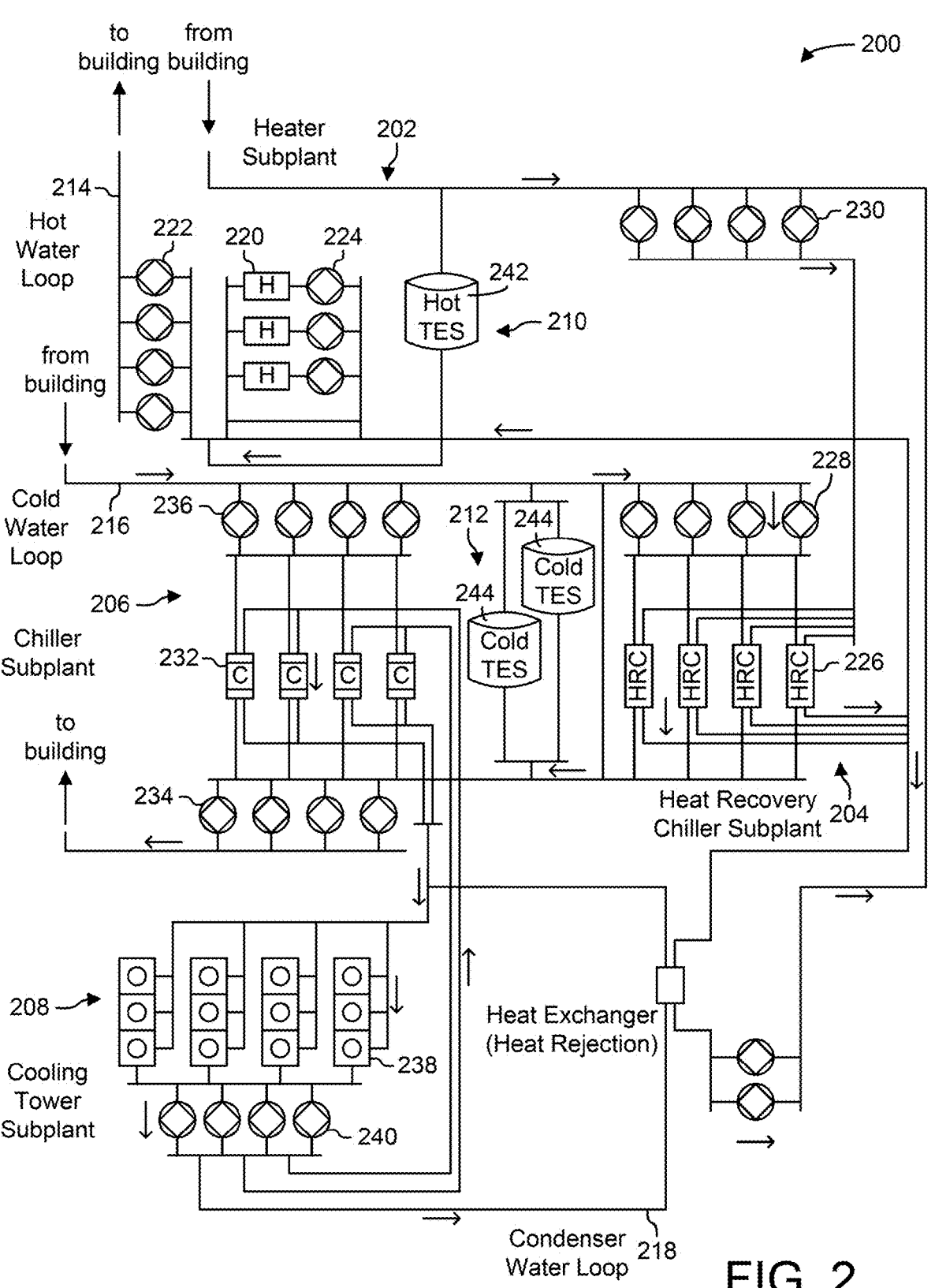
FIG. 2 is a schematic diagram of a waterside system which can be used in conjunction with the building of FIG. 1, according to some embodiments.
Figure 3:
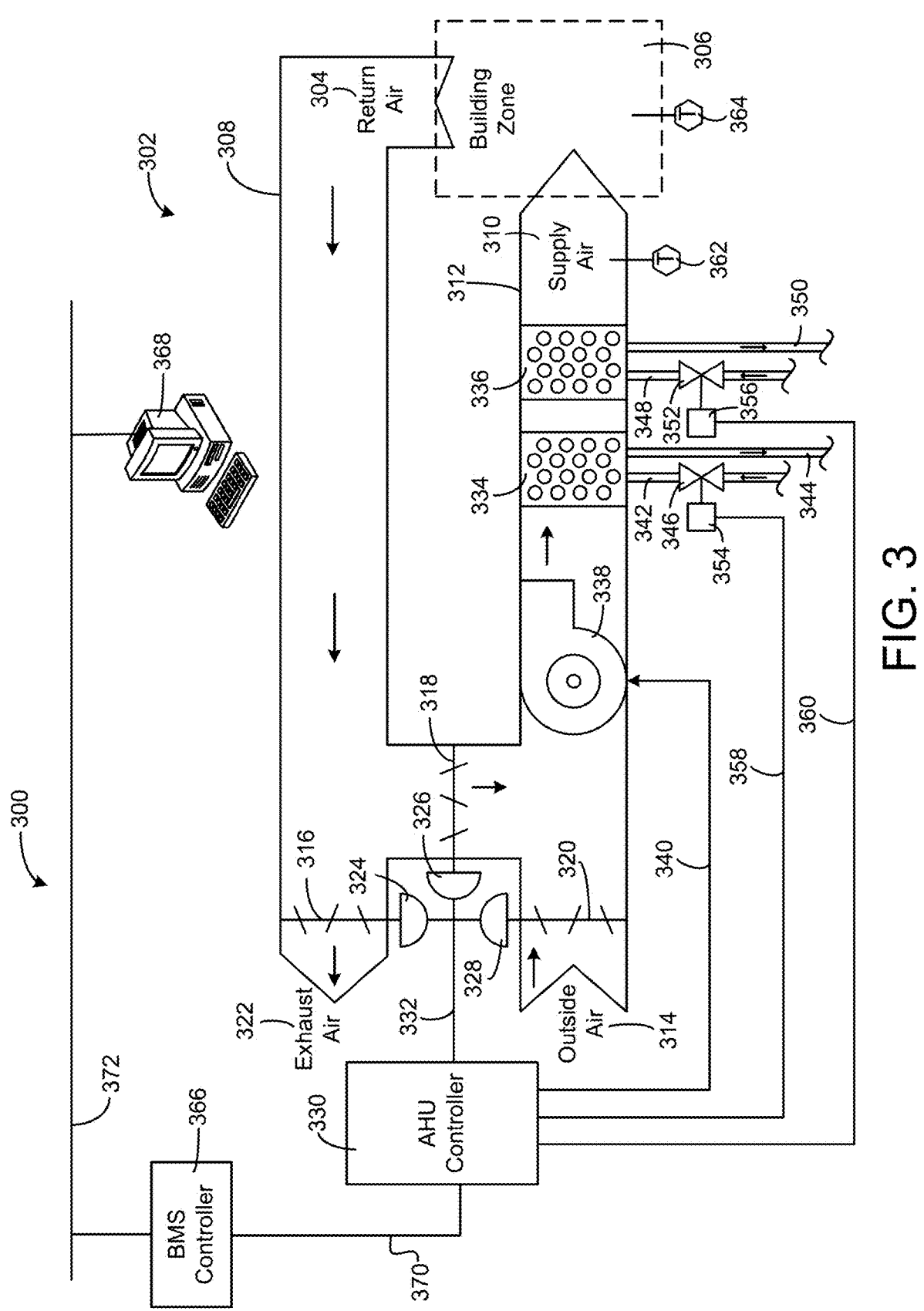
FIG. 3 is a schematic diagram of an airside system which can be used in conjunction with the building of FIG. 1, according to some embodiments.
Figure 4:
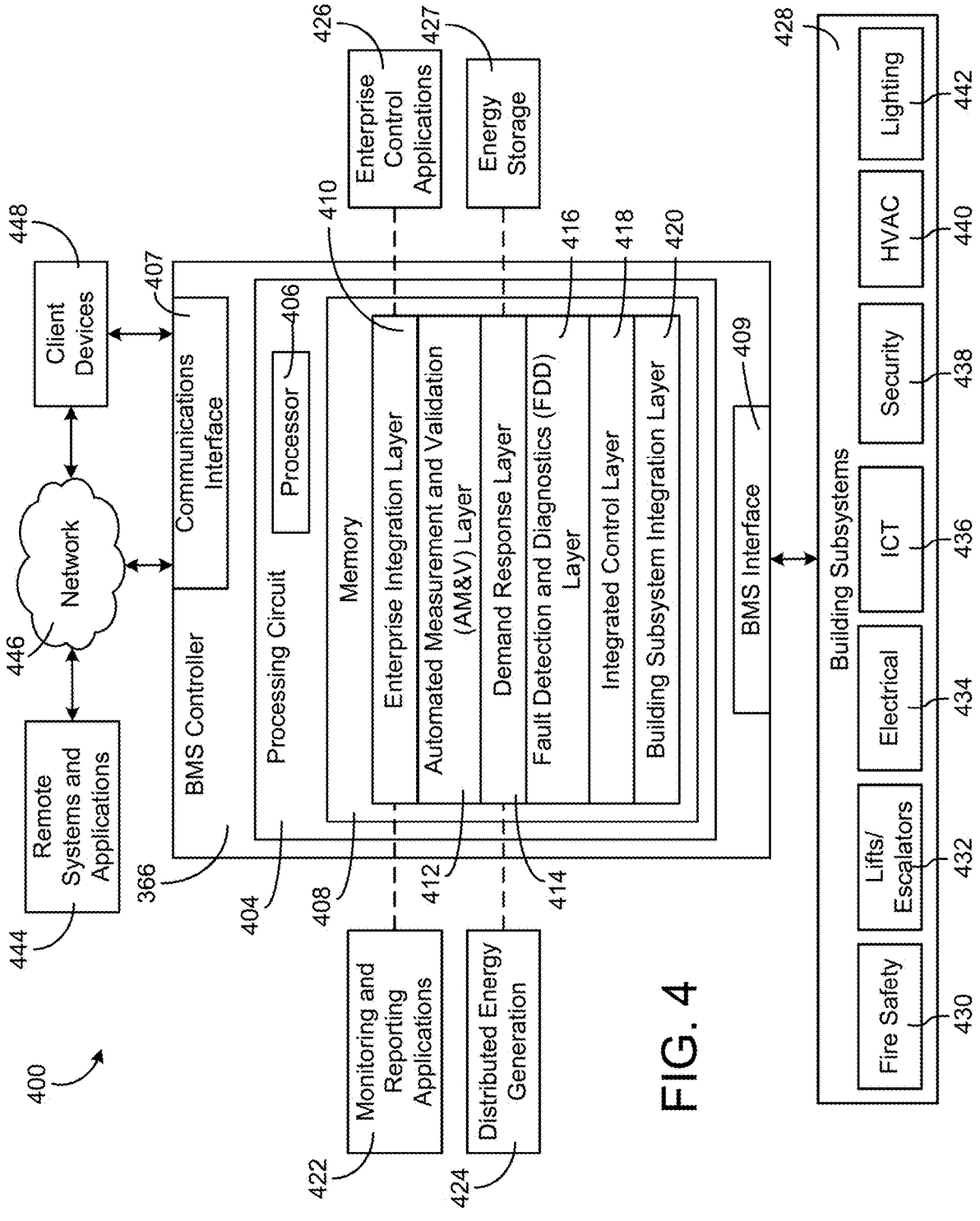
FIG. 4 is a block diagram of a building management system (BMS) which can be used to monitor and control the building of FIG. 1, according to some embodiments.
Figure 5:
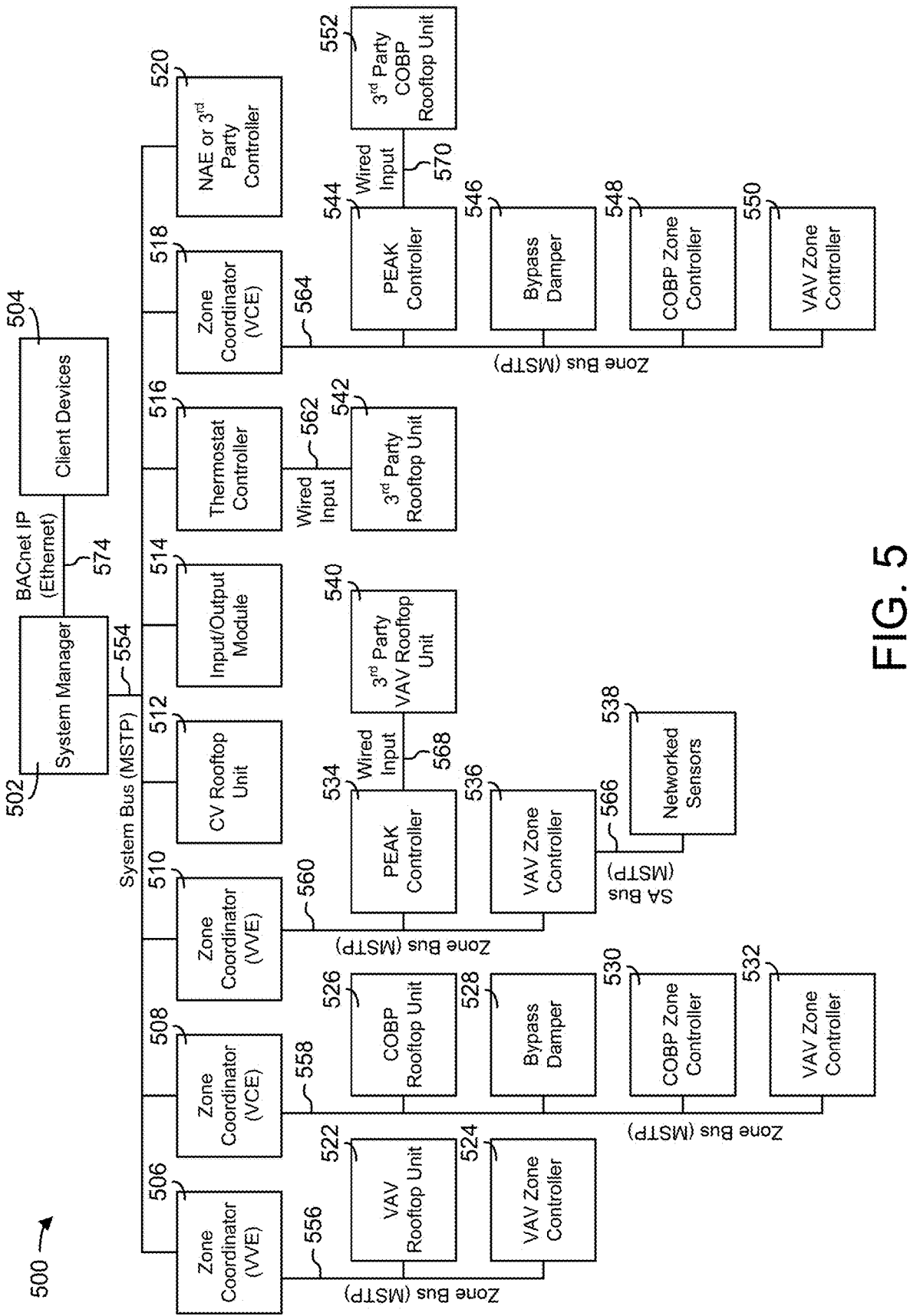
FIG. 5 is a block diagram of another BMS which can be used to monitor and control the building of FIG. 1, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, gas sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Integrated Sampling System

Figure 6A:
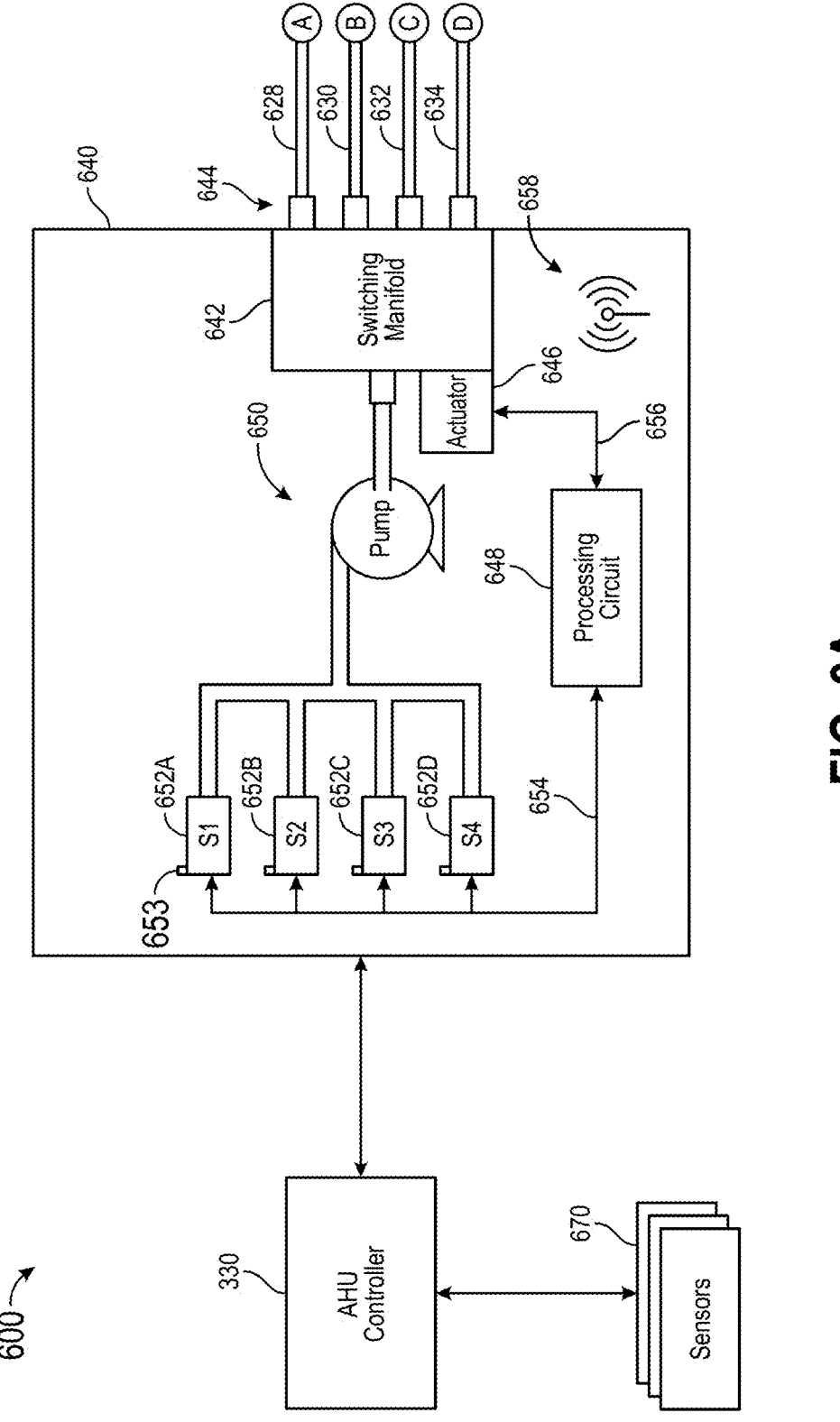
FIG. 6A-6B is an air system of a building with an integrated sampling system that collects samples from the air system, according to some embodiments.

Referring now to FIG. 6A, an air system 600 of a building with an integrated sampling system 640 that collects samples from the air system 600 is shown, according to an exemplary embodiment. In some cases, the particles of the air can be collected through piping, e.g., installed and/or coupled to portions of the air system 600. The air system 600 can be an air handler unit, a rooftop unit, a duct system of a building, etc.

In some embodiments, the present disclosure provides an integrated sampling system 640 that can collect and analyze air samples from various locations in an air system 600 of a building. The integrated sampling system 640 can include a piping system (e.g., piping 628, 630, 632, and 634) that is coupled to the ducting or air dampers of the air system 600, and is configured to draw air samples from the outdoor air, return air, mixed air, and supply air, among others. The air samples can then be selectively provided to one or more integrated sensors (e.g., 652A, 652B, 652C, and 652D, collectively referred to herein as "integrated sensors 652") for measurement. In certain embodiments, the air samples are drawn by drilling a small hole in the side of each duct or damper and connecting a small diameter tube between the hole and a switching manifold 642 (or directly to the integrated sensors 652 as shown with reference to FIGS. 6C and 6D). In some embodiments, the switching manifold 642 is connected to an inline pump 650 that supplies the air sample to integrated sensors 652, which can include, but is not limited to, CO2, temperature, relative humidity, particulate sensors, among others. In some embodiments, the measurement may be taken and stored after a short time delay, which can depend on the sensor(s) time constant, tubing volume, and/or sample pump volumetric flow rate.

In some embodiments, the switching manifold 642 is configured to selectively provide air stream samples to integrated sensors 652 for measurement. The switching manifold 642 is shown to be coupled to a piping system (e.g., pipes 628, 630, 632, and 634, via a coupling 644), which collects air stream samples from different areas of an air system 600 in a building. The switching manifold 642 can be operated by an actuator 646, which can be used to selectively direct air stream samples from different pipes of the piping system to different inputs of the integrated sensors 652. The output of the switching manifold 642 is connected to the one or more integrated sensors (e.g., via inline pump 650), which can be used to measure the air stream sample. By selectively providing air stream samples to different integrated sensors 652, the switching manifold 642 enables the processing circuit 648 to estimate one or more air quality indicators of the air system 600 based on the measured air stream sample.

In some embodiments, the integrated sampling system 640 can include additional or fewer integrated sensors 652. Additionally, the integrated sampling system 640 can be modular to allow for one or more integrated sensors 652 to be removed or added after installation. That is, the integrated sampling system 640 may accommodate different types of sensors depending on the specific air quality indicators that are of interest to the user. The modular nature of the integrated sampling system can also allow for easy upgrades or replacements of sensors in response to changing air quality monitoring needs. By being able to increase the number of sensors and test more air stream samples simultaneously, the integrated sampling system can improve the accuracy and coverage of air quality data, allowing for better informed decision making and more effective HVAC system management. Adding a sensor to the integrated sampling system 640 after installation can bring several benefits or improvements. For example, if there is a need to monitor a new air quality parameter, such as a specific gas or VOC, a new sensor can be added to measure this parameter. This allows for more comprehensive monitoring of the air quality in the building and can provide more information for HVAC system control. Another benefit of a modular integrated sampling system 640 is that it allows for easier maintenance and upgrades. If a sensor fails, it can be easily replaced without having to replace the entire system. Additionally, if new and improved sensors become available, they can be added to the system to improve the accuracy and precision of the air quality measurements. Moreover, a modular integrated sampling system 640 can be more cost-effective, as it allows for customization and flexibility. Building owners can choose to add sensors only where they are needed, rather than purchasing a more expensive system with more sensors than necessary. This can result in cost savings without sacrificing the quality and accuracy of the air quality measurements.

In some embodiments, the switching manifold 642 may include one or more unused input ports or output ports to increase the number of pipes inputted into the switching manifold 642 or increase the number of integrated sensors 652. In some embodiments, an increase in the number of integrated sensors 652 may not include increasing an output of the switching manifold, but instead connecting or coupling an additional branch to the pipe connecting the integrated sensors 652 to the output of the switching manifold 642. However, in some embodiments, it may be desirable to isolate an output of the switching manifold 642 to one or more integrated sensors 652. In some instances, it may be necessary to isolate an output of the switching manifold 642 to one or more integrated sensors 652 to prevent cross-contamination or interference between the air stream samples being tested. By isolating the output, it can help ensure that the measurements are accurate and not affected by external factors. This can be especially important in settings where precise measurements are critical, such as in healthcare facilities or laboratory environments. In some embodiments, a dedicated pipe that is not shared between integrated sensors 652 could be advantageous because it can help prevent cross-contamination of air samples between different sensors. Additionally, dedicated pipes can help ensure that each sensor receives a consistent air sample, which can help improve the accuracy and consistency of the data being collected.

By allowing for the addition or removal of sensors after installation, the integrated sampling system 640 is made more modular, which can provide greater flexibility and control over the system. This can be particularly advantageous in situations where the air quality monitoring needs of a building may change over time, such as when the building is repurposed or renovated. Additionally, the ability to isolate an output of the switching manifold 642 to one or more integrated sensors 652 can improve modularity by making it easier to add or remove sensors without disrupting the overall flow of air samples. This can be especially useful in situations where different sensors may have different measurement requirements or sensitivity, and where changes to the sensor configuration may need to be made without affecting the operation of the entire sampling system 640. Overall, by providing greater modularity and flexibility, the integrated sampling system 640 can make it easier to monitor and control indoor air quality in a building, while also allowing for the system to adapt and evolve over time as the needs of the building and its occupants change.

In some embodiments, the integration of the switching manifold 642, integrated sensors 652, and inline pump 650 into a single enclosure provides a number of benefits in the context of an air handling unit. One advantage is that the compact size and ease of installation makes it feasible to retrofit the integrated sampling system 640 into existing HVAC systems without major modifications. The single enclosure also makes it easier to maintain and service the integrated sampling system, as all of the components are easily accessible in one location. Additionally, the integrated design helps to reduce the potential for leaks and other issues that can occur when using separate components that need to be connected together. Overall, the integration of these components into a single enclosure provides a more efficient and reliable air quality monitoring solution for buildings. Additionally, attaching or coupling the integrated sampling system 640 to the air handling unit controller 330 provides a benefit by allowing the air handling unit controller 330 to have direct access to real-time air quality data from a plurality of integrated sensors 652. This allows the controller to make more informed decisions about HVAC system operation, such as adjusting ventilation rates or filtration efficiency, based on current air quality conditions.

In some embodiments, processing circuit 648 in the integrated sampling system 640 communicates with the actuator 646 to operate the switching manifold 642 and selectively provide the air stream samples to the integrated sensors 652. The actuator 646 can be implemented as an electromechanical device, such as a solenoid valve, or as a pneumatic or hydraulic valve. In some embodiments, the actuator can be controlled by a programmable logic controller (PLC) or a microcontroller that receives input signals from the processing circuit 648, via communication line 656 (e.g., wireless or wired). In operation, the processing circuit 648 can send signals to the actuator 646 to control the valve position of the switching manifold 642, thereby selecting the air stream sample to be measured by the integrated sensors 652. The processing circuit 648 can also control the inline pump 650 (if implemented) to pump the selected air stream sample to the integrated sensors 652. The processing circuit 648 can receive data from the integrated sensors 652, such as measurements of temperature, humidity, particulate distribution, carbon dioxide, VOCs, or particulate matter, and use this data to estimate the air quality indicators of the air system 600. In some embodiments, the processing circuit 648 can store the data and provide it to other computing devices for further analysis or processing (e.g., BMS controller 366).

While a switching manifold 642 can used to selectively provide air stream samples to integrated sensors 652, alternative approaches can be used. One approach is to use a multiplexed sensor system. In this approach, a single sensor (e.g., sensor 652A without additional sensors 652B, 652C, and 652D) can be used to measure air stream samples from multiple locations in a sequence. This is achieved by rapidly switching between inputs to the integrated sensors 652 to measure each air stream sample. While this approach can reduce the complexity of the integrated sampling system 640, it can increase the time required to take measurements due to the need to cycle through each input. In some embodiments, another alternative approach is to use a sampling pump with multiple inlets. In this approach, the sampling pump is connected to each location where an air stream sample is to be taken, and each inlet is opened in sequence to draw air into the pump. The air stream samples can then be delivered to the integrated sensors 652 for measurement. While this approach can provide a simple and cost-effective solution, it may not be as precise as other approaches due to the potential for variations in air flow rates and sampling volumes at each inlet. The sampling pump approach is described in greater detail with reference to FIGS. 6C and 6D.

In some embodiments of the integrated sampling system 640 may include an inline pump 650 connected between the switching manifold 642 and the one or more integrated sensors 652 to pump the air from the switching manifold 642 to the integrated sensors 652. The line pump 650 can help to ensure that a sufficient quantity of air sample is delivered to the integrated sensors 652 for accurate measurement. In some implementations, the line pump 650 may be configured to operate at a predetermined volumetric flow rate, which can be adjusted based on the specific requirements of the integrated sensors 652. Additionally, the inline pump 650 may be controlled by the processing circuit 648 to enable it to operate on a predetermined schedule or in response to certain events (e.g., a change in the air quality detected by the integrated sensors 652). This way, the inline pump 650 can work in conjunction with the switching manifold 642 to ensure that the air samples are accurately and efficiently delivered to the integrated sensors 652 for measurement and analysis.

In some embodiments, the inline pump 650 may be positioned between the switching manifold 642 and the integrated sensors 652, and may be configured to operate on a predetermined schedule to move air samples through the piping, manifold, and to the sensors. The inline pump may be of a suitable type and design to meet the needs of the system. For example, the inline pump 650 may be a centrifugal pump, diaphragm pump, or another suitable type of pump that can move air without introducing significant errors or contaminating the air sample. In some embodiments, the inline pump 650 may be located near the integrated sensors 652 to minimize the length of tubing and reduce the risk of contamination or errors introduced by the tubing. In operation, the inline pump 650 may be controlled by the processing circuit 648 of the integrated sampling system 640. For example, the processing circuit 648 may provide signals to the inline pump 650 to activate it and control its flow rate. The processing circuit 648 may also monitor the status of the inline pump 650 and its performance, and may adjust its operation as needed to maintain accurate and reliable measurements of the air quality indicators.

In some embodiments, an inline pump 650 can selectively provide air stream samples from one or more pipes of the piping (e.g., 628, 630, 632, and 634) to each of the integrated sensors 652. As shown, the piping between the switching manifold 642 and integrated sensors 652 can be routed to each sensors individually. In some embodiments, the sensors may share a common pipe such that a chamber of air in a pipe is connected to each of the sensors 652 via the common pipe. For example, each sensor may be after and in-line with inline pump 650 such that the air stream samples are provided along a common pipe that is coupled or in-line with integrated sensors 652.

In some embodiments, the integrated sampling system 640 may include a single sample pump (e.g., inline pump 650) with a manifold system, as shown in FIG. 6A. In some embodiments, the sampling system may include multiple sample pumps (e.g., pumps 682A-D or pumps 692A-D) for each sensing location. The collected air samples can be used to by a processing circuit 648 to estimate one or more air quality indicators (e.g., air fractions) of the air system 600 based on the measured air stream samples from the integrated sensors 652. For example, these air quality indicators may include a weighted outdoor air fraction, which is estimated based on modeling a plurality of outdoor air fractions using measurements from multiple sensors and inputting mass balances of different species. In some embodiments, the integrated sampling system 640 may execute a sensor diagnostic of the one or more integrated sensors 652, responsive to determining a deviation between measurements from multiple sensors. The integrated sampling system 640 may also generate size-resolved particulate datasets for different air stream samples and calculate size distributions based on the datasets, and compare the size distributions to identify sources of pollutants and determine a control strategy for HVAC equipment. In some embodiments, the estimated air quality indicators can be used to control the operation of an air handling unit to improve air quality in the building. For example, this can include controlling the airflow source and adjusting the dampers in the air handling unit.

Each integrated sensor 652 (e.g., 652A, 652B, 652C, and 652D) of the integrated sampling system 640 can measure one or multiple air quality metrics, e.g., can include one sensors or a set of sensors. For example, the integrated sensors 652 can measure temperature for a space, particulate distribution for a space, carbon dioxide ($CO_2$) for a space, particulate matter (e.g., PM10 and PM2.5) for a space, volatile organic compounds (VOCs) for a space, humidity for a space, ventilation for a space, occupancy for a space, total volatile organic compound (TVOC) for the space, thermal measurements for the space, relative humidity for the space, dew point for the space, ozone for the space, carbon monoxide (CO) for the space, formaldehyde for the space, etc. The measurements can be communicated to the processing circuit 648, via communication line 654 (e.g., wireless or wired).

In some embodiments, the integrated sensors 652 may have an exhaust valve 653 selectively operated by the processing circuit 648 to exhaust air stream samples received by the switching manifold 642. For example, upon estimating one or more air quality indicators of the air handling unit 600 based on the measured air stream samples from the integrated sensors 652, the processing circuit 648 can activate or operate integrated sensor 652A to exhaust or release the air stream sample. In the above example, upon exhaustion the switching manifold can be operated, using the actuator 646, to selectively provide additional air stream samples to the sensors 652. The measurements of the integrated sensors 652 can be communicated to the processing circuit 648 to perform an analysis on the measurements of the various spaces of the building.

The AHU controller 330 (and/or BMS controller 366) can be configured to operate systems or control operations of the air handling unit, responsive to estimating the one or more air quality indicators (e.g., using measurements communicated from the integrated sensor 652). In some embodiments, the AHU controller 330 can communicate with the processing circuit 648 (e.g., via the network interface 658) of the integrated sampling system 640. In various embodiments, the AHU controller 330 and the integrated sampling system 640 can communicate wirelessly or via wired connections. In some embodiments the integrated sampling system 640 is fixedly coupled to (e.g., mounted on) the exterior or interior of the AHU controller 330. The AHU controller 330 can be configured to perform building control for conditions of the building (e.g., air changes, air mix, temperature levels, humidity levels, etc.) that can control the quality or cleanliness of air in the spaces, such as by moving clean air into the space and/or moving air with potential contaminants out of the space. The control that the AHU controller 330 can perform, according to various illustrative implementations, is described in U.S. patent application Ser. No. 17/013,273, filed Sep. 4, 2020; U.S. patent application Ser. No. 16/927,318, filed Jul. 13, 2020; and U.S. patent application Ser. No. 17/393,138 filed Aug. 3, 2021, the entirety of each of which is incorporated by reference herein.

In some embodiments, the air system 600 can run test cycles and establish baselines of the one or more species (e.g., temperature, particulate distribution, carbon dioxide, particulate matter, volatile organic compounds (VOCs), or humidity). For example, the humidifier 672 of FIG. 6B (e.g., ultrasonic, vaporizer, impeller, or evaporative) can be loaded with solutions (e.g., salt solution, any other aqueous solution) with recorded concentrations that generate appropriate particle sizes. In another example, a contaminant with a known pathogen can be introduced into the air system 600 and/or introduced into the airstream of the air system 600. The piping (e.g., 628, 630, 632, and 634) can collect air samples from various portions of the air system 600, and the zone sensor 670 can also collect measurements (e.g., particle disturbances). During testing, the humidifier 672 can be periodically turned on by the AHU controller 330 to seed the room with particles. In some embodiments the particle sensors (e.g., zone sensors 670) of the air system 600 can then be used to determine the decay in the particles generated by the humidifier once it is turned off. This information can be used to generate better and more accurate results, as the AHU controller 330 (or BMS controller 366) is aware of when the generator is turned on and off, and the higher particle concentration generated by the humidifier allows the zone sensors 670 to provide more accurate results.

In certain embodiments, a humidifier can be installed in each space and connected to a controller, such as a BMS controller 366. For example, zone sensors 670 can include a humidifier such a zone sensor 670 can include a sensor and humidifier enclosed within it. The BMS controller 366 can selectively turn the humidifiers (e.g., zone sensor 670) on or off at different times, based on user input, schedule, or analysis of the environment. This can enable the BMS controller 366 to perform a tracer test to determine the direction and velocity of particulate matter and flow of various solid particles and liquid droplets found in the air, detect air flow and current, and perform leak detection.

For example, the BMS controller 366 could turn on the humidifier in Room A from 12 pm to 1 μm and then determine changes in particle concentration in Rooms A, B, C, and D. Any change in concentration could be directly related to air movement from Room A to the other rooms. The BMS controller 366 could turn on the humidifier in Room B from 3 μm to 4 pm to observe the impact of particles in other rooms, and then the humidifier in Room C from 6 pm to 7 pm, and finally the humidifier in Room D from 10 μm to 11 μm. The entire process could be automated by the BMS controller 366, and in cases where particle concentration is unclear or hard to calculate (e.g., due to good filtration), multiple humidifiers could be turned on simultaneously by the BMS controller 366.

Additionally, the concentration of salt (or any other dissolved compound or element) in the water could control the particle size distribution. Thus, different humidifiers could be set up with different salt solutions. For instance, a strong salt solution could be used for larger particles and a weak solution for smaller particles. In another instance, the BMS controller 366 could alternatively turn on different humidifiers to test the filtration of different particle sizes throughout the spaces. This approach could be used to optimize HVAC performance and control air quality in various indoor environments, including homes, offices, hospitals, and other facilities. It could also be used to detect potential leaks or issues with the HVAC system, identify areas where additional filtration may be needed, and ensure that air is being distributed evenly throughout a space. By automating the process with a BMS controller 366, this approach could provide a cost-effective and efficient way to monitor and optimize indoor air quality. Optimizing indoor air quality, according to various illustrative implementations, is described in U.S. patent application Ser. No. 18/106,932, filed Feb. 7, 2023; and U.S. patent application Ser. No. 18/106,934, filed Feb. 7, 2023, the entirety of each of which is incorporated by reference herein. Additional details regarding the humidifier 672 is described in greater detail with reference to FIGS. 8-12.

In some embodiments, the AHU controller 330 and/or processing circuit 648 can communicate with individual zone sensors 670 for measuring CO2, temperature, and/or relative humidity at the various sensing locations. For example, zone sensors 670 can be useful for tracking changes in indoor air quality (IAQ) and identifying areas (sometimes in combination with the estimated air quality indicators) where additional ventilation may be desired (e.g., reduce a pathogen or CO2 concentration). In addition, the processing circuit 648 can also perform processing and analysis of the measured air stream samples. For example, the processing circuit 648 can be configured to estimate one or more air quality indicators of the air handling unit based on the measured air stream sample from the one or more integrated sensors. As used herein, "air quality indicators" can be any estimates of building conditions (e.g., outdoor air fraction (OAF), OAF uncertainty, ventilation rate, ventilation rate uncertainty, etc.) and/or estimations of air pollutants (e.g., carbon monoxide, lead, ground-level ozone, particulate matter, nitrogen dioxide, carbon dioxide, sulfur dioxide, etc.) within the building. In some embodiments, the processing circuit 648 can communicate with other devices and systems via wired or wireless connections of the network interface 658, such as Ethernet, Wi-Fi, cellular, or LoRa.

It should be understood that the air system 600 including the integrated sampling system 640 described herein can be configured in a variety of ways to suit different use cases and environments. For example, the integrated sampling system 640 may be adapted to draw air samples from different locations or at different intervals depending on the needs of the particular application. Similarly, the air system 600 can incorporate a variety of sensors beyond those described herein to measure other air quality parameters, such as volatile organic compounds (VOCs), ozone, or radon. Ultimately, the versatility and flexibility of the air system 600 make it an improved tool for monitoring and improving indoor air quality in a wide range of settings.

Each zone sensor 670 (a collection of temperature, humidity, CO2, air quality, etc., sensors) can measure one or multiple air quality metrics, e.g., can include one sensors or a set of sensors. For example, the zone sensors 670 can measure ventilation for a space, occupancy for the space, CO2 for the space, particulate matter PM10 for the space, particulate matter PM2.5 for the space, volatile organic compounds (VOC) for the space, total volatile organic compound (TVOC) for the space, thermal measurements for the space, temperature for the space, relative humidity for the space, dew point for the space, ozone for the space, carbon monoxide (CO) for the space, formaldehyde for the space, etc. In some embodiments, the zone sensors 670 are permanent sensors that are installed in a permanent manner. In this regard, if the zone sensors 670 are permanent, the reports and/or recommendations can be generated over a requested period of time, e.g., a particular day, week, year, etc.

Figure 7:
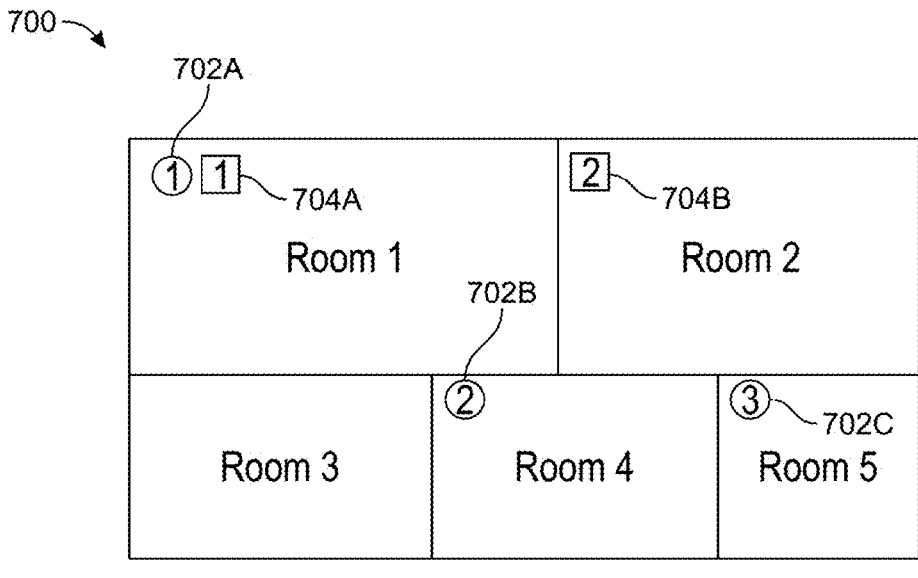
FIG. 7 is a schematic diagram of spaces of a building, according to an exemplary embodiment.

For example, an example sensor placement 700 throughout a building is shown in FIG. 7. Zone sensors 702 (e.g., A-C) can be a first type of zone sensor (e.g., 670), e.g., configured to collected measurements of humidity, volatile organic compounds (VOCs), polymerase chain reactions (PCRs), carbon dioxide, etc. Zone sensors 704 (e.g., A-B) can be a second type of zone sensor (e.g., 670), e.g., configured to collected measurements of particulate matter (PM), temperature, high resolution size-resolved particles, etc. In some embodiments, each zone sensor can communicate (e.g., via a wired or wireless connection) the collected measurements to the integrated sampling system 640 or controller (e.g., 330 or 366). In various embodiments, multiple zone sensors may be installed in each space or zone, or zone sensors installed in the spaces may include multiple different sensing capabilities (e.g., may be configured to sense multiple characteristics of the space such as humidity, carbon dioxide, temperature, etc.). In some implementations, the zone sensors may additionally or alternatively be installed in places other than in the space itself, such as in a VAV unit serving the space, an AHU serving the space, ductwork proximate to the space, etc.

The measurements of the zone sensors 670 can be communicated to a cloud platform that can perform an analysis on the air quality measurements of the various spaces of the building. For example, the zone sensors 670 can be wireless sensors (or wired sensors) that communicate across a network which may include local networks within the building and/or external networks. For example, various routers, switches, servers, cellular towers, LAN networks, WAN, networks, Wi-Fi networks, etc., can be included within the network and can communicate the measurements of the zone sensors 670 to the AHU controller 330 and/or processing circuit 648.

Referring to estimating air fractions, the processing circuit 648 can estimates a weighted outdoor air fraction as one of the air quality indicators. The weighted outdoor air fraction can be determined by modeling a plurality of outdoor air fractions, which involves several steps. For example, one method to estimate the fraction of air originating from outdoors is through the application of mass balances in air handling units (AHUs). The method 1300 for estimating a weighted outdoor air fractions is shown with reference to FIG. 13.

In some embodiments, a first outdoor air fraction can be calculated based on a plurality of measurements by a first sensor (e.g., integrated sensor 652A) of the one or more integrated sensors 652, where the plurality of measurements are of a first species (e.g., CO2). Specifically, a steady-state mass balance for carbon dioxide (CO2) can be used to estimate the outdoor air fraction as shown below (Equation 1A (EQ1A)):

$$\hat{X}_{oa,CO2} = \frac{C_{CO2,sa} - C_{CO2,ra}}{C_{CO2,oa} - C_{CO2,ra}}$$

where $C_{CO2}$ denotes carbon dioxide concentrate (ppm) and the subscript sa is the supply air, ra is the return air, and oa is the outdoor air. As shown, Equation 1A uses carbon dioxide concentration measurements from the supply air, return air, and outdoor air streams. It also takes into account the fact that CO2 behaves as an ideal gas, which may require a correction based on air temperature. This method has the advantage of accounting for any undesired or uncontrolled recirculation between the exhaust and outdoor air streams. Additionally, the accuracy of the estimation can improve as the number of building occupants increases. Mass balancing is an important consideration since the ventilation rates of a building can be highly dependent on occupancy levels.

In some embodiments, a second outdoor air fraction can be calculated based on a plurality of measurements by a second sensor (e.g., integrated sensor 652B) of the one or more integrated sensors 652, where the plurality of measurements are of a second species (e.g., temperature). That is, a steady state energy and mass balance can be applied around the mixed air chamber to estimate the outdoor air fraction entering the AHU, which can improve the accuracy and reduce uncertainty. Equation 1B describes a steady state energy balance that assumes constant air densities and specific heats to estimate the outdoor air fraction based on temperature measurements (Equation 1B (EQ1B)):

$$\hat{X}_{oa,T} = \frac{T_{ma} - T_{ra}}{T_{oa} - T_{ra}}$$

where T denotes the absolute temperature and the subscript ma is the mixed air, ra is the return air, and oa is the outdoor air.

In some embodiments, a third outdoor air fraction can be calculated based on a plurality of measurements by a second sensor (e.g., integrated sensor 652C) of the one or more integrated sensors 652, where the plurality of measurements are of a second species (e.g., particulate matter). That is, mass balancing can be used to estimate the outdoor air fraction based on particulate matter (PM) concentration measurements. In particular, assuming the AHU filter is located downstream of the mixed air chamber, a steady state mass balance on particulate matter (PM) concentration can be applied around the mixed air chamber to estimate the outdoor air fraction entering the AHU as shown below (Equation 1C (EQ1C)):

$$\hat{X}_{oa,pm2.5} = \frac{C_{pm2.5,ma} - C_{pm2.5,ra}}{C_{pm2.5,oa} - C_{pm2.5,ra}}$$

where $C_{pm}$ denotes particulate concentrations and the subscript ma is the mixed air, ra is the return air, and oa is the outdoor air. It should be understood that $C_{PM2.5}$ is illustrated for this approach because it is commonly available in commercial sensors.

Accordingly, the probabilistic framework for combining multiple measurements into a single measurement can improve accuracy and reduce uncertainty and can be applied to other particle sizes that are persistently airborne. In some embodiments, the outdoor air flow rate entering the AHU can be estimated using the product of the fractional outdoor air flowrate and an estimate of the supply air flow rate, as described below (Equation 2):

$$\dot{V}_{oa} = \hat{X}_{oa} \cdot \dot{V}_{sa}$$

where $\dot{V}_{oa}$ is the volume flow rate of outdoor air $\hat{X}_{oa}$ is the outdoor air fraction, and $\dot{V}_{sa}$ is the volume flow rate of supply air.

In some embodiments, Equation 2 allows the outdoor air flow rate to be estimated indirectly, which may be more accurate than measuring the outdoor air flow rate directly due to physical ductwork limitations and unpredictable flow geometries. Furthermore, measuring the supply air flow rate allows for the determination of how much of the air entering the outdoor air duct originated from the building exhaust. For example, for a constant flow AHU, the supply air flow rate is known a priori. In another example, for a variable air volume AHU, the supply air flow rate can be provided by an air flow station, the sum of the air flow rates measured by variable air volume boxes serving each zone, or a model that relates fan speed, power and or differential pressure to air flow. In various embodiments, measuring the supply air flow rate may be more accurate than measuring the outdoor air flow rate directly because the outdoor air velocities must be kept low to prevent entrainment of rain and debris, and physical ductwork limitations create unpredictable flow geometries. Furthermore, air flow measurement stations located in the outdoor air duct typically cannot determine how much of the air entering the duct originated from the building exhaust.

In some embodiments, the uncertainty in the estimated outdoor air fractions can be calculated by the processing circuit 648 using the variance addition rule (Equation 3A):

$$u_T = \sqrt{\sum_{r=1}^{k} a_r^2 u_{\varepsilon_r}^2 + 2\sum_{r=1}^{k-1}\sum_{q=r+1}^{k} a_r a_q \sum_{i=1}^{l}\sum_{j=1}^{m} \rho_{\varepsilon_r,i}\varepsilon_{q,j} u_{\varepsilon_r,i} u_{\varepsilon_q,j}}$$

where k is equal to the number of uncertainty components, $a_r$ is a sensitivity coefficient obtained from partial derivatives relating the contribution of error in component "r" to the total error, $u_{\varepsilon_r}$ is the uncertainty of the error distribution of component "r" and $\rho_{\varepsilon_r,i}$ is a correlation coefficient between components "r" and "i". If the uncertainty components are independent, then $\rho_{\varepsilon_r,i}$ is 0, which allows the equation $u_T$ to be simplified to (Equation 3B):

$$u_T = \sqrt{\sum_{r=1}^{k} a_r^2 u_{\varepsilon_r}^2}$$

Accordingly, Equation 3A and 3B provides a general form of the addition rule, where the total variance is obtained by combining individual variances using sensitivity coefficients and correlation coefficients. If the uncertainty components are independent, then the correlation coefficient is 0, allowing for simplification of the equation. Therefore, the uncertainties for each of the three outdoor air fractions can be estimated as shown below. The CO2 measurements and mass balance give (Equation 4A and Equation 5A):

Equation 4A $$\mu_{\hat{X}_{oa,CO2}} = \sqrt{\left(\frac{\partial \hat{X}_{oa}}{\partial C_{CO2,sa}}\right)^2 \mu_{C_{CO2,sa}}^2 + \left(\frac{\partial \hat{X}_{oa}}{\partial C_{CO2,ra}}\right)^2 \mu_{C_{CO2,ra}}^2 + \left(\frac{\partial \hat{X}_{oa}}{\partial C_{CO2,oa}}\right)^2 \mu_{C_{CO2,oa}}^2}$$ (EQ4A)

Equation 5A $$\mu_{\hat{X}_{oa,CO2}} = \sqrt{\left(\frac{1}{(C_{CO2,oa} - C_{CO2,ra})}\right)^2 \mu_{C_{CO2,sa}}^2 + \left(-\frac{C_{CO2,oa} - C_{CO2,sa}}{(C_{CO2,ra} - C_{CO2,oa})}\right)^2 \mu_{C_{CO2,ra}}^2 + \left(\frac{C_{CO2,ra} - C_{CO2,sa}}{(C_{CO2,oa} - C_{CO2,ra})}\right)^2 \mu_{C_{CO2,oa}}^2}$$ (EQ5A)

the temperature measurements and energy balance give (Equation 4b and Equation 5b):

Equation 4B $$\mu_{\hat{X}_{oa,T}} = \sqrt{\left(\frac{\partial \hat{X}_{oa}}{\partial C_{Tma}}\right)^2 \mu_{C_{Tma}}^2 + \left(\frac{\partial \hat{X}_{oa}}{\partial C_{Tra}}\right)^2 \mu_{C_{T,ra}}^2 + \left(\frac{\partial \hat{X}_{oa}}{\partial C_{oa}}\right)^2 \mu_{C_{T,oa}}^2}$$ (EQ4B)

Equation 5b $$\mu_{\hat{X}_{oa,T}} = \sqrt{\left(\frac{1}{(T_{oa} - T_{ra})}\right)^2 \mu_{T_{ma}}^2 + \left(-\frac{T_{oa} - T_{ma}}{(T_{ra} - T_{oa})}\right)^2 \mu_{T_{ra}}^2 + \left(\frac{T_{ra} - T_{ma}}{(T_{oa} - T_{ra})}\right)^2 \mu_{T_{oa}}^2}$$ (EQ5B)

the $pm_{2.5}$ measurements and mass balance give (Equation 4C and Equation 5C):

Equation 4C $$\mu_{\hat{X}_{oa,pm2.5}} = \sqrt{\left(\frac{\partial \hat{X}_{oa}}{\partial C_{pm2.5ma}}\right)^2 \mu_{C_{pm2.5ma}}^2 + \left(\frac{\partial \hat{X}_{oa}}{\partial C_{pm2.5ra}}\right)^2 \mu_{C_{pm2.5ra}}^2 + \left(\frac{\partial \hat{X}_{oa}}{\partial C_{pm2.5oa}}\right)^2 \mu_{C_{pm2.5oa}}^2}$$ (EQ4C)

-continued

Equation 5C $$\mu_{\hat{X}_{oa,pm2.5}} = \sqrt{\left(\frac{1}{(C_{pm2.5oa} - C_{pm2.5ra})}\right)^2 \mu_{C_{pm2.5ma}}^2 + \left(-\frac{C_{pm2.5oa} - C_{pm2.5ma}}{(C_{pm2.5ra} - C_{pm2.5oa})}\right)^2 \mu_{C_{pm2.5ra}}^2 + \left(\frac{C_{pm2.5ra} - C_{pm2.5ma}}{(C_{pm2.5oa} - C_{pm2.5ra})}\right)^2 \mu_{C_{pm2.5oa}}^2}$$ (EQ5C)

where Equations 4A, 4B, and 4C depict the general form of an uncertainty calculation, whereas Equations 5A, 5B, and 5C depict the same equation with the partial derivative substituted with the partial derivative from equations 1A, 1B, 1C.

Accordingly, the integrated sampling system 640 employs mass balance analysis to determine a weighted outdoor air fraction. The integrated sensors 652 used to measure the first, second, and third species are equipped with associated uncertainties, and the resulting uncertainties are incorporated into the model to provide a more accurate estimate of the outdoor air fraction. The estimated weighted outdoor air fraction can be used to assess the ventilation rate of a building and identify potential sources of indoor air pollution. The systems and methods employed by the integrated sampling system 640 can be extended to other species that may be of interest to the user. For instance, if the user is interested in monitoring volatile organic compounds (VOCs), the apparatus can be configured to measure the concentration of different VOCs, estimate the outdoor air fraction based on the measurements, and assess the overall air quality of the building.

All the variables shown above can be readily available as either sensor measurements or known measurement uncertainties calculated a priori from manufacturer's data. In some embodiments, it may be necessary for the processing circuit 648 to normalize the measurement uncertainties for different physical measurements. In various embodiments, multiple individual estimates can be combined into a single combined estimate that minimizes the combined uncertainty. In particular, the combination can include the calculations shown in Table 1, where: $\hat{X}_{12...x}$ denotes the combined measurement, $Z_i$ denotes individual measurement "i", and $\mu_i$ denotes the uncertainty in individual measurement "i". Bayes' theorem allows additional individual estimates to be added recursively as shown below (Table 1):

TABLE 1

| Combined Estimate Weights (Bolded Font) | | |
|---|---|---|
| # Estimates | Combined Estimate | Uncertainty in Combined Est. |
| 2 | $\hat{X}_{12} = Z_1 \frac{\mu_2^2}{\mu_1^2 + \mu_2^2} + Z_2 \frac{\mu_1^2}{\mu_1^2 + \mu_2^2}$ | $\hat{\mu}_{12} = \frac{\mu_1^2 \mu_2^2}{\mu_1^2 + \mu_2^2}$ |

TABLE 1-continued

| # Estimates | Combined Estimate Weights (Bolded Font) | |
| | Combined Estimate | Uncertainty in Combined Est. |
| --- | --- | --- |
| 3 | $\hat{X}_{123} = \hat{X}_{12} \dfrac{\mu_3^2}{\hat{\mu}_{12}^2 + \mu_3^2} + Z_3 \dfrac{\hat{\mu}_{12}^2}{\hat{\mu}_{12}^2 + \mu_3^2}$ | $\hat{\mu}_{123} = \dfrac{\hat{\mu}_{12}^2 \mu_3^2}{\hat{\mu}_{12}^2 + \mu_3^2}$ |
| 4 | $\hat{X}_{1234} = \hat{X}_{123} \dfrac{\mu_4^2}{\hat{\mu}_{123}^2 + \mu_4^2} + Z_4 \dfrac{\hat{\mu}_{123}^2}{\hat{\mu}_{123}^2 + \mu_4^2}$ | $\hat{\mu}_{1234} = \dfrac{\hat{\mu}_{123}^2 \mu_4^2}{\hat{\mu}_{123}^2 + \mu_4^2}$ | where Table 1 and the combined estimates are applied below.

In one illustrative example, a real-time (or near real-time) estimate of the outdoor air fraction using CO2 and temperature measurements and their measurement uncertainties can be (Equation 6):

$$\hat{X}_{oa} = \hat{X}_{oa,CO2} \cdot w_1 + \hat{X}_{oa,T} \cdot w_2$$

with weights (Equations 7):

$$w_1 = \frac{\mu_{\hat{X}_{oa,T}}^2}{\mu_{\hat{X}_{oa,CO2}}^2 + \mu_{\hat{X}_{oa,T}}^2}$$

$$w_2 = \frac{\mu_{\hat{X}_{oa,CO2}}^2}{\mu_{\hat{X}_{oa,CO2}}^2 + \mu_{\hat{X}_{oa,T}}^2}$$

where $\hat{X}_{oa}$ is the outside air fraction, $\hat{X}_{oa,CO2}$ is the outdoor air fraction as calculated with CO2 measurements, $\hat{X}_{oa,T}$ is the outdoor air fraction as calculated with temperature measurements, and $\mu$ is the uncertainty of the corresponding measurement in the subscript.

These weighting factors can continuously update based on new measurements. For example, if the difference between $T_{oa}$ and $T_{ra}$ becomes very small this will cause $\mu_{\hat{X}_{oa},T}$ to become very large causing weight $w_2$ to become very small so that the combined estimate can be mostly a function of the $CO_2$ measurements.

The estimate uncertainty can be (Equation 8):

$$\hat{\mu}_{\hat{X}_{oa}} = \frac{\mu_{\hat{X}_{oa,CO2}}^2 \mu_{\hat{X}_{oa,T}}^2}{\mu_{\hat{X}_{oa,CO2}}^2 + \mu_{\hat{X}_{oa,T}}^2}$$

where the subscripts indicate the measurement followed by the calculation method. For example, $\mu_{\hat{X}_{oa},CO2}^2$ is the uncertainty of the outdoor air fraction as calculated using CO2 measurements. As oa, shown, the combined uncertainty can decrease as the number of individual estimators increases.

In some embodiments, the processing circuit 648 can be configured to estimate filtration efficiency. In general, estimating filtration efficiency of an air handling unit (AHU) can aid in modeling the spread of infections inside buildings, as filtration efficiency is strongly correlated with clean air delivery rates. This can help in implementing effective measures to prevent the spread of airborne illnesses. Secondly, understanding when to increase or decrease the Minimum Efficiency Reporting Value (MERV) rating of AHU filters is important for promoting both health and sustainability goals. By optimizing the MERV ratings, the air quality of a building can be enhanced while minimizing the energy consumption of the AHU. Thirdly, estimating filtration efficiency can assist in determining when AHU filters should be replaced, thereby ensuring optimal filter performance. Fourthly, benchmarking filter effectiveness across a portfolio of buildings can help in identifying underperforming systems and addressing them. Finally, optimizing the cost of AHU-based filtering versus in-zone filtering can help in achieving overall building filtering goals and requirements in a more cost-effective way.

In some embodiments, the AHU filtration efficiency can be estimated using particulate measurements obtained from integrated sampling system 640. Specifically, low-cost commercial-grade particulate sensors can measure the cumulative total mass of particle diameters smaller than the listed particulate diameter per volume in mg/m³. For instance, a typical commercial-grade PM2.5 sensor measures the concentration of particles with an aerodynamic diameter less than or equal to 2.5 micrometers, as shown below (Equation 9):

$$C_{pm2.5} = \frac{\int_{0\,\mu m}^{spec\,D} m_{pm}(D)dD}{V}$$

where $m_{pm}(D)$ is the mass of the sampled particles with diameter D, spec D is the specified sensor particle diameter (e.g., $pm_1$, $pm_{2.5}$ and $pm_{10}$ are common), and V is volume. The particle filtration efficiency is calculated as the ratio of the particulate mass removed by the filter to the incoming particulate mass.

For a 2.5 µm sensor, the dimensionless filtration efficiency can be (Equation 10):

$$\eta_{filter,2.5\,\mu m} = \frac{\int_{0\,\mu m}^{2.5\,\mu m} m_{pm}(D)dD\bigg|_{ma} - \int_{0\,\mu m}^{2.5\,\mu m} m_{pm}(D)dD\bigg|_{sa}}{\int_{0\,\mu m}^{2.5\,\mu m} m_{pm}(D)dD\bigg|_{ma}}$$

where $\eta_{filter,2.5\,\mu m}$ is the filtration efficiency for particles 2.5 µm and smaller.

Or more, using the sensor measurements (Equation 11):

$$\eta_{filter,2.5\,\mu m} = \frac{C_{pm2.5ma} - C_{pm2.5sa}}{C_{pm2.5ma}}$$

where $C_{pm2.5ma}$ is the concentration of PM 2.5 in the mixed air stream (MA).

Each of Equations 6-8 can be useful for understanding when to replace filters, benchmarking filter effectiveness across a portfolio, and optimizing the use of AHU-based filtering versus in-zone filtering to achieve overall building filtering goals and requirements. Furthermore, this approach can be used to determine the filtration efficiency for other sensor particle sensors ($pm_1$, $pm_{10}$, . . . ).

In addition to low-cost commercial-grade particulate sensors, some expensive industrial sensors can provide detailed size-resolved particulate information over many bin diameters. By using these sensors, it is possible to estimate the filtration efficiency of the AHU for narrow ranges of particle diameters that align with the bins. For instance, if a bin that spans particle diameters between 2 μm and 2.5 μm is available, the filter efficiency over this narrow band can be calculated using Equation 12:

$$\eta_{filter,2-2.5\ \mu m} = \frac{\int_{2\ \mu m}^{2.5\ \mu m} mg_{pm}(D)dD\Big|_{ma} - \int_{2\ \mu m}^{2.5\ \mu m} mg_{pm}(D)dD\Big|_{sa}}{\int_{2\ \mu m}^{2.5\ \mu m} mg_{pm}(D)dD\Big|_{ma}}$$

This type of information can provide a more precise estimate of filter performance, particularly for filters that are designed to capture particles in specific size ranges. By using sensors that provide size-resolved data, it is possible to identify whether a filter is performing as expected and whether it is effectively capturing particles in the target size range. In some embodiments, this information can be important for evaluating filter performance and making decisions about filter replacement or upgrades.

In some embodiments, the use of PM sensors (e.g., integrated sensors 652 or zone sensors 670) can be leveraged to measure the field filtration efficiency of an air-handler. For example, zone sensors 670 can be installed on air handlers, such as air handling units (AHUs) (e.g., air system 600), and the pre-filter/post-filter data of PM can be observed to measure the filtration efficiency accurately. In another example, integrated sensors 652 can received air stream samples from various portions of the air system 600, and the pre-filter/post-filter data of PM can be observed to measure the filtration efficiency accurately. Active experiments can also be performed to measure the difference in filtration efficiency when changing from one type of filter to another, such as from MERV 7 to MERV 13. By accurately measuring the filtration efficiency, the processing circuit 648 can be determined when the AHU filter MERV ratings should be increased or decreased to support health and sustainability goals, when AHU filters should be replaced, or when benchmarking filter effectiveness across a portfolio, among other applications.

In some embodiments, the PM sensors (e.g., integrated sensors 652) can be used by processing circuit 648 to determine envelope leakage. For instance, the integrated sampling system 640 can determine the particle distribution in the zone air (e.g., collected by zone sensors 670) or return air collected by integrated sensors 652 by comparing it with the outdoor air distribution and identifying the part of the zone air particulates that share the same or a similar distribution as the outdoor air. The processing circuit 648 can then compare this distribution with the particle distribution in the supply air to detect any envelope leakages. If there is a small outdoor component in the supply air and a large component in the zone air, envelope leakages are likely present.

By analyzing the data from these sensors (e.g., integrated sensor 152 and zone sensors 170) the processing circuit 648 can accurately determine the filtration efficiency of the air-handler, and make decisions on when to increase or decrease the MERV rating of the filters, when to replace them, or how to benchmark their effectiveness. The sensors can also measure the concentration of particles in different size bins, which can be useful for determining the source of the particles and the degree of infiltration. For example, the size distribution of particles in the outside air can be compared to that in the indoor zones to determine the degree of infiltration. Thus, the integrated sampling system 640 provides a way to accurately measure and monitor the filtration efficiency of an air-handler, which can help support health and sustainability goals by improving indoor air quality and reducing energy usage. The use of PM sensors in the integrated sampling system 640 of the air-handling units (AHUs) can provide valuable information on the effectiveness of air filters and overall indoor air quality. The processing circuit 648 can leverage this information to determine when to replace filters, increase or decrease their Minimum Efficiency Reporting Value (MERV) rating, and assess the effectiveness of filtration across a portfolio of buildings. By monitoring the concentration of particulate matter in different size bins, the sensors can provide insights into the source and type of particles in the air.

Figure 16:
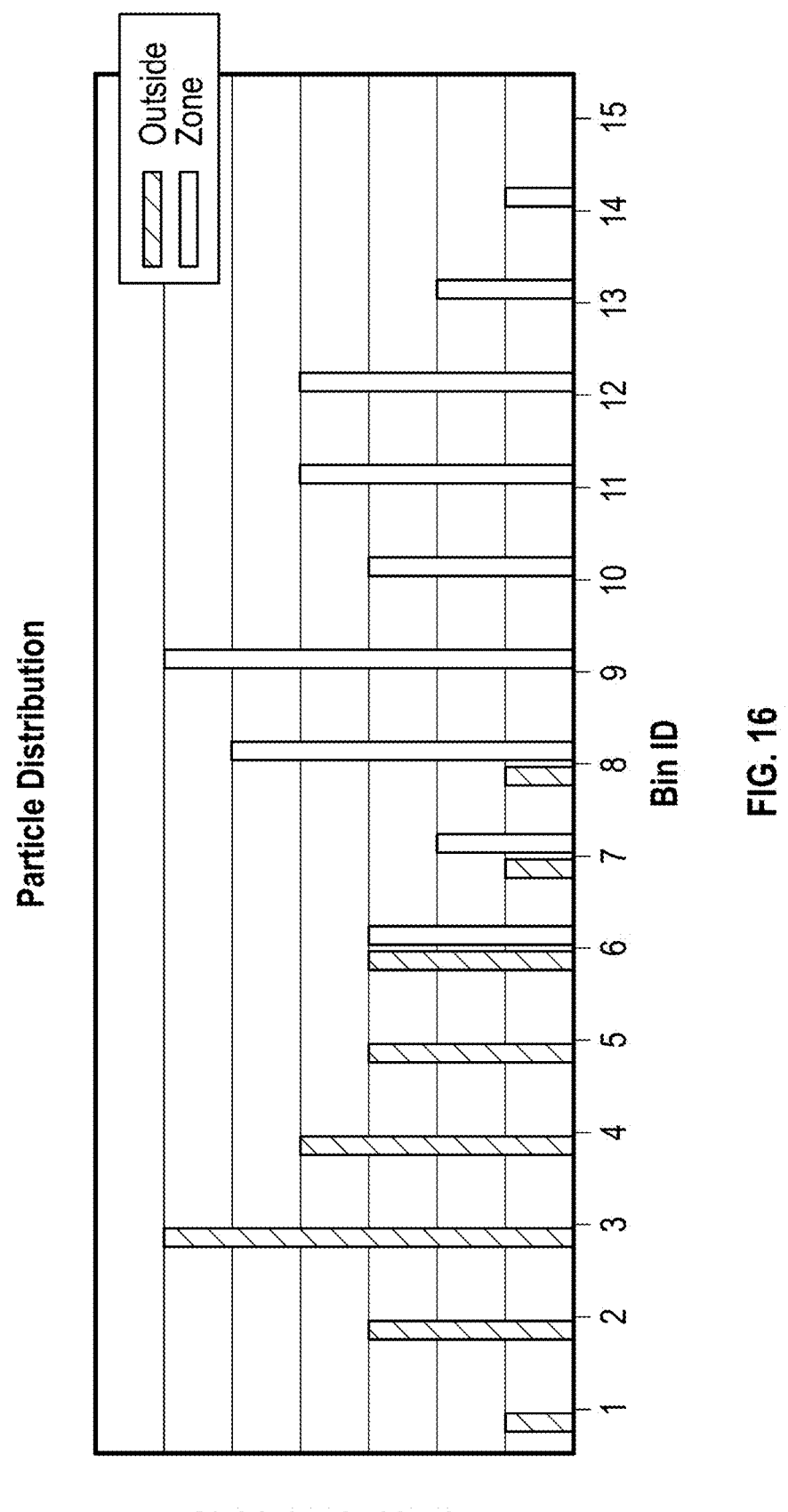
FIGS. 16-19 depict graphs of particle distribution of particles categorized by bin, according to some embodiments.
Figure 17:
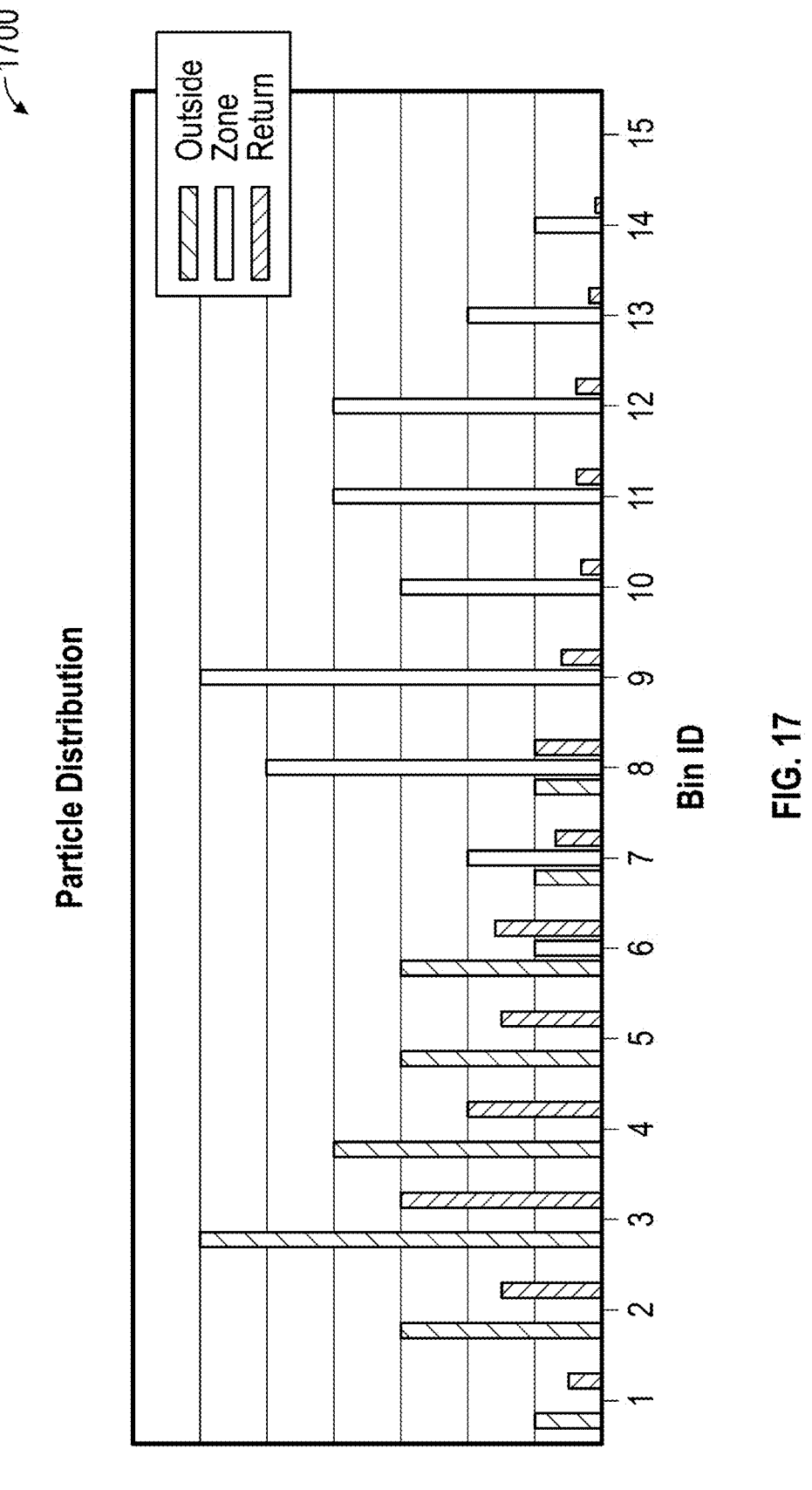
Figure 18:
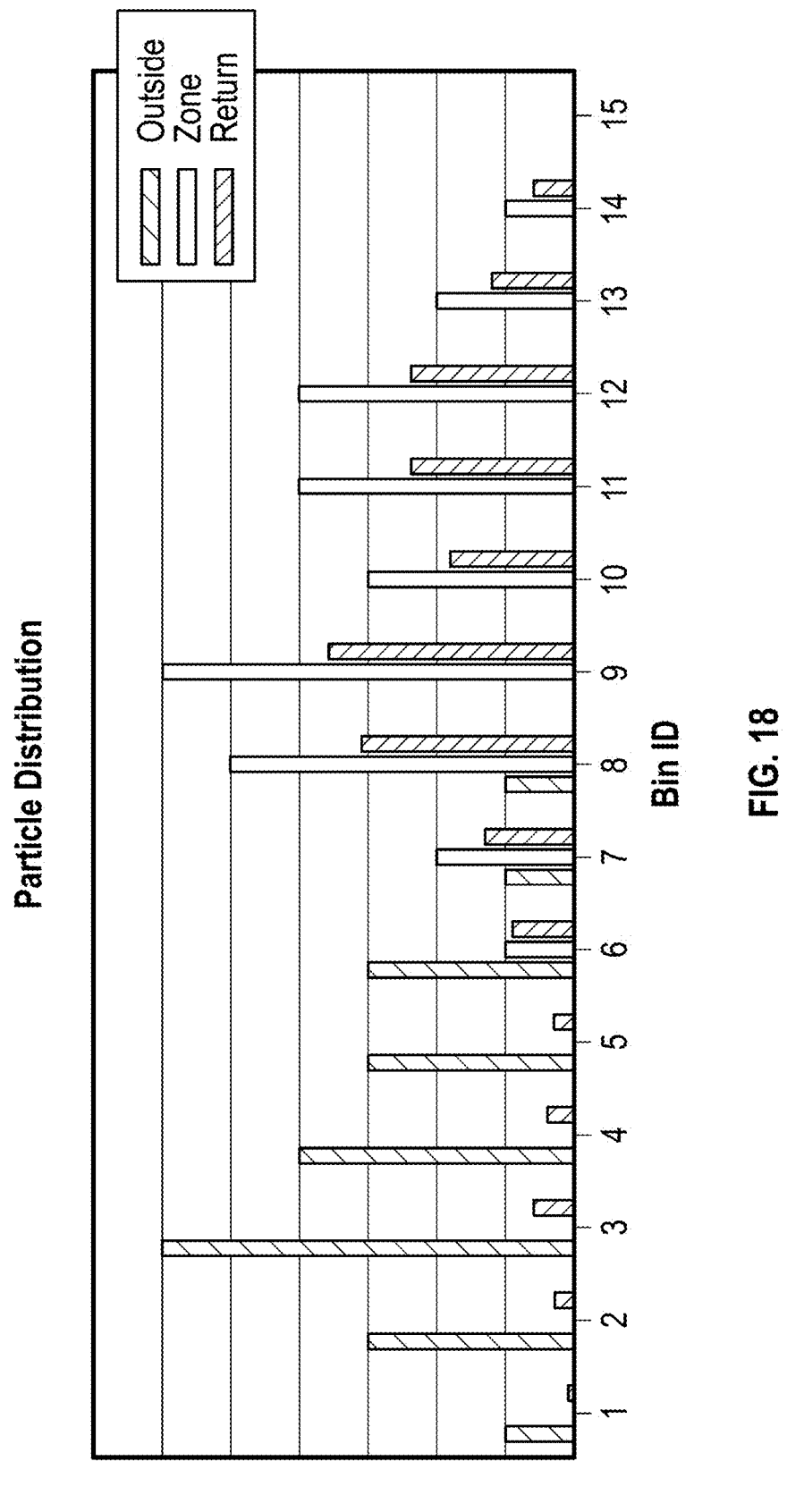

For example, graph 1600 (FIG. 16) of particle size distribution can indicate the relative concentration of larger versus smaller particles, with lower numbered bins indicating smaller particles. Comparing the outdoor and indoor zones in graph 1600, it may be observed that outdoor air tends to contain more small particles, which can infiltrate the indoor space. Another example is shown in graph 1700 (FIG. 17), which displays the particle distribution for the return air. By comparing the particle size distribution to that of the outdoor air, the processing circuit 648 can determine the amount of infiltration. In this case, if the distribution of the return air closely matches that of the outdoor air, it indicates high infiltration. This information can be used to identify the source of the infiltration and address any leaks or issues with the building envelope. In contrast, graph 1800 (FIG. 18) shows that the return air closely matches the particle distribution in the indoor zone, indicating very low infiltration. This information is useful for understanding how well the building envelope is sealed and how well the air-handling unit is working to maintain good indoor air quality.

In some embodiments, some PM sensors (e.g., integrated sensors 652) can sense not only the presence of particles in the air but also characteristics of the particles. For example, PM sensors can be configured to sense particles of different sizes and/or count the number of particles of different sizes. In some implementations, the PM sensors may determine particle sizes according to different size bins, such that the sensors determine the number of particles in each bin. Any bin sizes or particle sizes associated with the bins can be used in various implementations. The PM sensors can additionally or alternatively sense other characteristics of the particles, such as the type of the particles.

In some embodiments, PM sensors (e.g., integrated sensors 652) can be used by the processing circuit 648 to determine the source of pollutants in a space, such as a room, building, or area. For example, a PM sensor can be placed or pipe 630 can be placed in the outdoor air stream 614 to observe the particle size distribution, a PM sensor can be placed or pipe 634 can be placed in the supply air stream 636 to observe the particle size distribution, and/or a PM sensor can be placed in the occupied zone or space or pipe 628 can be placed to observe the particle size distribution. By comparing the particle size distribution of the supply air stream with that of the outdoor air, it can be determined whether the particles in the supply air are only from outside or if they include particles from other sources. If the supply air particle concentration is low relative to the outdoor concentration, then the apparatus can determine that supply is not contributing to the PM in the space. The processing circuit 648 can also compare the size distribution of the supply air stream with that in the zone and subtract the outdoor distribution from the indoor data to determine the indoor component. By understanding the sources of pollutants, it is possible to develop strategies for mitigating them and improving air quality in the space.

As described above, the integrated sampling system 640 can include a single sensor package or a set of sensor packages that can measure different variables such as particle distribution, CO2, PM, temperature, and relative humidity (RH). The integrated sampling system 640 is integrated to draw air samples from different streams such as outdoor air 614, return air 602, mixed air 618, and/or supply air streams 636. For example, the integrated sampling system 640 may include four barbed fittings on the enclosure's exterior to facilitate running sampling tubes to each of the four areas listed above. Alternatively, the integrated sampling system 640 can sample each of the four points across the same sensor array to cancel out any offset calibration errors in the sensor.

Accordingly, the package design could also be used to measure applied filter efficiency. The CO2 data, PM data, and/or T/RH data could be used to determine the percentage of outdoor air in multiple different ways, and the system could report the median of the three techniques as the percentage of (%) outside air (described above with reference to the weighted estimate of outdoor air fraction). If one method yields a different result, the processing circuit 648 could initiate a sensor diagnostic to determine the error. Additionally, using the temperature and relative humidity data, the package design could calculate the energy cost or benefit of bringing in ventilation air, whether permanently or temporarily.

In various implementations, the integrated sampling system 640 could be used to determine characteristics of the differences in particle distributions. For instance, besides using the differences seen in particle distribution at different sensors to identify the indoor or outdoor air quality and/or filtration efficiency/performance, the processing circuit 648 of the integrated sampling system 640 could also identify specific data about the particular types of particles sensed and/or size bin distributions. The apparatus may be used to determine that the distributions of particles in a particular size bin, such as a larger size bin, are different between the indoor and outdoor air measurements, but the distribution of particles in another size bin, such as a smaller size bin, are similar. In some such implementations, the apparatus may infer that the filtration devices are performing well for the larger particles but not as well for the smaller particles. In some such implementations, the apparatus may generate output information indicating the performance for the different size bins, providing an additional level of detail to the analysis.

Figure 6B:
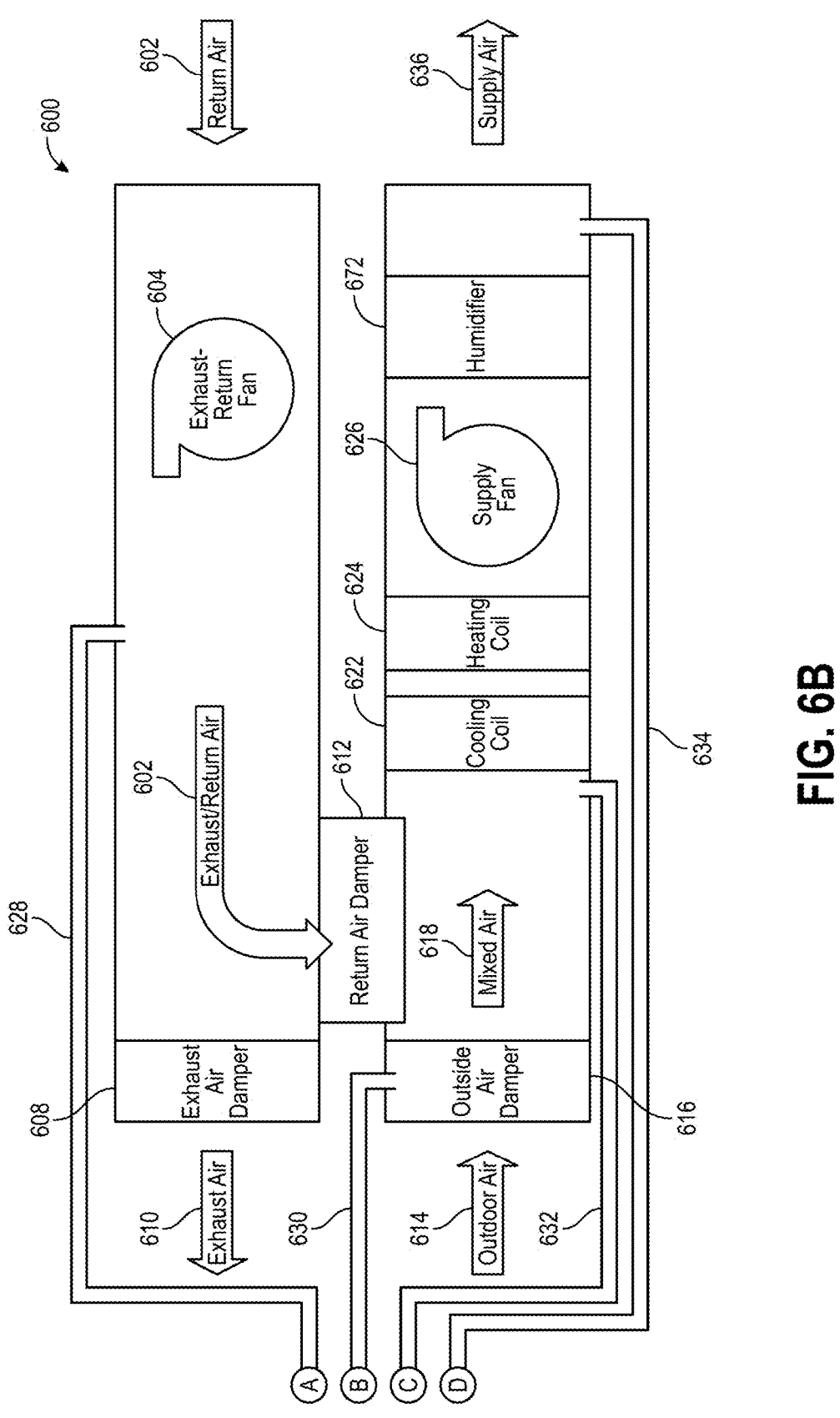
Figure 6C:
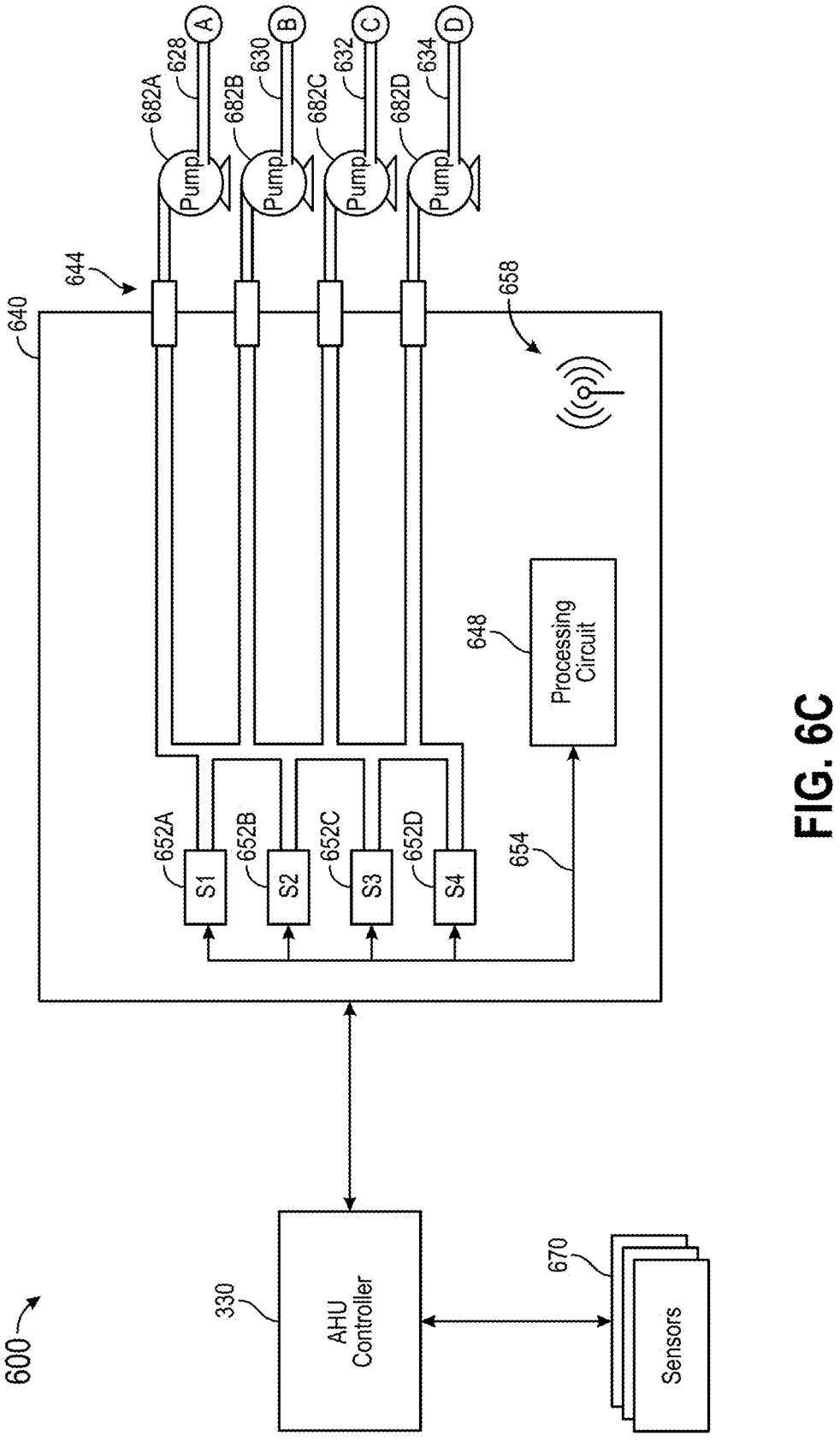
FIG. 6C is another air system of a building with an integrated sampling system that collects samples from the air system, according to some embodiments.
Figure 6D:
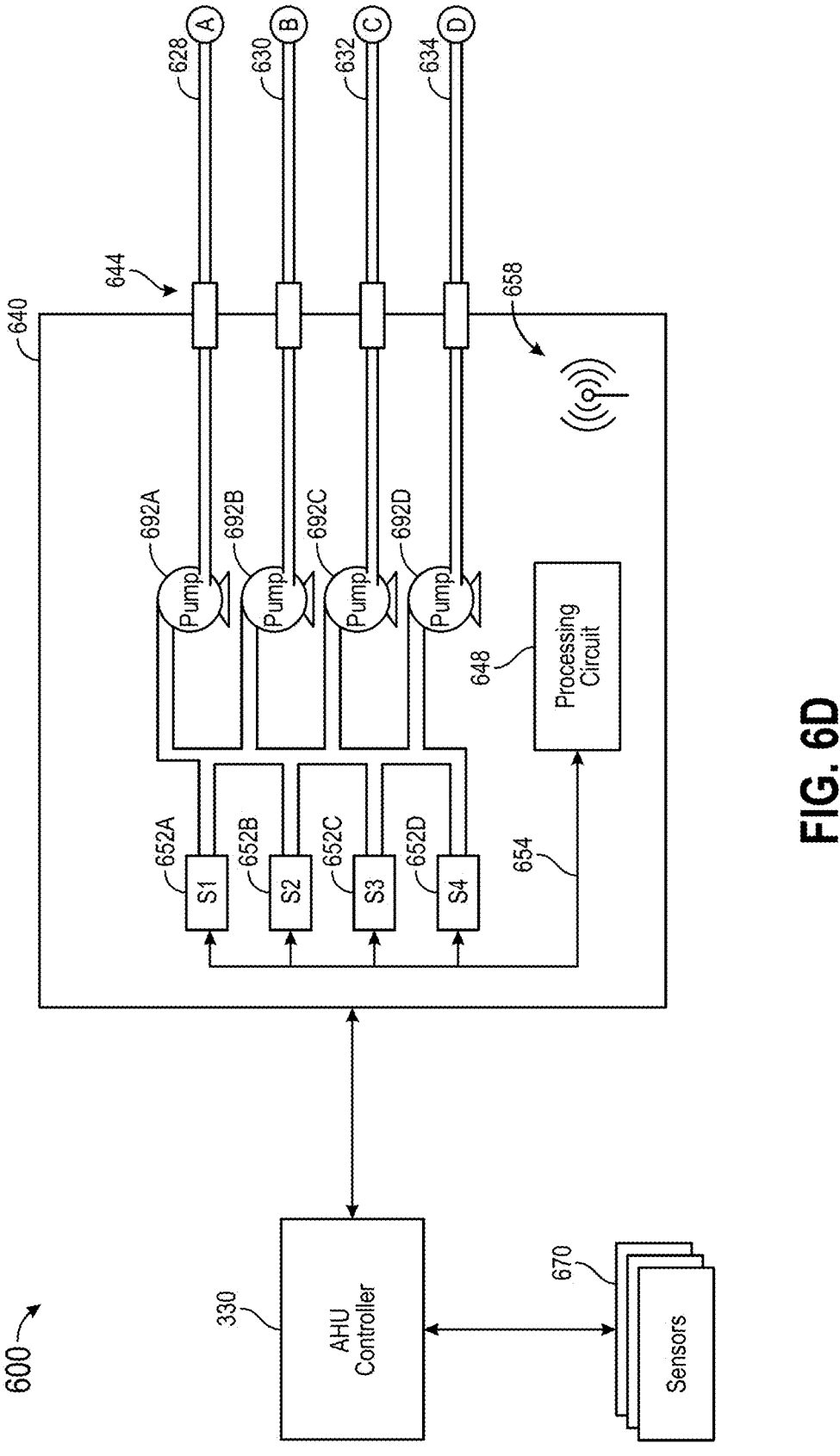
FIG. 6D is another air system of a building with an integrated sampling system that collects samples from the air system, according to some embodiments.

Referring now to FIG. 6B, the air system 600 of the building connected to the integrated sampling system 640 of FIGS. 6A, 6C, and 6D is shown, according to an exemplary embodiment. The air system 600 can receive return air 602. The return air 602 can be air returned from one or more spaces or zones of a building where occupants are located. Occupants and the materials of the building can produce one or more agents (e.g., carbon dioxide, particulate matter, volatile organic compounds (VOCs)). Additionally, the spaces or zones of the building may have one or more changing characteristics such as, but not limited to, temperature, occupancy, humidity, particulate distributions, etc.

The return air 602 can include particles of an agent and measurable identifiable characteristics of the space or zone. An exhaust-return fan 604 can suck the return air 602 in and dispel the return air 602 as exhaust air 610 through an exhaust air damper 608. The exhaust air 610 can be exhausted out of the building. The return air 602 can be provided to a return air damper 612 which can be mixed with outdoor air 614 that enters the air system 600 through an outside air damper 616. The mixed air 618, which can be a mix of the return air 602 and the outdoor air 614, can be passed through a cooling coil 622 and/or a heating coil 624. The cooling coil 622 and/or the heating coil 624 can be refrigerant and/or water-based coils that cool or heat the mixed air 618. A supply fan 626 can provide the conditioned air through a humidifier 672 before providing the air as supply air 636 back to spaces of the building, e.g., to VAV boxes serving various spaces of the building.

Piping 628, 630, 632, and 634 can be coupled to portion of the air system 600 and configured to collect or capture a plurality of air stream samples from various parts of the air system 600. Each piping (e.g., 628, 630, 632, and 634) can include fittings, couplings, adapters, etc. configured to couple the piping to the integrated sampling system 640 and various portions of the air system 600. For example, piping 628 can be coupled to the air system 600 to collect return air 602. In another example, piping 630 can be coupled to the air system 600 (in particular, the outside air damper 616) to collect outside air 614. In yet another example, piping 632 can be coupled to the air system 600 to collect mixed air 618. In yet another example, piping 634 can be coupled to the air system 600 to collect supply air 636. Additionally, as shown, each piping can be coupled to the integrated sampling system 640 via a coupling 644. It should be understood that additional or less piping can be added to the air system 600 to collect samples from other portions of the air system (e.g., at the exhaust air damper 608 to collect exhaust air 610, after the cooling coil 622 but before the heating coil 624 to collect cooled air).

In some embodiments, air system 600 may be configured to direct the air samples to the integrated sampling system 640 that can perform measurements and estimations of the collected air samples. In some embodiments, a building management system (BMS) controller 366 may be configured to receive result(s) of the testing from the integrated sensors 652 or estimation from processing circuit 648 of FIG. 6A, such as via a network connection (e.g., using network interface 658) between the integrated sampling system 640 and the BMS controller 366. In some embodiments, the results of estimation may be received by the AHU controller 330 and/or a cloud system, e.g., the building data platform described in U.S. patent application Ser. No. 17/134,664, filed Dec. 28, 2020, the entirety of which is incorporated by reference herein.

Referring now to FIG. 6C, an air system 600 of a building with an integrated sampling system 640 that collects samples from the air system 600 is shown, according to an exemplary embodiment. The air system 600 of FIG. 6C includes similar features and functionality described in detail with reference to air system 600 of FIG. 6A. However, as shown, an inline pump (e.g., 682A, 682B, and 682C, and 682D, collectively referred to herein as "inline pumps 682") can be connected to each location where an air stream sample is to be taken, and each inlet is opened by the processing circuit 648 to draw air into the inline pump 682. That is, unlike in FIG. 6A, the processing circuit 648 can selectively activate at least one of the plurality of inline pumps 686 to selectively provide air stream samples from one or more pipes of the piping (e.g., 628, 630, 632, 634) and estimate one or more air quality indicators of the air handling unit based on the measured air stream sample from the one or more integrated sensors 652. As shown, the inline pumps 682 are positioned externally to the integrated sampling system 640. For example, the inline pumps 682 may be positioned closer to the intake of the air stream than the integrated sampling system 640 to improve the accuracy of the air stream sample.

Using the inline pumps 682 can help overcome challenges associated with sampling air streams in buildings with complex ductwork. In some cases, air streams may be difficult to access or may require specialized equipment to sample. By using inline pumps 682, air stream samples can be taken from a variety of locations in the air system without the need for additional equipment or modifications to the existing ductwork. In addition, the use of inline pumps 682 can also help increase the efficiency of the sampling process. By drawing air into the pump, the sample is actively collected and delivered to the integrated sensors 652 for measurement. This can be faster and more efficient than passive sampling methods, which rely on particles settling on a surface or being drawn into a filter over time. Overall, the use of inline pumps 682 can improve the accuracy, accessibility, and efficiency of air stream sampling in air systems and help ensure that the measurements taken by the integrated sensors 652 accurately represent the current state of the air stream. By integrating the sampling system with the air system, this embodiment provides a convenient and efficient way to collect air samples from various locations in the building. This allows for the monitoring of air quality and the performance of the air handling system in real time. The data collected from the integrated sensors 652 can be used to optimize the air handling system, improve indoor air quality, and identify potential issues or areas for improvement.

Referring now to FIG. 6D, an air system 600 of a building with an integrated sampling system 640 that collects samples from the air system 600 is shown, according to an exemplary embodiment. The air system 600 of FIG. 6D includes similar features and functionality described in detail with reference to air system 600 of FIG. 6A and FIG. 6B. However, as shown, an inline pump (e.g., 692A, 692B, and 692C, and 692D, collectively referred to herein as "inline pumps 692") can be connected to each location where an air stream sample is to be taken, and each inlet is opened by the processing circuit 648 to draw air into the inline pump 692. That is, unlike in FIG. 6A, the processing circuit 648 can selectively activate at least one of the plurality of inline pumps 686 to selectively provide air stream samples from one or more pipes of the piping (e.g., 628, 630, 632, 634) and estimate one or more air quality indicators of the air handling unit based on the measured air stream sample from the one or more integrated sensors 652. As shown, the inline pumps 682 are positioned internally to the integrated sampling system 640. That is, unlike in FIG. 6C, the all the features and functionality of the integrated sampling system 640 can be housed in a single unit for ease of installation and maintenance.

Figure 8:
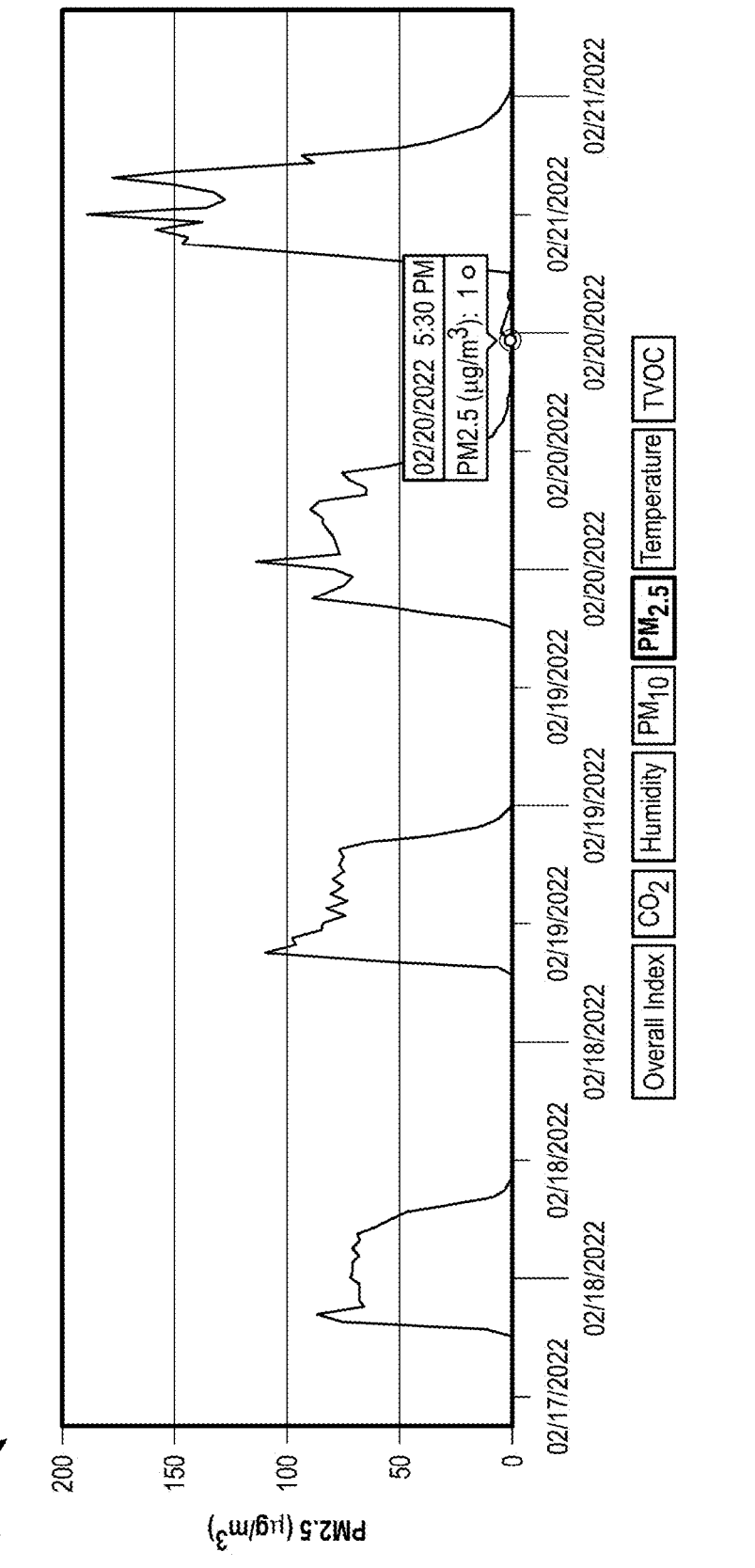
FIGS. 8-12, depicts graph of historical air quality after seeding various rooms using a humidifier, according to some embodiments.

Referring now to FIG. 8, graph 800 depicts historical air quality after seeding a room using a humidifier, according to some embodiments. In the context of indoor air quality, the use of an ultrasonic humidifier in a residential home during nighttime hours may impact the concentration of airborne particles, for example particularly those that are 2.5 micrometers or smaller in size (PM 2.5). Graph 800 of PM 2.5 levels measured in the room where the humidifier is installed, as described in the example, could demonstrate a potential increase in PM 2.5 concentration as a result of humidifier use. This increase may be attributed to several factors, such as the quality of water used in the humidifier, the type of humidifier, the level of humidity achieved, and the presence of other sources of indoor air pollution in the room or home. Furthermore, the increase in PM 2.5 levels may have health implications, particularly for individuals with respiratory conditions such as asthma, as exposure to high levels of PM 2.5 has been associated with adverse respiratory effects.

In an illustrative example, graph 800 depicts a residential home in which an ultrasonic humidifier is used during the nighttime hours to humidify the air, where graph 800 of the PM 2.5 measured in the room in which the humidifier is installed. As shown, the measured particle concentration increased dramatically when the humidifier is turned on at 10 µm and starts to decay when it is turned off around 7 am. This illustrates the significant impact that a humidifier can have on the concentration of airborne particles in an enclosed space, particularly if the humidifier is not properly maintained or if the water used in the humidifier contains contaminants that can contribute to the formation of particles.

Figure 9:
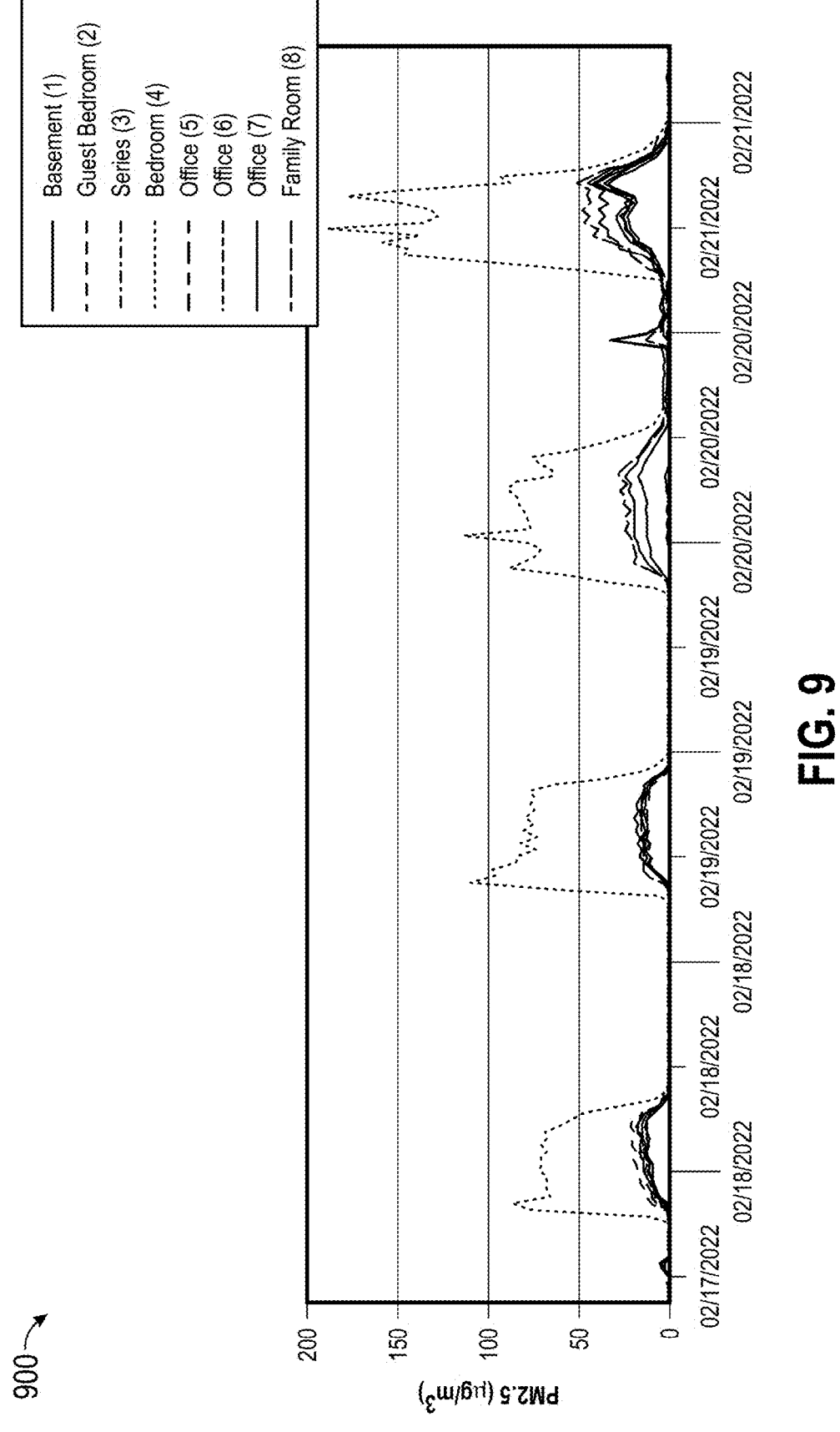

Referring now to FIG. 9, graph 900 depicts historical air quality after seeding various rooms using a humidifier, according to some embodiments. In addition to measuring the particle concentration in the room where the humidifier is located, sensors can be placed or installed throughout the house to measure the distribution of the particles. The PM2.5 measurements from various sensors placed throughout the house reveal that the particles generated from the humidifier make it to all parts of the house. Graph 900 shows that the particle concentration throughout the house follows a similar trend as the concentration in the room where the humidifier is located. This indicates that the humidifier is capable of distributing the particles evenly throughout the house, which can have both positive and negative impacts on IAQ depending on the source of the particles. With regard to graph 900, a MERV 12 filter was installed in the central HVAC system and a portable HEPA filter was placed in the office. The plot shows the PM2.5 concentrations at various sensors throughout the house, indicating the impact of the filtration system on improving IAQ.

Figure 10:
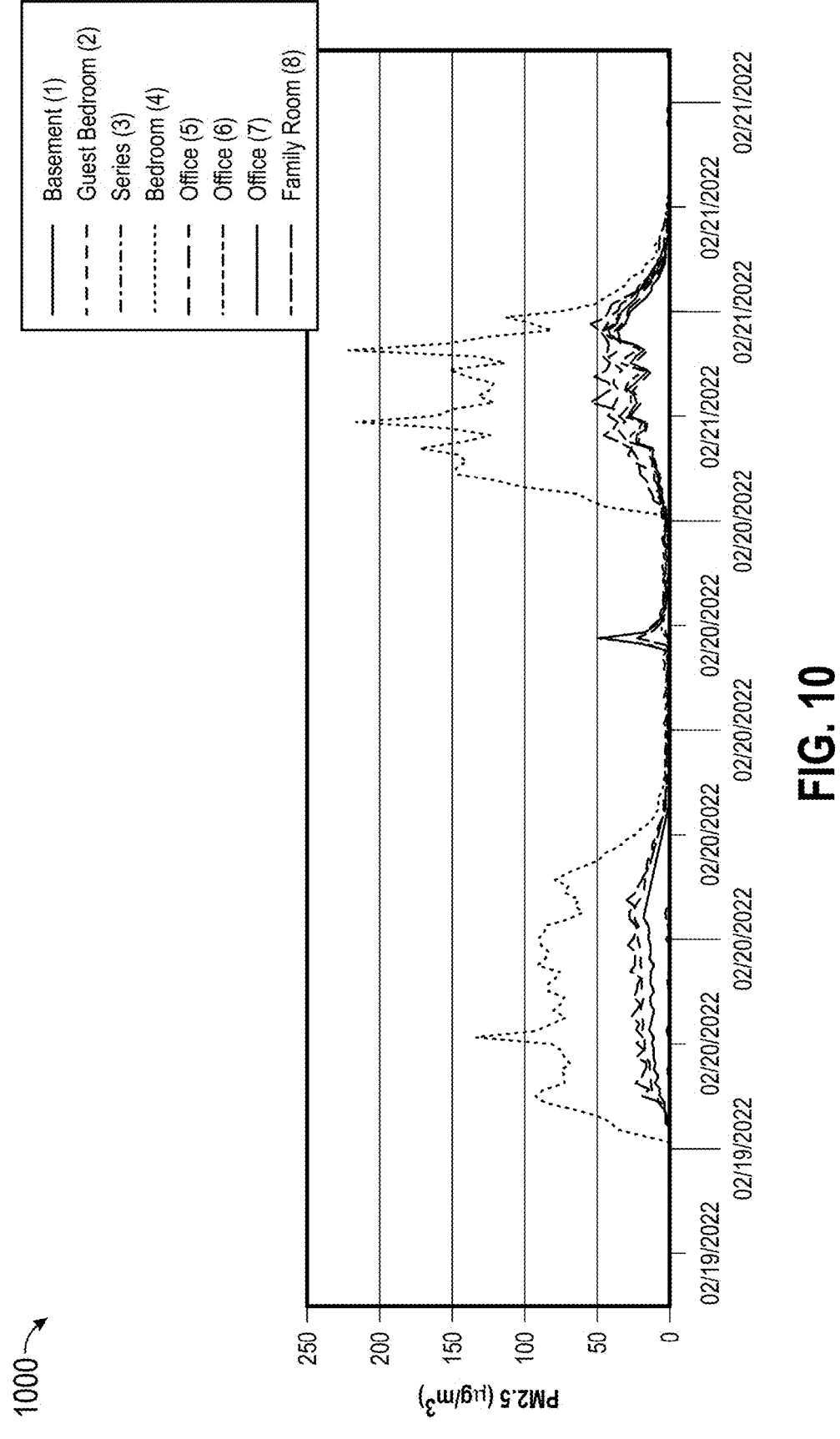

Referring now to FIG. 10, graph 1000 depicts historical air quality after seeding various rooms using a humidifier, according to some embodiments. On the next day with respect to graph 900, the MERV 12 filter was removed and the portable HEPA was not in operation. As shown, the lack of filtration led to significantly higher particle concentrations throughout the house as depicted in graph 1000.

Figure 11:
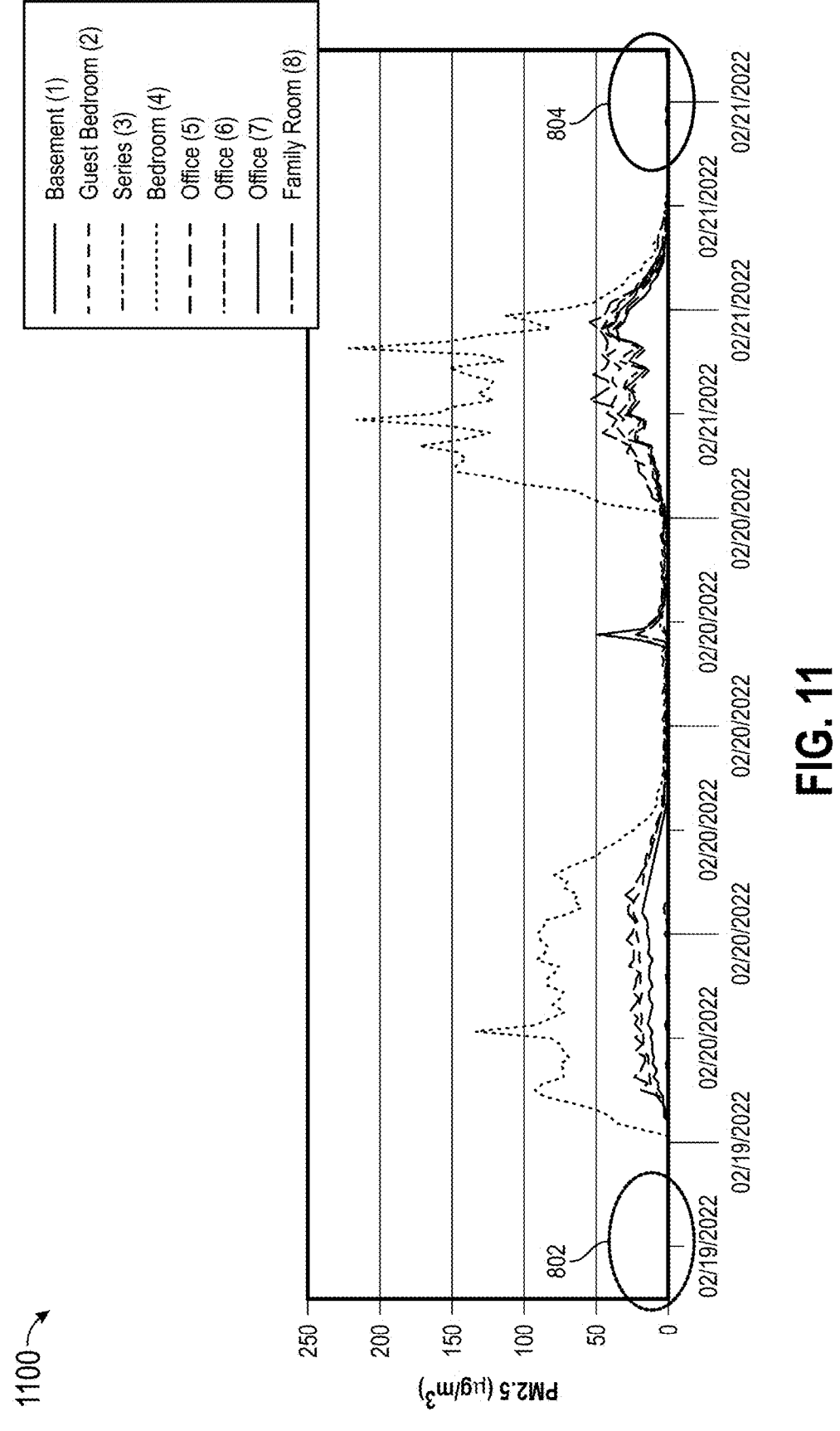

Referring now to FIG. 11, graph 1100 depicts historical air quality after seeding various rooms using a humidifier, according to some embodiments. Similarly, to graph 1000, graph 1100 depicts the next day with respect to graph 900. That is, graph 1110 demonstrates the potential usefulness of incorporating a humidifier as part of a field testing tool. Despite the filters being installed in the circled area 802 and not being installed in the circled area 804, it can be difficult to determine any differences in particle concentration before and after the humidifier was turned on and off. However, the use of the humidifier in combination with other testing tools, as shown in graphs 800-1000, can provide a more complete picture of the air quality in a given space and allow processing circuit 648 or controllers (e.g., 330 or 366) to identify potential sources of pollution.

Figure 12:
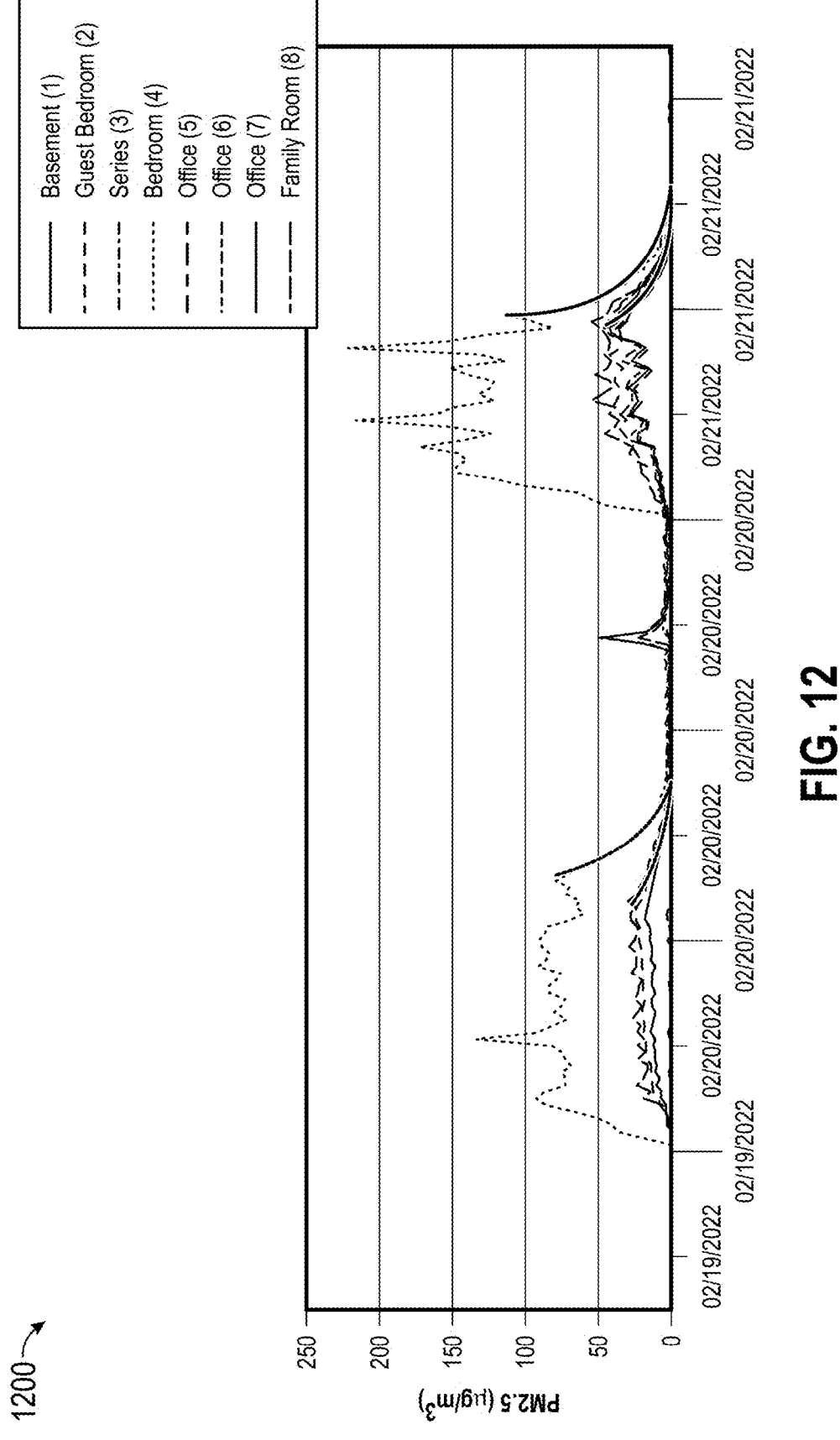

Referring now to FIG. 12, graph 1200 depicts historical air quality after seeding various rooms using a humidifier, according to some embodiments. In some embodiments, graph 1200 could be used by processing circuit 648 or controllers (e.g., 330 or 366) to evaluate the effectiveness of different filtration devices in removing airborne particles. By installing an ultrasonic humidifier and alternately turning it on and off, particle concentration can be measured in different areas of the building using particle sensors (e.g., zone sensors 670). Filtration effectiveness can then be measured by calculating the rate of particle removal just after the humidifier is turned off, with a higher rate of decline indicating better filtration. This approach can provide a practical and effective means of evaluating the performance of different air filtration systems in real-world settings.

Referring generally to FIGS. 8-12, a humidifier (e.g., 672 or installed in rooms) can be used to perform analysis on the IAQ of the building. In some embodiments, size of airborne particles in the air can pose a health risk, and the use of a humidifier can help control this issue. By varying the salt concentration of the water in the humidifier, the particle size distribution can be adjusted to match that of human respiratory droplets. Furthermore, high-resolution particle sensors can measure the particle concentration in different size bins, allowing for the analysis of particle size ranges and the determination of the filtration rate as a function of particle size. In some embodiments, the humidifier can be connected to a controller, such as AHU controller 330 or BMS controller 366, that can turn the humidifiers on and off at specific times, allowing for the performance of tracer tests to track the flow of particles and air movement throughout a space. This capability can help detect leaks, identify air flow patterns, and determine the direction and velocity of particulate matter. It should be noted that while an ultrasonic humidifier is often used, other humidification devices may also be suitable for this purpose.

Figure 13:
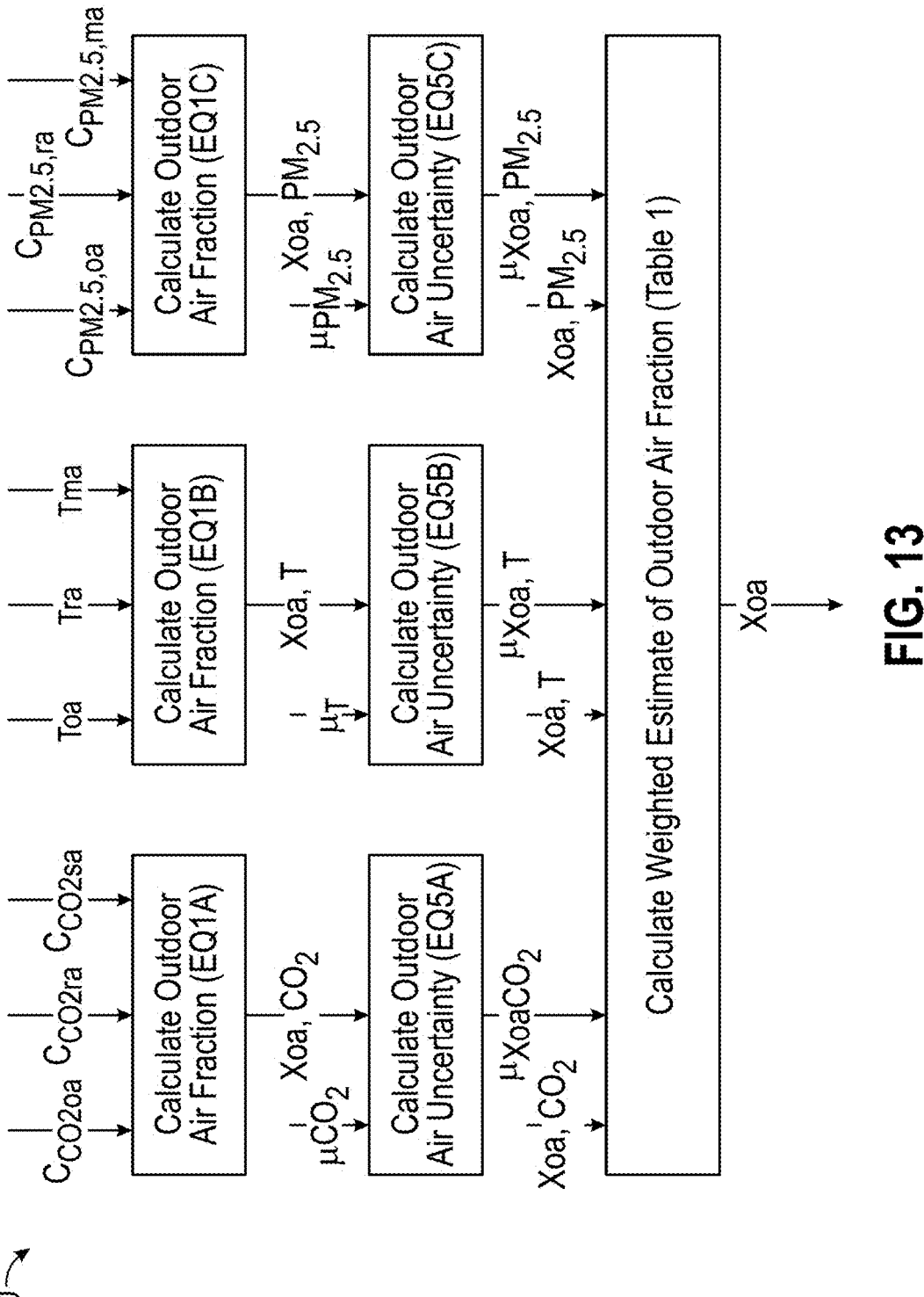
FIG. 13 depicts a flowchart for a method for calculating a weighted estimate of an outdoor air fraction, according to some embodiments.

Referring now to FIG. 13, a flowchart for a method 1300 for calculating a weighted estimate of an outdoor air fraction is shown, according to some embodiments. Processing circuit 648 can be configured to perform method 1300. Further, any computing device described herein can be configured to perform method 1300. The details and each of the equations are provided and described above with reference to FIG. 6A.

In broad overview of method 1300, the one or more processing circuits (e.g., processing circuit 648 in FIGS. 6A, 6C, and 6D) estimate the weighted outdoor air fraction based on modeling a plurality of outdoor air fractions by calculating a first outdoor air fraction of the plurality of outdoor air fractions based on a plurality of first measurements by a first sensor of the plurality of integrated sensors, wherein the plurality of first measurements are of a first species (Equation 1A), and generating a first outdoor air fraction uncertainty based on inputting the first outdoor air fraction and a first uncertainty of the first sensor (Equation 5A). Additionally, the one or more processing circuits can calculate a second outdoor air fraction of the plurality of outdoor air fractions based on a plurality of second measurements by a second sensor of the plurality of integrated sensors, wherein the plurality of second measurements are of a second species (Equation 1B), and generate a second outdoor air fraction uncertainty based on inputting the second outdoor air fraction and a second uncertainty of the second sensor (Equation 5B). In some embodiments, a third outdoor air fraction can be calculated using Equation 1C and Equation 5C. Next, the one or more processing circuits can estimate the weighted outdoor air fraction based on inputting the first uncertainty, the second uncertainty, a first mass balance of the first species, and a second mass balance of the second species (Table 1).

In some embodiments, the one or more processing circuits of the integrated sampling system 640 can be further configured to execute a sensor diagnostic of the plurality of integrated sensors, responsive to determining that the second outdoor air fraction is off by a predetermined factor from the first outdoor air fraction. In some embodiments, the predetermined factor can be a threshold value that is determined based on the level of accuracy desired for the outdoor air fraction calculation. For example, if the first and second size distributions are within the threshold value, it could indicate that the outdoor air stream is a source of pollutants, and the system may modify its control strategy accordingly. If the first and second size distributions are outside the threshold value, it could indicate that the supply air stream is a limited source of pollutants, and the system may maintain its current control strategy. Additional, fewer, or different operations may be performed depending on the particular arrangement. In some embodiments, some or all operations of method 1300 may be performed by one or more processors executing on one or more computing devices, systems, or servers. In various embodiments, each operation may be re-ordered, added, removed, or repeated. In some arrangements, blocks can be optionally executed (e.g., blocks depicted as dotted lines) by the one or more processors.

As shown with reference to method 1300, in some embodiments, in order to estimate the outside air fraction (e.g., air quality indicator), there are three possible methods that can be utilized including $CO_2$ measurements, temperature measurements, and particle matter measurements (PM). Utilizing two or more of these methods can improve the accurate of estimations by combining and weighting the individual calculated values. For example, if both temperature and PM measurements are available, both values can be combined and weighted accordingly to calculate a more accurate estimation of the outside air fraction. This information is useful in the processing circuit 648 determining the appropriate amount of outside air to introduce into a building, which can help improve indoor air quality and potentially reduce energy costs. In another example, if measurements of $CO_2$ and temperature are measured, the processing circuit 648 can calculate the outside air fraction using a formula that takes into account the difference between indoor and outdoor $CO_2$ concentrations and the difference between indoor and outdoor temperatures. This calculation can provide an estimate of the outside air fraction that can be used to adjust the HVAC system to maintain good air quality. In yet another example, the processing circuit 648 can calculate the outside air fraction using measurements of $CO_2$, temperature, and particulate matter (PM). In this case, the processing circuit 648 can use a formula that takes into account the individual contributions of each measurement and weights them accordingly. This can provide a more accurate estimate of the outside air fraction, which can be used to adjust the HVAC system to improve air quality in the building.

In some embodiments, statistical models such as linear regression or multivariate analysis can be used to combine measurements and uncertainties from multiple sensors. These models can assign weights to the measurements based on their relative accuracy and precision, and can also account for correlations between the different measurements. For example, a higher weight could be assigned to a measurement with lower uncertainty and higher accuracy.

Figure 14:
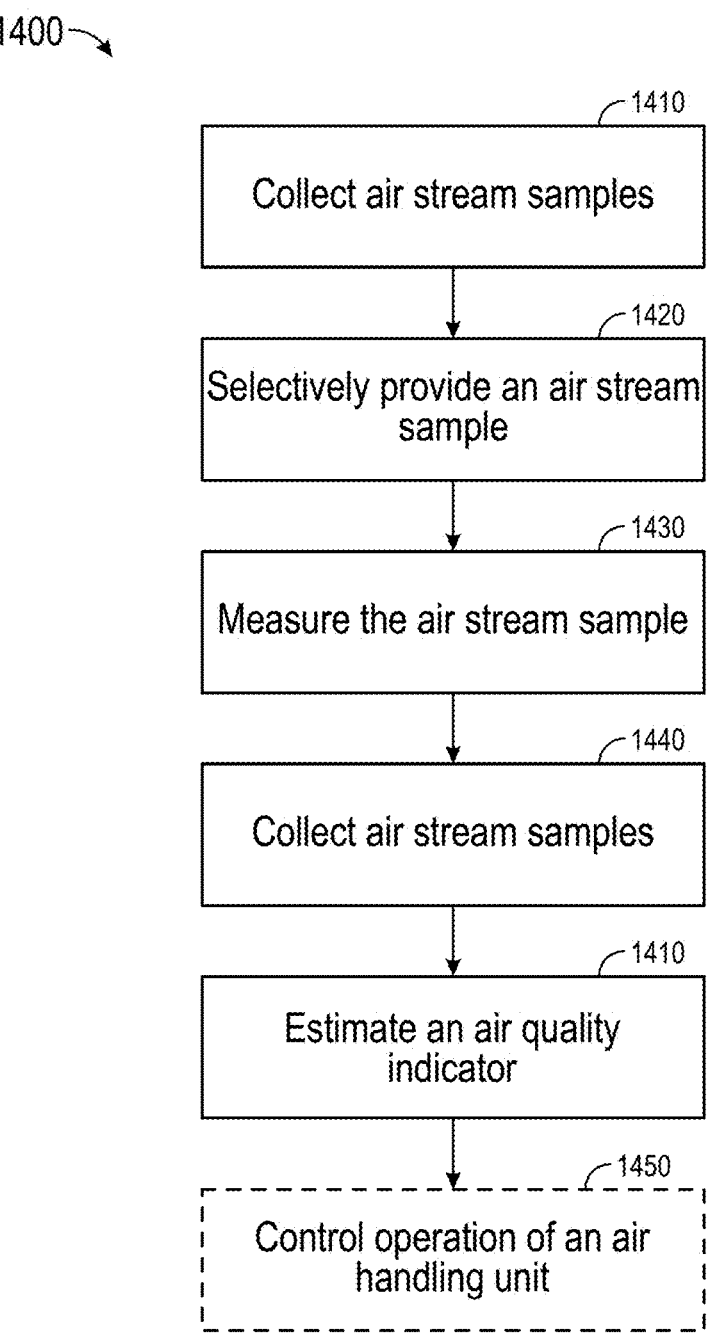
FIG. 14 depicts a flowchart for a method for particulate sensing of a building, according to some embodiments.

Additionally, models can be developed to estimate the level of uncertainty associated with the calculated outdoor air fraction, which can be used to provide a measure of the reliability of the estimate. In some embodiments, the model can be, but is not limited to, linear regression models (e.g., where the model can estimate the outdoor air fraction based on inputting the uncertainties and mass balances), neural networks (e.g., where the model can learn complex relationships between the input variables and the output variable, and can be trained to estimate the outdoor air fraction), Bayesian models (e.g., Referring now to FIG. 14, a flowchart for a method 1400 for particulate sensing of a building 10 is shown, according to some embodiments. Processing circuit 648 can be configured to perform method 1400. Further, any computing device described herein can be configured to perform method 1400. The details and each of the equations are provided and described above with reference to FIG. 6A.

In broad overview of method 1400, at block 1410, the integrated sampling system 640 can collect air stream samples. At block 1420, the integrated sampling system 640 can selectively provide an air stream sample. At block 1430, the integrated sampling system 640 can measure the air stream sample. At block 1440, the integrated sampling system 640 can estimate an air quality indicator. At block 1450, the integrated sampling system 640 can control operation of an air handling unit. Additional, fewer, or different operations may be performed depending on the particular arrangement. In some embodiments, some or all operations of method 1400 may be performed by one or more processors executing on one or more computing devices, systems, or servers. In various embodiments, each operation may be re-ordered, added, removed, or repeated. In some arrangements, blocks can be optionally executed (e.g., blocks depicted as dotted lines) by the one or more processors.

At block 1410, the integrated sampling system 640 can collect, from piping, a plurality of air stream samples. This includes collecting samples from various portions of the air system 600 and/or zones of the building. The integrated sampling system 640 can be configured to collect air stream samples from different locations within the air system 600. This can include collecting samples from various pipes or ducts that carry air from different parts of the building, such as different floors, rooms or zones. The air stream samples can be collected at various times to ensure that a representative measurement of the air is collected. This can include collecting samples during different weather conditions, different occupancy periods or at different times of the day. By collecting air stream samples from various locations inside the air system 600 and outside (e.g., using zone sensors 670) and at different times, the integrated sampling system 640 can provide a more comprehensive understanding of the air quality within a building and the performance of the HVAC system.

At block 1420, the integrated sampling system 640 can selectively provide, using a switching manifold, an air stream sample of the plurality of air stream samples from one or more pipes of the piping to a plurality of integrated sensors of the integrated sampling system. In some embodiments, the selectively providing further includes operating, by the integrated sampling system, an actuator to selectively provide the air stream sample of the plurality of air stream samples via an output of the switching manifold to a plurality of inputs of the plurality of integrated sensors for measuring. In some embodiments, the output of the switching manifold is coupled to an inline pump configured to provide the air stream sample from the output of the switching manifold to the plurality of inputs of the plurality of integrated sensors. In some embodiments, the air stream samples can be provided using inline pumps (e.g., 682 and 692). Moreover, the use of a switching manifold and inline pumps allows for efficient and targeted air stream sample analysis. Instead of having to analyze all air stream samples from every pipe in the system, the integrated sampling system 640 can selectively provide samples to the appropriate sensors, saving time and resources. Additionally, the use of one or more inline pumps can improve the accuracy of the air stream samples by ensuring a consistent flow rate and volume of air is being analyzed by the sensors 652.

At block 1430, the integrated sampling system 640 can measure, using the plurality of integrated sensors, the air stream sample including a first species and a second species. In some embodiments, the measured air stream sample is a concentration measurement of one or more species, wherein the one or more species includes, but is not limited to, at least one of temperature, particulate distribution, carbon dioxide, particulate matter, volatile organic compounds (VOCs), or humidity. By measuring the concentration of these species, the integrated sampling system 640 can provide information on the air quality and performance of the building's HVAC system.

In some embodiments, the concentration measurement of the one or more species may include at least one of a mixed air measurement, a return air measurement, an outside air measurement, and a supply air measurement. For example, a mixed air measurement may provide information on the air quality and performance of the HVAC system as a whole, while a return air measurement may indicate how well the air in the building is being filtered and cleaned before being recirculated. An outside air measurement may be used to determine how much fresh air is being brought into the building, while a supply air measurement may indicate how well the HVAC system is delivering conditioned air to the building's occupants. By measuring these different types of air stream samples, the integrated sampling system 640 can provide a comprehensive view of the air quality and performance of the building's HVAC system.

At block 1440, the integrated sampling system 640 can estimate one or more air quality indicators of an air handling unit based on at least one of the measurement of the first species or the measurement of the second species. In some embodiments, an air quality indicator of one or more air quality indicators is a weighted outdoor air fraction, wherein the weighted outdoor air fraction is estimated based on modeling a plurality of outdoor air fractions by (1) calculating a first outdoor air fraction of the plurality of outdoor air fractions based on a plurality of first measurements by a first integrated sensor of the one or more integrated sensors, wherein the plurality of first measurements are of a first species, (2) generating a first outdoor air fraction uncertainty based on inputting the first outdoor air fraction and a first uncertainty of the first sensor, (3) calculating a second outdoor air fraction of the plurality of outdoor air fractions based on a plurality of second measurements by a second integrated sensor of the one or more integrated sensors, wherein the plurality of second measurements are of a second species, (4) generating a second outdoor air fraction uncertainty based on inputting the second outdoor air fraction and a second uncertainty of the second integrated sensor, and (5) estimating the weighted outdoor air fraction based on inputting into a model the first uncertainty, the second uncertainty, a first mass balance of the first species, and a second mass balance of the second species.

In some embodiments, the integrated sampling system 640 can estimate the weighted outdoor air fraction by utilizing a model which takes into account the first uncertainty and the second uncertainty, as well as a first mass balance of the first species and a second mass balance of the second species. By inputting these values into the model, the integrated sampling system 640 can accurately estimate the outdoor air fraction and use it to control the HVAC system, ensuring that the air quality within the building is maintained at a desirable level. This allows for precise and effective control over the indoor air quality and can lead to improved health and comfort for building occupants. In some embodiments, one or more models can be used to combine measurements and uncertainties to estimate the weighted outdoor air fraction. In one example, a linear regression model can be implemented, which can be used to establish a relationship between the measurements and the estimated parameter of interest. In another example, a Bayesian model can be used, which can take into account prior information about the parameter of interest and use this information to update the estimate based on the new measurements. In yet another example, a polynomial regression model, neural network models, and decision tree models, among others can be used. The choice of model by the integrated sampling system 640 can depend on the specific characteristics of the data and the nature of the relationship between the variables being analyzed.

As shown, the air quality indicators can include additional parameters such as ventilation effectiveness, particle filtration efficiency, air distribution efficiency, or other parameters relevant to indoor air quality. In some implementations, the estimation of air quality indicators can be based on statistical or machine learning models trained on historical data measured and collected by the integrated sampling system 640. The models can take into account various factors such as occupancy patterns, weather conditions, and time of day to provide accurate estimates. For example, the integrated sampling system 640 may estimate particle filtration efficiency based on measurements of particulate matter before and after passing through the air filters, as well as other factors such as air flow rates and the type of filter being used. The estimation of air distribution efficiency may be based on measurements of air flow rates and temperature differentials at different locations within the building. In some embodiments, the integrated sampling system 640 may use Bayesian statistics to estimate air quality indicators. For example, the system may estimate the effectiveness of outdoor air ventilation by modeling the uncertainty associated with the measurements of outdoor and indoor air concentrations of a particular gas, such as carbon dioxide. The integrated sampling system 640 may also consider uncertainties associated with the ventilation system itself, such as the amount of outdoor air that is actually being supplied to the building. The estimated air quality indicators can be displayed to building operators, facility managers, or occupants in real-time, allowing for prompt responses to indoor air quality issues or improvements in building performance. The system can also be configured to alert personnel in the event of any significant changes in air quality indicators, allowing for immediate action to be taken to rectify any issues that may arise.

In some embodiments, the plurality of integrated sensors can be configured to simultaneously measure the air stream sample, where a first integrated sensor of the plurality of integrated sensors is configured to measure a first species of the air stream sample, and where a second integrated sensor of the plurality of integrated sensors is configured to measure a second species of the air stream sample. In the described embodiments, the integrated sampling system 640 can use a plurality of integrated sensors that can simultaneously measure multiple aspects of the air stream sample. For instance, the first integrated sensor can measure a first species of the air stream sample, such as the concentration of carbon dioxide or temperature, and the second integrated sensor can measure a second species of the air stream sample, such as the concentration of particulate matter. By having multiple integrated sensors that can work simultaneously, the system can collect a more comprehensive set of data about the air stream sample in real-time, providing a more complete and accurate representation of the air quality in a given space.

At block 1450, the integrated sampling system 640 can control operation of the air handling unit, responsive to estimating the one or more air quality indicators, wherein the integrated sampling system is fixedly coupled to an air handling unit controller (e.g., air system 600). For example, the integrated sampling system 640 can be configured to selectively control an airflow source of the air flowing through the air system 600, wherein the airflow source includes at least one of the return air or the outside air, and wherein selectively controlling the airflow source includes controlling at least one of the return air damper or the outside air damper. In some embodiments, the integrated sampling system 640 can control the airflow source based on one or more of the air quality indicators estimated at block 1440. For example, if the weighted outdoor air fraction falls below a certain threshold, the integrated sampling system 640 can increase the amount of outside air entering the air system 600 by adjusting the outside air damper. This can help to improve indoor air quality by diluting indoor pollutants and bringing in fresh air from outdoors. Similarly, if the air quality indicators indicate high levels of carbon dioxide or other pollutants, the integrated sampling system 640 can increase the amount of ventilation by increasing the flow rate of outside air or adjusting the return air damper to increase the proportion of outside air.

In some embodiments, the integrated sampling system 640 can control the airflow source based on external factors such as weather conditions. For example, on a hot and humid day, the integrated sampling system 640 can reduce the amount of outside air entering the air system 600 to avoid introducing warm and humid air into the building. Instead, the system can increase the amount of air recirculated within the building to maintain a comfortable indoor temperature and humidity level. Similarly, on a cold day, the system can reduce the amount of outside air to minimize heat loss and improve energy efficiency. Accordingly, by selectively controlling the airflow source of the air system 600 based on various factors, the integrated sampling system 640 can help to maintain a healthy and comfortable indoor environment while optimizing energy use and minimizing operating costs.

In some embodiments, the integrated sampling system 640 can further (1) generate a first size-resolved particulate dataset of a supply air stream sample supplied by the one or more sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles, (2) calculate a first size distribution of the supply air stream sample based on the first size-resolved particulate dataset, (3) generate a second size-resolved particulate dataset of an outside air stream sample supplied by the one or more sensors based on sorting outside airborne particles of the outdoor air stream sample into the size bins based on a diameter of the outside airborne particles, (4) calculate a second size distribution of the outdoor air stream sample based on the second size-resolved particulate dataset, (5) compare the first size distribution of with the supply air stream sample with the second size distribution of the outdoor air stream sample, and (6) in response to comparing the first size distribution and the second size distribution (6a) determine an outside air stream is a source of a pollutant based on determining the supply airborne particles include primarily outdoor air, responsive to the first size distribution and the second size distribution being with a threshold similarity based on the comparison, or (6b) determine a supply air stream is a limited source of the pollutant based on determining the first size distribution is smaller than the second size distribution and the first size distribution and the second size distribution being outside the threshold similarity based on the comparison. In some embodiments, when the outside air stream is the source of the pollutant, the system may modify a control strategy and when the supply air stream is the limited source of the pollutant, system may maintain the control strategy.

In some embodiments, the integrated sampling system can determine the filter efficiency (e.g., air quality indicator) by utilizing PM sensors to measure the particle concentration in the air before and after the air passes through the filter. By measuring multiple size bins, the integrated sampling system 640 can calculate the filtration efficiency for different size ranges and estimate the filter's MERV rating, which is a measure of the filter's efficiency at removing particles of various sizes. This is a passive method, which means it does not require the introduction of new particles, instead it uses particles already in the air to measure the filter's performance. In some embodiments, a threshold similarity described herein can refer to the degree of similarity between the first size distribution of a supply air stream and the second size distribution of an outdoor air stream (or between two air streams generally). The integrated sampling system 640 compares these distributions and determines whether the outdoor air stream or the supply air stream is the source of a pollutant. If the similarity is within a certain threshold, it means that the outdoor air stream is the source of the pollutant, and the system may modify a control strategy to reduce exposure to the pollutant. However, if the similarity is outside the threshold, it means that the supply air stream is a limited source of the pollutant and the system may maintain its current control strategy.

For example, a first size bin can be associated with the first diameter range of airborne particles in the supply air stream is 0.3 to 1 micron, and the second size bin can be associated with the second diameter range of airborne particles in the supply air stream is 1 to 3 microns. The first size distribution of the supply air stream could be calculated as 60% in the first size bin and 40% in the second size bin. For the outdoor air stream sample, the first size bin can be associated with the first diameter range of outdoor airborne particles is also 0.3 to 1 micron, and the second size bin can be associated with the second diameter range of outdoor airborne particles is 1 to 3 microns. The second size distribution of the outdoor air stream could be calculated as 40% in the first size bin and 60% in the second size bin. After comparing the first and second size distributions, the processing circuit 648 may determine that the first and second size distributions are within the threshold similarity based on the comparison. This could mean that the supply air stream includes primarily outdoor air and that the outdoor air stream is a source of the pollutant. The integrated sampling system 640 could modify a control strategy to increase the flow of outside air and reduce the concentration of the pollutant in the space.

In some embodiments, the integrated sampling system 640 can execute an active test for filter efficiency if there are no particles present in all size distributions. In this case, particles are generated using an ultrasonic humidifier with a salt solution (or another aqueous solution, described in greater detail with reference to humidifier 672 of FIG. 6B). The PM sensors can then measure the filtration efficiency (e.g., air quality indicator) of the filter for different size bins, which can be used to estimate the filter MERV rating in reference to the ASHRAE standard 52.2. This active testing method works on the same principle as the passive method, which takes advantage of the particles already present in the air. However, in this case, the particles are actively generated to test the efficiency of the filter. Accordingly, the integrated sampling system 640 can switch the AHU controller 330 from passive testing mode to active testing mode. During passive testing mode, the integrated sampling system 640 can capture the particles that are already present in the air and measure their concentration and size distribution to evaluate the air quality indicator and filter efficiency.

During active testing mode, the integrated sampling system 640 can communicate with the AHU controller 330 or a humidifier directly (e.g., humidifier 672 or a humidifier in a room of the building) to generate particles with a salt solution or another aqueous solution to test the efficiency of the filter for different size bins. The ability to switch between active and passive testing modes provides greater flexibility and control in evaluating air quality and filter efficiency. In some embodiments, the processing circuit 648 can communicate via network interface 658 to switch the air handling unit from active to passive testing mode in real-time or when a specific condition is met. This can enable the integrated sampling system 640 to quickly adapt to changing environmental conditions and provide more accurate and timely measurements of air quality indicators and filter efficiency. The ability to switch between active and passive testing modes provides greater flexibility and control in evaluating air quality and filter efficiency. In some embodiments, the processing circuit 648 can communicate via network interface 658 to switch the air handling unit from active to passive testing mode in real-time or when a specific condition is met (e.g., when particles diameters are consistently a particular size range, when the integrated sampling system 640 identifies fewer particles during a period of time compared to a threshold number of particles). This can enable the integrated sampling system 640 to quickly adapt to changing environmental conditions and provide more accurate and timely measurements of air quality indicators and filter efficiency.

In the integrated sampling system 640, switching from active mode (i.e., an operating mode) to passive mode (i.e., another operating mode), or vice versa, involves changing the operation of the system's (e.g., air system 600) humidifier. For example, the integrated sampling system 640 can modify an operating mode of the air handling unit, responsive to a number of identified airborne particles of the plurality of air stream samples being below a particle threshold (e.g., below a PM2.5 concentration (e.g., below 2 $\mu g/m^3$, 8 $\mu g/m^3$, etc.), below a PM10 concentration (e.g., below 10 $\mu g/m^3$, 25 $\mu g/m^3$, etc.), wherein modifying the operating mode includes activating a humidifier with an aqueous solution to evaporate the aqueous solution into air flowing through the ducting or into a zone of the building. In some embodiments, the integrated sampling system 640 can then estimate a filtration efficiency based on new measured air stream sample from the one or more integrated sensors and determine a corrective action based on the filtration efficiency, wherein the corrective action is at least one of a Minimum Efficiency Reporting Values (MERV) rating change, an air handling unit filter replacement notification, an update of a benchmark filter effectiveness, or modify a control strategy for a zone of the building.

During passive mode, the integrated sampling system 640 captures particles that are already present in the air and measures the filter efficiency using the PM sensors, without actively generating any new particles. In active mode, the humidifier (e.g., in the air handling unit or in particle rooms or zones) generates particles with a salt solution, allowing for the measurement of the filter efficiency for different size bins, which can be used to estimate the filter MERV rating. Switching from active to passive mode, or vice versa, involves the processing circuit 648 communicating with the AHU controller 330 through the network interface 658 to change the mode of operation. This can be done in real-time or when a trigger is reached, such as a certain time of day or a change in occupancy of the building. When switching from passive to active mode, the humidifier generates particles and integrated sampling system 640 measures the filter efficiency. When switching from active to passive mode, the system stops generating new particles and captures particles that are already present in the air for measurement. The ability to switch between active and passive modes provides a more comprehensive picture of the filter efficiency, which is important for maintaining good IAQ.

In some embodiments, a trigger for switching from active mode to passive mode, or vice versa, could be a specific value or range of values for a measured air quality indicator, such as particulate matter concentration, CO2 levels, temperature, or humidity, that indicates a need for a change in the operation of the air handling unit (AHU). The trigger could be set as a threshold value that, when reached or exceeded, prompts the AHU controller to adjust the system's settings to improve air quality or energy efficiency. Triggers can also be based on time, such as scheduling changes in the AHU operation during different hours of the day or night.

In some embodiments, to identify the sources of particles in a zone is to use particle sensors (e.g., integrated sensor 652A for a first particle size range, integrated sensor 652B for a first particle size range, integrated sensor 652C for a third particle size range, and integrated sensor 652D for another species measurement) that have size resolution. By analyzing the return air particle size distribution, it is possible to for the processing circuit 648 to determine the sources of particles in the zone. For instance, if the particle size distribution in the return air is similar to that of the outside air, processing circuit 648 may determine that the particles are entering the zone from outside, possibly through leaks in the building. Conversely, if the particle size distribution is different from that of the outside air, processing circuit 648 may determine that the sources of particles are from inside the building. This method of particle analysis can be useful in identifying and mitigating sources of poor indoor air quality in a building.

Furthermore, the data gathered and measured by the various sensors in the integrated sampling system 640, including CO2, temperature, humidity, and particulate matter measurements, can be used to inform the control of the HVAC system. For example, if the integrated sampling system 640 determines that the outside air fraction needs to be increased to improve indoor air quality, the HVAC system can be adjusted to bring in more outside air. Additionally, if the system identifies a source of particles in the indoor environment, such as a leak from the outside, the HVAC system can be adjusted (e.g., update a control strategy or control operations) to minimize the entry of outside air in that particular zone. By analyzing the data from the various sensors, the integrated sampling system 640 can inform the operation of the HVAC system to provide a more comfortable and healthier indoor environment.

Accordingly, the integrated sampling system 640 can generate and analyze a size-resolved particulate dataset of both the supply air stream sample and the outside air stream sample to determine the source of a pollutant in a building. This includes sorting airborne particles into size bins based on their diameter and calculating the size distribution of each sample. The integrated sampling system 640 then compares the size distributions and determines whether the outdoor air stream or supply air stream is the source of the pollutant. Depending on the determination, the system may modify or maintain the control strategy.

In some embodiments, the integrated sampling system 640 can further (1) generate a third size-resolved particulate dataset of a zone air sample supplied by a zone sensor based on sorting zone airborne particles of the zone air sample into the size bins based on a diameter of the zone airborne particles, (2) calculate a third size distribution of the zone air sample based on the third size-resolved particulate dataset, (3) determine a presence of envelope leakage based on (3a) determining a first portion of the third size distribution of the zone air sample that shares a threshold distribution of a third diameter range as the second size distribution of the outdoor air stream sample and/or (3b) determining a second portion of the third size distribution that shares the threshold distribution of the third diameter range as the first size distribution of the supply air stream sample, and (4) identify the presence of envelope leakage based on either (1) the first portion of the third size distribution being equal to or greater than the second size distribution, or (2) the second portion of the third size distribution is less than the first size distribution.

In some embodiments, the several factors that could contribute to the difference between the first and second portions of the third size distribution in the presence of envelope leakage include, but are not limited to, the condition of the building envelope (e.g., aging, material, and construction quality), the air pressure differentials between the building interior and exterior, the direction and speed of the wind, and the HVAC system configuration and operation. For example, if the building envelope is not properly sealed or insulated, air can leak in or out of the building through cracks, gaps, or other openings, resulting in a difference in particle distribution between the zone air and the supply air. Additionally, the air pressure differentials between the interior and exterior of the building can affect the direction of air flow and the amount of envelope leakage. The wind direction and speed can also impact the air flow patterns around the building and the degree of envelope leakage. Finally, the HVAC system configuration and operation, such as the location and size of the air handlers, the type and efficiency of the filters, and the volume of air exchange, can affect the air flow and distribution in the building and contribute to the difference in particle distribution between the zone air and the supply air. Thus, the integrated sampling system 640 determines a first portion of the third size distribution of the zone air sample that shares a threshold distribution of a third diameter range as the second size distribution of the outdoor air stream sample, determines a second portion of the third size distribution that shares the threshold distribution of the third diameter range as the first size distribution of the supply air stream sample, and identifies the presence of envelope leakage based on the comparison of the two portions of the third size distribution.

In general, envelope leakage refers to the air that infiltrates into or leaks out of a building through cracks or gaps in the building's envelope, such as walls, doors, windows, and roofs. In some embodiments, when the outside air particle size distribution signature is found to be equal to or higher than that found in the supply air, the integrated sampling system 640 can determine that the particles are entering the building from the outside, likely through envelope leakage. The "signature" can refer to a unique characteristic or pattern that identifies the specific outside air particle size distribution. For example, it can describe the distinct features of the particle size distribution, such as the distribution shape, the range of particle sizes, and the total concentration of particles. Thus, by comparing the signature of the outside air particle size distribution with that of the supply air, one can determine whether there is envelope leakage or not. In some embodiments, envelope leakage can also be identified based on determining a first portion of the third size distribution of the zone air sample that shares a threshold distribution of a third diameter range as the second size distribution of the outdoor air stream sample, and determining a second portion of the third size distribution that shares the threshold distribution of the third diameter range as the first size distribution of the supply air stream sample. The third size distribution of the zone air sample refers to the distribution of particle sizes in the air inside the building. By comparing the third size distribution with the size distributions of the outdoor air and supply air, it is possible to identify the presence of envelope leakage and take corrective action to improve indoor air quality.

In some embodiments, to find envelope leakage, the integrated sampling system 640 can first determine a first portion of the third size distribution of the zone air sample that shares a threshold distribution of a third diameter range as the second size distribution of the outdoor air stream sample. That is, the third size distribution can be sorted into size bins based on a diameter of the airborne particles and a portion of the third size distribution with particles falling within a certain diameter range (i.e., the third diameter range) is compared to the second size distribution of the outdoor air stream sample. If the first portion of the third size distribution is equal to or greater than the second size distribution, this could indicate that some of the outdoor air is leaking into the building envelope. Additionally, the integrated sampling system 640 can also determine a second portion of the third size distribution that shares the threshold distribution of the third diameter range as the first size distribution of the supply air stream sample. That is, a different portion of the third size distribution with particles falling within the same diameter range (i.e., the third diameter range) is compared to the first size distribution of the supply air stream sample. If the second portion of the third size distribution is less than the first size distribution, this could indicate that the supply air stream is not the source of the airborne particles.

Figure 15:
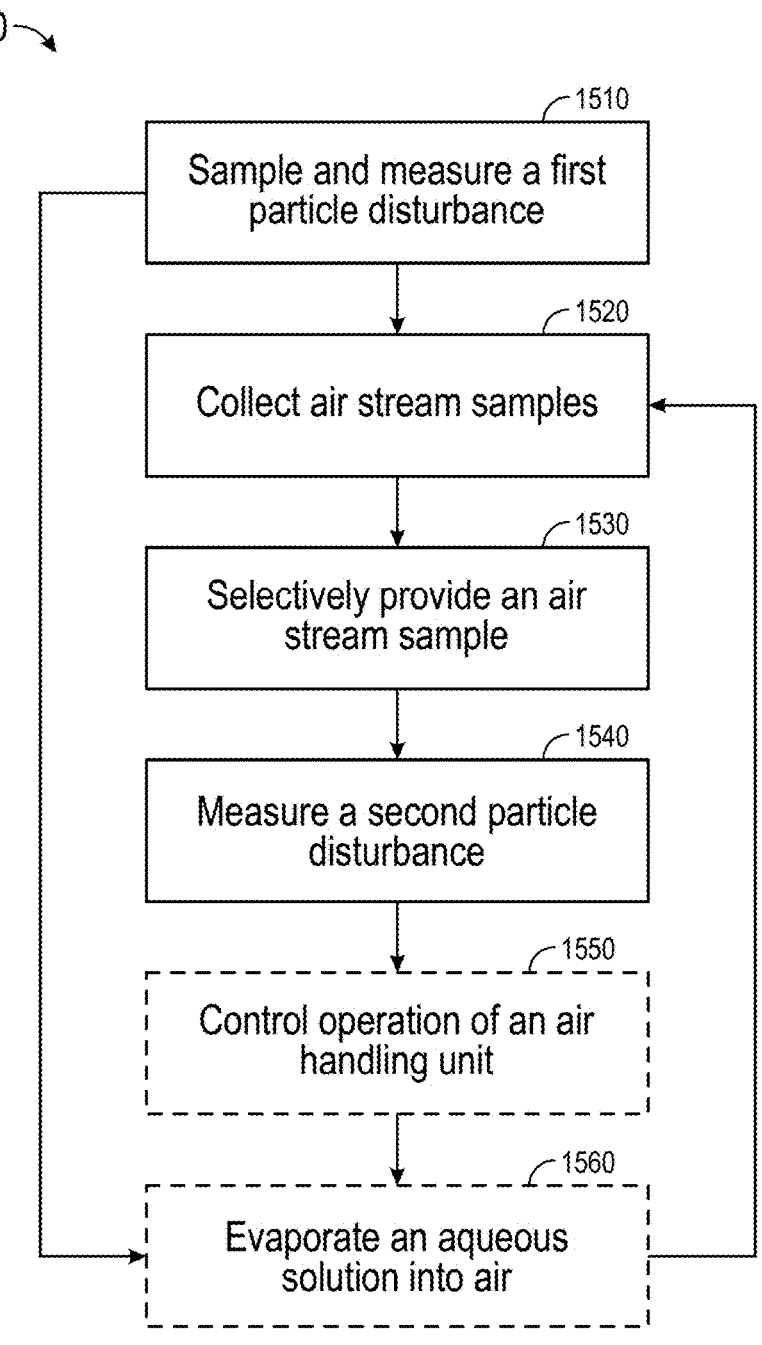
FIG. 15 depicts a flowchart for a method for particulate sensing of a building, according to some embodiments.

Referring now to FIG. 15, a flowchart for a method 1500 for particulate sensing of a building 10 is shown, according to some embodiments. Processing circuit 648 can be configured to perform method 1500. Further, any computing device described herein can be configured to perform method 1500. The details and each of the equations are provided and described above with reference to FIG. 6A.

In broad overview of method 1500, at block 1510, the air handling unit (e.g., the integrated sampling system 640 individually or in combination with other devices and systems of air system 600 of FIGS. 6A-6D) can collect (or sample) and measure a first particle disturbance. At block 1520, the air handling unit can collect air stream samples. At block 1530, the air system unit can selectively provide an air stream sample. At block 1540, the air handling unit can measure a second particle disturbance. At block 1550, the air handling unit can control operation of an air handling unit. At block 1560, the air handling unit can evaporate an aqueous solution into air. Additional, fewer, or different operations may be performed depending on the particular arrangement. In some embodiments, some or all operations of method 1500 may be performed by one or more processors executing on one or more computing devices, systems, or servers. In various embodiments, each operation may be re-ordered, added, removed, or repeated. In some arrangements, blocks can be optionally executed (e.g., blocks depicted as dotted lines) by the one or more processors.

At block 1510, the air handling unit can sample and measure a first zone for a first particle disturbance of the first zone. For example, one or more zone sensors (e.g., zone sensors 670) can be installed in different areas of the building to measure the concentration of airborne particles, including the use of high-resolution particle sensors to measure particle concentration in different size ranges. By sampling and measuring data from these sensors, the air handling unit can determine the particle concentration in the first zone and identify any particle disturbances that may be present. A particle disturbance refers to an increase or change in the concentration or composition of particles in a particular zone. This disturbance could be caused by various factors, such as the use of certain appliances or equipment, opening windows or doors, or changes in the air handling system. Measuring this disturbance allows for the identification of potential sources of indoor air pollution and the evaluation of the effectiveness of air filtration or ventilation systems.

At block 1520, the air handling unit can collect, from piping, a plurality of air stream samples. This includes collecting samples from various portions of the air system 600 and/or zones of the building. For example, integrated sampling system 640 of the air handling unit can be configured to collect air stream samples from different locations within the air system 600. This can include collecting samples from various pipes or ducts that carry air from different parts of the building, such as different floors, rooms or zones. The air stream samples can be collected at various times to ensure that a representative measurements of the air are collected. This can include collecting samples during different weather conditions, different occupancy periods or at different times of the day. By collecting air stream samples from various locations inside the air system 600 and outside (e.g., using zone sensors 670) and at different times, the integrated sampling system 640 can provide a more comprehensive understanding of the air quality within a building and the performance of the HVAC system.

At block 1530, the air handling unit can selectively provide, using an integrated sampling system, an air stream sample of the plurality of air stream samples from one or more pipes of the piping to one or more integrated sensors. In some embodiments, the selectively providing further includes operating, by the integrated sampling system, an actuator to selectively provide the air stream sample of the plurality of air stream samples via an output of the switching manifold to a plurality of inputs of the one or more sensors for measuring. In some embodiments, the output of the switching manifold is coupled to an inline pump configured to provide the air stream sample from the output of the switching manifold to the plurality of inputs of the one or more sensors. In some embodiments, the air stream samples can be provided using inline pumps (e.g., 682 and 692). Moreover, the use of a switching manifold and inline pumps allows for efficient and targeted air stream sample analysis. Instead of having to analyze all air stream samples from every pipe in the system, the integrated sampling system 640 can selectively provide samples to the appropriate sensors, saving time and resources. Additionally, the use of one or more inline pumps can improve the accuracy of the air stream samples by ensuring a consistent flow rate and volume of air is being analyzed by the sensors 652. Accordingly, this enables targeted analysis of air stream samples, saving time and resources, and improving the accuracy of measurements by ensuring a consistent flow rate and volume of air is analyzed by the sensors. The use of inline pumps positioned closer to the intake of the air stream can further enhance the accuracy of air stream sample measurements. Additionally, the switching manifold and inline pumps provide flexibility for collecting samples from various portions of the air system or zones of the building, which can be useful for targeted analysis of specific areas.

At block 1540, the air handling unit can measure, using the one or more sensors of the integrated sampling system, a second particle disturbance of an outdoor air stream and a third particle disturbance of an indoor air stream. In some embodiments, the air handling unit can measure a second particle disturbance of an outdoor air stream and a third particle disturbance of an indoor air stream using the one or more sensors of the integrated sampling system. This enables the system to monitor the quality of air in both the indoor and outdoor environments. The second particle disturbance measurement of the outdoor air stream provides information on the quality of the air being brought into the building, which can impact the health and comfort of the occupants. The third particle disturbance measurement of the indoor air stream helps to determine the effectiveness of the air handling unit in removing pollutants and maintaining a healthy indoor environment. By comparing the second and third particle disturbance measurements, the system can determine the extent to which outdoor pollutants are infiltrating the indoor environment and help to identify potential sources of indoor air pollution. In some embodiments, the measured air streams are concentration measurements of one or more species, wherein the one or more species includes, but is not limited to, at least one of temperature, particulate distribution, carbon dioxide, particulate matter, volatile organic compounds (VOCs), or humidity. By measuring the concentration of these species, the integrated sampling system 640 can provide information on the air quality and performance of the building's HVAC system.

With reference to block 1510, the integrated sampling system measures a first particle disturbance of a first zone, which can be caused by a variety of factors such as dust, pollutants, or other airborne contaminants. Once this first particle disturbance is identified, the integrated sampling system can selectively provide air stream samples from one or more pipes of the air handling unit to the appropriate sensors for measuring. This can be achieved using a switching manifold and inline pumps, which allow for targeted and efficient analysis of the air stream samples. The accuracy of the air stream samples is further improved by the use of inline pumps, which ensure a consistent flow rate and volume of air is being analyzed by the sensors. With this approach, the integrated sampling system can save time and resources by avoiding the need to analyze all air stream samples from every pipe in the air handling unit. Once the air stream samples are collected and analyzed, the air handling unit can measure the second particle disturbance of the outdoor air stream and the third particle disturbance of the indoor air stream at block 1540. This allows for an assessment of the air quality within the building and the surrounding environment. By analyzing these particle disturbances, the air handling unit can determine the source and distribution of airborne contaminants, which can inform decisions related to air handling unit operation and filtration.

Accordingly, the first particle disturbance, as measured at block 1510, can be used in conjunction with the second and third particle disturbances measured at block 1540 to gain a more complete understanding of the air quality in a building. By comparing the levels and types of particles present in the air stream with those in the outdoor and indoor air streams, the air handling unit (e.g., processing circuit 648) can identify potential sources of pollution or other air quality issues within the building. This information can then be used to develop targeted solutions to improve IAQ, such as adjusting the ventilation system or installing air filters. Additionally, ongoing monitoring of particle disturbances can help to ensure that the implemented solutions are effective in improving air quality over time.

Figure 19:
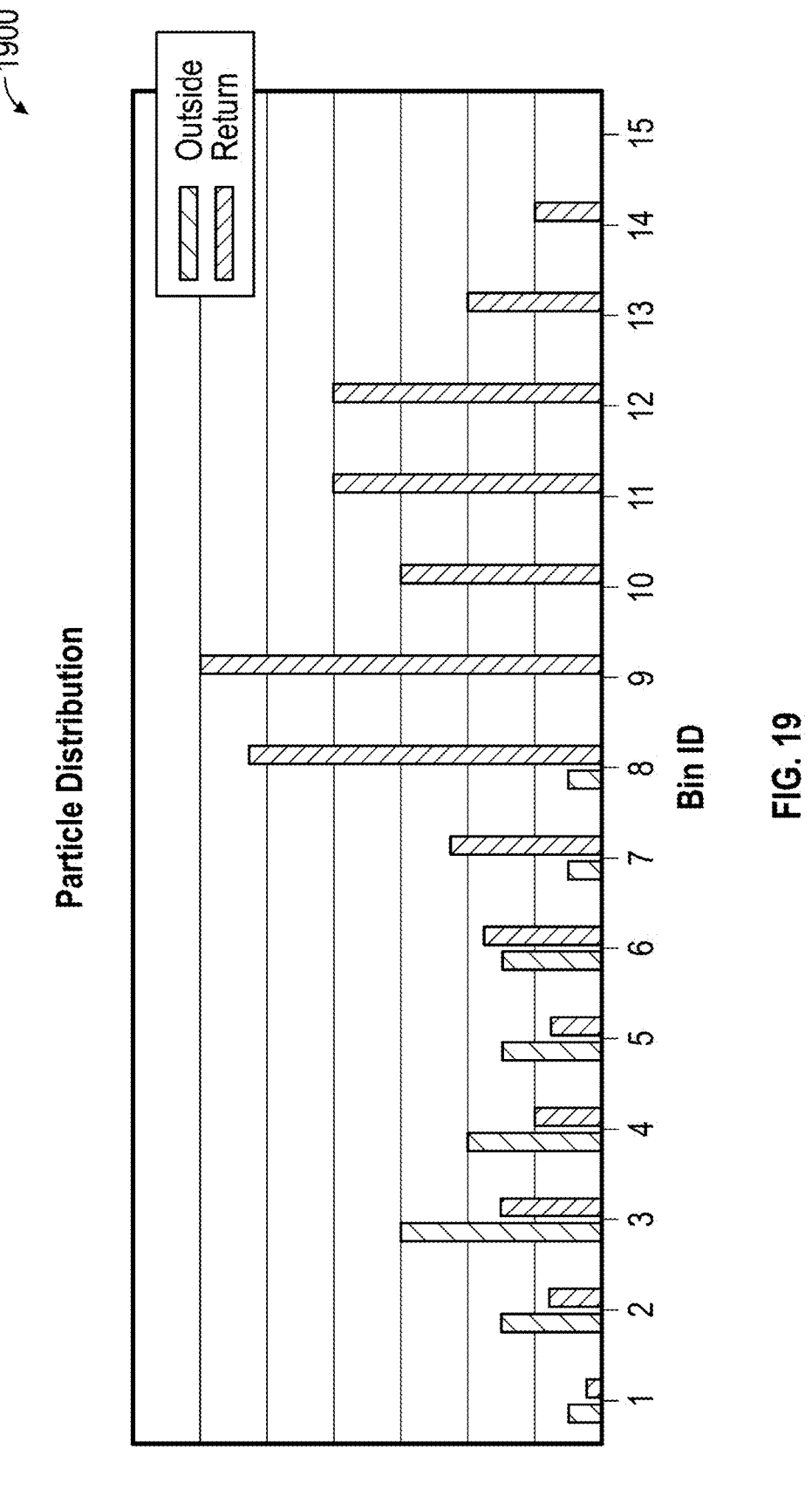

At block 1550, the air handling unit can control operation of the air handling unit (e.g., air system 600), responsive to comparing the second particle disturbance with at least one of the first particle disturbance or and the third particle disturbance. For example, the air handling unit can be configured to selectively control an airflow source of the air flowing through the air system 600, and wherein the airflow source includes at least one of the return air or the outside air, and wherein selectively controlling the airflow source includes controlling at least one of the return air damper or the outside air damper. In some embodiments, the integrated sampling system 640 can control the airflow source based on the results of the comparison. For example, if graph 1900 (FIG. 19) shows that the return air particle count is considerably higher than the particle count of the outside air, then the processing circuit 648 may determine to increase the flow of outside air into the building in order to lessen the concentration of particles in the space. This can be accomplished by adjusting the position of the air dampers (e.g., outside air damper 616) or by changing the settings on the air handling unit controller 330. By increasing the amount of outside air, the HVAC system can dilute the concentration of particles in the indoor air, which can lead to improved indoor air quality. This adaptive system helps to maintain a healthy indoor environment by continually adjusting the air quality based on real-time data, thus mitigating the risks of respiratory problems and other health hazards.

In some embodiments, the air handling unit can estimate the filtration efficiency based on the measured air stream sample from the one or more integrated sensors. This allows for an assessment of the effectiveness of the air filters in removing particles from the air. Based on the estimated filtration efficiency, the air handling unit can determine a corrective action. The corrective action can be a change in the Minimum Efficiency Reporting Value (MERV) rating, which is a measure of the filter's ability to capture particles of various sizes. Additionally, the air handling unit can notify of the need for air handling unit filter replacement, update the benchmark filter effectiveness, or modify a control strategy for a zone of the building to optimize the filtration efficiency. By taking corrective actions based on the estimated filtration efficiency, the air handling unit can ensure the air in the building is of high quality, promoting the health and well-being of the occupants.

In addition to modifying the control strategy to control HVAC equipment of the building, the air handling unit controller can further optimize the ventilation schedule based on the calculated operating cost of increasing the outdoor air fraction and the one or more instructions. This can involve maximizing the outdoor air fraction while maintaining the operating cost below a predefined threshold or alternatively, maintaining the outdoor air fraction and minimizing the operating cost. By adjusting the controls of the HVAC equipment based on these calculations, the air handling unit can achieve a more efficient and cost-effective ventilation system. This can lead to improved IAQ, increased energy savings, and reduced environmental impact. Additionally, the air handling unit can provide filter replacement notifications and updates to benchmark filter effectiveness to ensure the filtration system is operating at peak efficiency.

At block 1560, the air handling unit can evaporate an aqueous solution into air flowing through the ducting, wherein the aqueous solution comprises a plurality of particles with one or more recorded particle sizes. In particular, evaporating can also include seeding a zone of the building with the plurality of particles of the aqueous solution, and wherein the air handling unit is further configured to estimate a decay rate of the plurality of particles based on receiving particle disturbances of the zone sensor over a period of time. In addition, the air handling unit can estimate the decay rate of these particles based on the particle disturbances detected by the zone sensor over a specified period. In some embodiments, the air handling unit can estimate a decay rate of the plurality of particles by receiving particle disturbances of the zone sensor over a period of time. This can allow the air handling unit to determine the effectiveness of the air filtration system in removing particles from the air. The air handling unit can estimate the decay rate by analyzing the change in particle concentration over time, and can use this information to adjust the operation of the air handling unit to optimize filtration performance. For example, if the decay rate is low, indicating that particles are not being effectively removed from the air, the air handling unit can adjust the air handling unit to increase the amount of outside air being brought into the building or increase the operation of the air filtration system. By estimating the decay rate of particles over time, the air handling unit can maintain a high level of air quality and ensure the safety and comfort of occupants in the building.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps

What is claimed is:

1. An air handling unit of an HVAC system of a building, the air handling unit comprising:

a zone sensor configured to sample a first zone and measure a first particle disturbance of the first zone;

an integrated sampling system comprising:

piping coupled to at least one of ducting or one or more air dampers and configured to collect a plurality of air stream samples; and a switching manifold coupled to the piping and configured to selectively provide an air stream sample of the plurality of air stream samples from one or more pipes of the piping to one or more integrated sensors, wherein the one or more integrated sensors are configured to determine a second particle disturbance of an outdoor air stream when the outdoor air stream is selected, and determine a third particle disturbance of an indoor air stream when the indoor air stream is selected, wherein at least one of the second particle disturbance or the third particle disturbance is determined based on generating a size-resolved particulate dataset corresponding to a classification of a plurality of particle counts or a plurality of particle concentrations; and an air handling unit controller configured to control operation of the air handling unit responsive to:

comparing the second particle disturbance with at least one of the first particle disturbance or the third particle disturbance; and determining an air stream source of a pollutant in the first zone responsive to the comparison.

2. The air handling unit of claim 1, wherein the integrated sampling system is further configured to operate an actuator to selectively provide the air stream sample of the plurality of air stream samples via an output of the switching manifold to a plurality of inputs of the one or more integrated sensors.

3. The air handling unit of claim 2, wherein the output of the switching manifold is coupled to an inline pump configured to provide the air stream sample from the output of the switching manifold to the plurality of inputs of the one or more integrated sensors, and wherein the one or more integrated sensors simultaneously measure characteristics of at least one of the plurality of air stream samples.

4. The air handling unit of claim 1, the air handling unit controller is further configured to:

estimate a filtration efficiency based on the air stream sample from the one or more integrated sensors; and determine a corrective action based on the filtration efficiency, wherein the corrective action is at least one of a Minimum Efficiency Reporting Values (MERV) rating change, an air handling unit filter replacement notification, an update of a benchmark filter effectiveness, or modifying a control strategy for a zone of the building.

5. The air handling unit of claim 4, wherein modifying the control strategy causes the air handling unit controller to implement the control strategy to control HVAC equipment of the building, and wherein the integrated sampling system is fixedly coupled to the air handling unit controller, and wherein the control strategy further comprises adjusting at least one control of the HVAC equipment based on one or more instructions, and wherein the air handling unit controller is further configured to:

calculate an operating cost of increasing an outdoor air fraction based on increasing outdoor air intake by at least one of the one or more air dampers; and optimize a ventilation schedule based on either (1) maintaining the outdoor air fraction and minimizing the operating cost, or (2) maximizing the outdoor air fraction and maintaining the operating cost below a predefined threshold.

6. The air handling unit of claim 1, further comprising:

a humidifier within the ducting and configured to evaporate an aqueous solution into air flowing through the ducting, wherein the aqueous solution comprises a plurality of particles with one or more recorded particle sizes.

7. The air handling unit of claim 6, wherein the humidifier is further configured to seed a zone of the building with the plurality of particles of the aqueous solution, and wherein the air handling unit controller is further configured to estimate a decay rate of the plurality of particles based on receiving particle disturbances of the zone sensor over a period of time.

8. The air handling unit of claim 1, a processing circuit of the integrated sampling system is configured to:

generate a first size-resolved particulate dataset of a supply air stream sample supplied by the one or more integrated sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles;

calculate a first size distribution of the supply air stream sample based on the first size-resolved particulate dataset;

generate a second size-resolved particulate dataset of an outside air stream sample supplied by the one or more integrated sensors based on sorting outside airborne particles of an outdoor air stream sample into the size bins based on a diameter of the outside airborne particles;

calculate a second size distribution of the outdoor air stream sample based on the second size-resolved particulate dataset;

compare the first size distribution of with the supply air stream sample with the second size distribution of the outdoor air stream sample; and in response to comparing the first size distribution and the second size distribution:

determine an outside air stream is a source of a pollutant based on determining the supply airborne particles comprise primarily outdoor air, responsive to the first size distribution and the second size distribution being within a threshold similarity based on the comparison; or determine a supply air stream is a limited source of the pollutant based on determining the first size distribution is smaller than the second size distribution and the first size distribution and the second size distribution being outside the threshold similarity based on the comparison.

9. The air handling unit of claim 8, the processing circuit of the integrated sampling system further configured to:

when the outside air stream is the source of the pollutant, modify a control strategy; and when the supply air stream is the limited source of the pollutant, maintain the control strategy.

10. An integrated sampling system of an air handling unit of a building, the integrated sampling system comprising:

piping coupled to at least one of ducting or one or more air dampers and configured to collect a plurality of air stream samples;

a switching manifold coupled to the piping and configured to selectively provide an air stream sample of the plurality of air stream samples from one or more pipes of the piping to one or more integrated sensors;

the one or more integrated sensors configured to determine a second particle disturbance of an outdoor air stream when the outdoor air stream is selected, and determine a third particle disturbance of an indoor air stream when the indoor air stream is selected, wherein at least one of the second particle disturbance or the third particle disturbance is determined based on generating a size-resolved particulate dataset corresponding to a classification of a plurality of particle counts or a plurality of particle concentrations; and a processing circuit configured to control operation of the air handling unit responsive to:

comparing the second particle disturbance with at least one of a first particle disturbance of a first zone or the third particle disturbance; and determining an air stream source of a pollutant in the first zone responsive to the comparison.

11. The integrated sampling system of claim 10, wherein the integrated sampling system is further configured to operate an actuator to selectively provide the air stream sample of the plurality of air stream samples via an output of the switching manifold to a plurality of inputs of the one or more integrated sensors.

12. The integrated sampling system of claim 11, wherein the output of the switching manifold is coupled to an inline pump configured to provide the air stream sample from the output of the switching manifold to the plurality of inputs of the one or more integrated sensors.

13. The integrated sampling system of claim 11, the processing circuit is further configured to:

estimate a filtration efficiency based on the air stream sample from the one or more integrated sensors; and determine a corrective action based on the filtration efficiency, wherein the corrective action is at least one of a Minimum Efficiency Reporting Values (MERV) rating change, an air handling unit filter replacement notification, an update of a benchmark filter effectiveness, or modifying a control strategy for a zone of the building.

14. The integrated sampling system of claim 13, wherein modifying the control strategy causes the processing circuit to implement the control strategy to control HVAC equipment of the building, wherein the control strategy further comprises adjusting at least one control of the HVAC equipment based on one or more instructions, and wherein the processing circuit is further configured to:

calculate an operating cost of increasing an outdoor air fraction based on increasing outdoor air intake by at least one of the one or more air dampers; and optimize a ventilation schedule based on either (1) maintaining the outdoor air fraction and minimizing the operating cost, or (2) maximizing the outdoor air fraction and maintaining the operating cost below a predefined threshold.

15. The integrated sampling system of claim 10, the processing circuit of the integrated sampling system is further configured to:

generate a first size-resolved particulate dataset of a supply air stream sample supplied by the one or more integrated sensors based on sorting supply airborne particles of the supply air stream sample into size bins based on a diameter of the supply airborne particles, wherein a first size bin of the size bins is associated with a first diameter range of the supply airborne particles and a second size bin of the size bins is associated with a second diameter range of the supply airborne particles;

calculate a first size distribution of the supply air stream sample based on the first size-resolved particulate dataset;

generate a second size-resolved particulate dataset of an outside air stream sample supplied by the one or more integrated sensors based on sorting outside airborne particles of an outdoor air stream sample into the size bins based on a diameter of the outside airborne particles;

calculate a second size distribution of the outdoor air stream sample based on the second size-resolved particulate dataset;

compare the first size distribution of with the supply air stream sample with the second size distribution of the outdoor air stream sample; and in response to comparing the first size distribution and the second size distribution:

determine an outside air stream is a source of a pollutant based on determining the supply airborne particles comprise primarily outdoor air, responsive to the first size distribution and the second size distribution being within a threshold similarity based on the comparison; or determine a supply air stream is a limited source of the pollutant based on determining the first size distribution is smaller than the second size distribution and the first size distribution and the second size distribution being outside the threshold similarity based on the comparison.

16. The integrated sampling system of claim 15, the processing circuit of the integrated sampling system further configured to:

when the outside air stream is the source of the pollutant, modify a control strategy; and when the supply air stream is the limited source of the pollutant, maintain the control strategy.

17. A computer-implemented method for particulate sensing of a building, the computer-implemented method comprising:

sampling and measuring, by an air handling unit, a first zone for a first particle disturbance of the first zone;

collecting, by the air handling unit from piping, a plurality of air stream samples;

selectively providing, by the air handling unit using an integrated sampling system, an air stream sample of the plurality of air stream samples from one or more pipes of the piping to one or more integrated sensors;

determining, by the air handling unit using the integrated sampling system, a second particle disturbance of an outdoor air stream when the outdoor air stream is selected, and determine a third particle disturbance of an indoor air stream when the indoor air stream is selected, wherein at least one of the second particle disturbance or the third particle disturbance is determined based on generating a size-resolved particulate dataset corresponding to a classification of a plurality of particle counts or a plurality of particle concentrations; and controlling, by the air handling unit, operation of the air handling unit responsive to:

comparing the second particle disturbance with at least one of the first particle disturbance or the third particle disturbance; and determining an air stream source of a pollutant in the first zone responsive to the comparison.

18. The computer-implemented method of claim 17, further comprising:

estimating, by the air handling unit, a filtration efficiency based on the air stream sample from the one or more integrated sensors; and determining, by the air handling unit, a corrective action based on the filtration efficiency, wherein the corrective action is at least one of a Minimum Efficiency Reporting Values (MERV) rating change, an air handling unit filter replacement notification, an update of a benchmark filter effectiveness, or modifying a control strategy for a zone of the building.

19. The computer-implemented method of claim 17, further comprising:

evaporating, by the air handling unit, an aqueous solution into air flowing through ducting, wherein the aqueous solution comprises a plurality of particles with one or more recorded particle sizes.

20. The computer-implemented method of claim 19, further comprising:

seeding, by the air handling unit, a zone of the building with the plurality of particles of the aqueous solution, and wherein the air handling unit is further configured to estimate a decay rate of the plurality of particles based on receiving particle disturbances of a zone sensor over a period of time.

\*  \*  \*  \*  \*